United States Patent
Jhang et al.

(10) Patent No.: US 10,261,288 B2
(45) Date of Patent: Apr. 16, 2019

(54) OPTICAL LENS ASSEMBLY

(71) Applicant: Genius Electronic Optical Co., Ltd., Taichung (TW)

(72) Inventors: Jia-Sin Jhang, Taichung (TW); Maozong Lin, Fujian (CN); Feng Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 324 days.

(21) Appl. No.: 15/144,829

(22) Filed: May 3, 2016

(65) Prior Publication Data

US 2017/0269328 A1 Sep. 21, 2017

(30) Foreign Application Priority Data

Mar. 18, 2016 (CN) .......................... 2016 1 0157110

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
USPC ................ 359/713–715, 745–747, 754–758, 359/763–766, 771–778
See application file for complete search history.

(56) References Cited

U.S. PATENT DOCUMENTS

2004/0228009 A1 11/2004 Kamo et al.
2016/0291288 A1* 10/2016 Huang ..................... G02B 9/34

FOREIGN PATENT DOCUMENTS

| CN | 101604065 | 12/2009 |
|----|-----------|---------|
| CN | 101655598 | 2/2010 |
| CN | 202583581 | 12/2012 |
| CN | 104597586 | 5/2015 |
| TW | I564612 | 1/2017 |

OTHER PUBLICATIONS

"Office Action of China Counterpart Application," dated Jan. 30, 2018, p. 1-p. 6, in which the listed references were cited.
"Office Action of Taiwan Counterpart Application," dated May 26, 2017, p. 1-p. 5, in which the listed reference was cited.

* cited by examiner

*Primary Examiner* — Darryl J Collins
*Assistant Examiner* — Gary O'Neill
(74) *Attorney, Agent, or Firm* — JCIPRNET

(57) ABSTRACT

An optical lens assembly includes first, second, third and fourth lens elements arranged in sequence from an object side to an image side along an optical axis. Each lens element has an object-side surface and an image-side surface. The first lens element has positive refracting power, and the image-side surface of the first lens element has a convex portion in a vicinity of the optical axis and a convex portion in a vicinity of a periphery. The second lens element has negative refracting power. The object-side surface of the third lens element has a concave portion in a vicinity of the periphery. The image-side surface of the fourth lens element has a convex portion in a vicinity of the periphery.

19 Claims, 55 Drawing Sheets

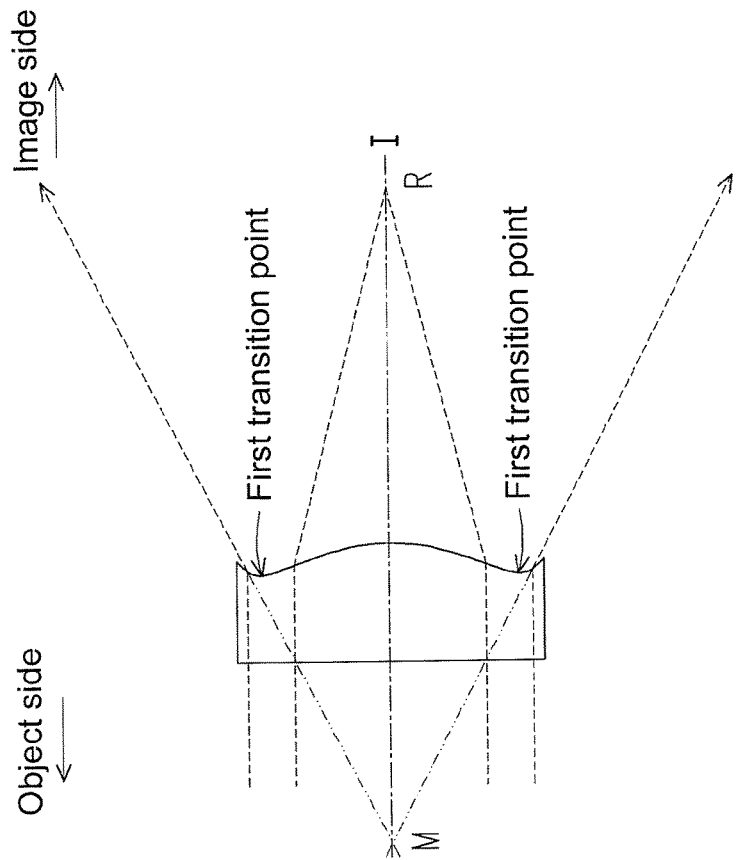
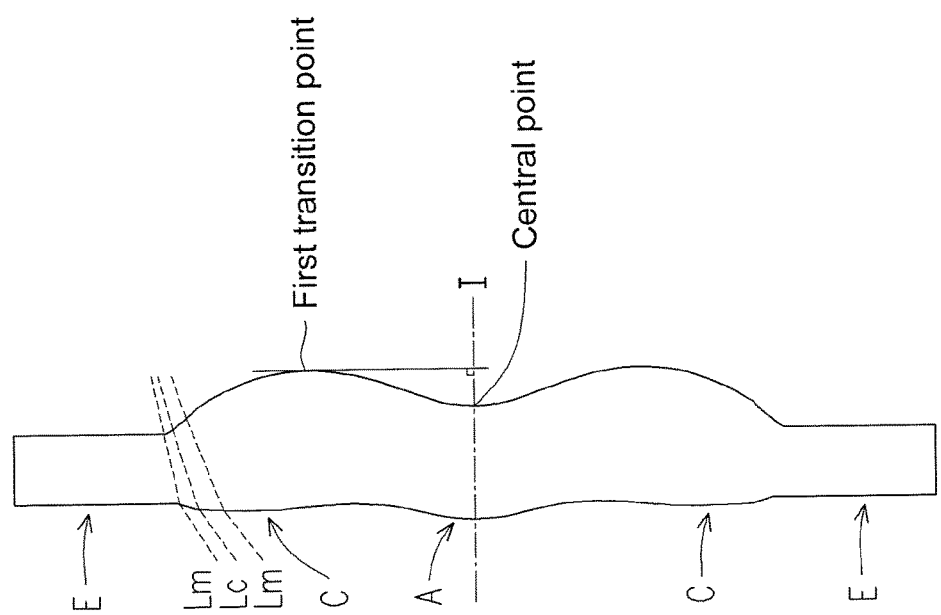

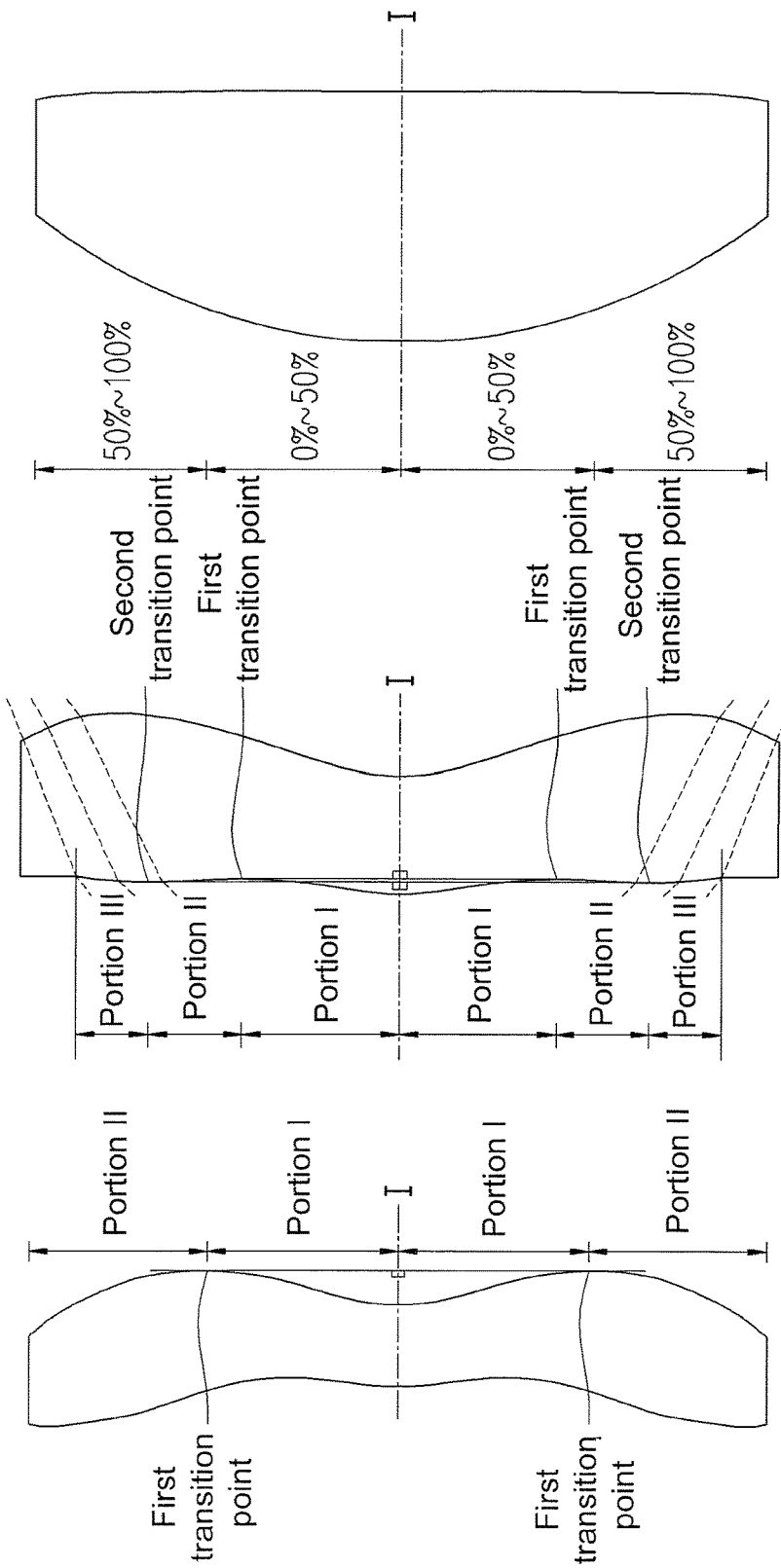

| First embodiment |||||||
|---|---|---|---|---|---|---|
| Total focal length =7.070 mm , half field of view=18.534°, F number=2.397, Total length =6.380 mm, Image height=2.400 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.657 | | | |
| First lens element3 | Object-side surface31 | 1.922 | 0.958 | 1.545 | 55.987 | 3.341 |
| | image-side surface32 | -29.850 | 0.166 | | | |
| Second lens element4 | Object-side surface41 | 12.145 | 0.230 | 1.661 | 20.401 | -6.448 |
| | image-side surface42 | 3.150 | 1.746 | | | |
| Third lens element5 | Object-side surface51 | 8.003 | 0.278 | 1.545 | 55.987 | -6.485 |
| | image-side surface52 | 2.425 | 1.000 | | | |
| Fourth lens element6 | Object-side surface61 | 7.368 | 0.968 | 1.661 | 20.401 | -1129.391 |
| | image-side surface62 | 6.913 | 0.400 | | | |
| Filter9 | Object-side surface91 | Infinity | 0.210 | 1.517 | 64.167 | |
| | image-side surface92 | Infinity | 0.424 | | | |
| | Image plane100 | Infinity | 0.000 | | | |

FIG.8

| Surface | K | $a_4$ | $a_6$ |
|---|---|---|---|
| 31 | 0.000000E+00 | -2.449390E-03 | 2.789857E-04 |
| 32 | 0.000000E+00 | -2.436164E-03 | 2.964893E-03 |
| 41 | 0.000000E+00 | -5.008723E-02 | 2.613718E-02 |
| 42 | 0.000000E+00 | -4.664454E-02 | 2.609300E-02 |
| 51 | 0.000000E+00 | -2.280986E-01 | -3.275610E-03 |
| 52 | 0.000000E+00 | -2.215827E-01 | 8.058679E-02 |
| 61 | 0.000000E+00 | -2.834173E-02 | 1.404585E-02 |
| 62 | 0.000000E+00 | -5.263323E-02 | 1.688217E-02 |
| Surface | $a_8$ | $a_{10}$ | $a_{12}$ |
| 31 | -4.302390E-04 | 0.000000E+00 | 0.000000E+00 |
| 32 | -3.663654E-04 | 0.000000E+00 | 0.000000E+00 |
| 41 | -4.513594E-03 | 0.000000E+00 | 0.000000E+00 |
| 42 | -3.417425E-03 | 0.000000E+00 | 0.000000E+00 |
| 51 | 2.532555E-02 | -2.890329E-02 | 0.000000E+00 |
| 52 | -3.025118E-02 | 5.230359E-03 | 0.000000E+00 |
| 61 | -4.679698E-03 | 6.340218E-04 | -3.139067E-05 |
| 62 | -3.903079E-03 | 4.207948E-04 | -1.787120E-05 |

FIG.9

| second embodiment |||||||
|---|---|---|---|---|---|---|
| Total focal length =7.070 mm, half field of view=18.505°, F number=2.397, Total length =6.380 mm, Image height=2.400 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.609 | | | |
| First lens element3 | Object-side surface31 | 2.014 | 0.917 | 1.545 | 55.987 | 3.441 |
| | image-side surface32 | -23.636 | 0.219 | | | |
| Second lens element4 | Object-side surface41 | 8.829 | 0.229 | 1.661 | 20.401 | -6.311 |
| | image-side surface42 | 2.819 | 2.303 | | | |
| Third lens element5 | Object-side surface51 | 21.991 | 0.253 | 1.545 | 55.987 | -5.255 |
| | image-side surface52 | 2.529 | 0.507 | | | |
| Fourth lens element6 | Object-side surface61 | 4.131 | 0.855 | 1.661 | 20.401 | 20.742 |
| | image-side surface62 | 5.403 | 0.400 | | | |
| Filter9 | Object-side surface91 | Infinity | 0.210 | 1.517 | 64.167 | |
| | image-side surface92 | Infinity | 0.486 | | | |
| | Image plane100 | Infinity | 0.000 | | | |

FIG.12

| Surface | K | $a_4$ | $a_6$ |
|---|---|---|---|
| 31 | 0.000000E+00 | -1.711981E-03 | -3.773184E-04 |
| 32 | 0.000000E+00 | -1.802936E-03 | 2.587654E-03 |
| 41 | 0.000000E+00 | -4.845776E-02 | 2.790241E-02 |
| 42 | 0.000000E+00 | -4.106587E-02 | 2.715374E-02 |
| 51 | 0.000000E+00 | -2.222715E-01 | 1.247686E-02 |
| 52 | 0.000000E+00 | -2.261211E-01 | 7.673550E-02 |
| 61 | 0.000000E+00 | -4.824502E-02 | 1.813682E-02 |
| 62 | 0.000000E+00 | -6.851193E-02 | 2.185126E-02 |
| Surface | $a_8$ | $a_{10}$ | $a_{12}$ |
| 31 | -3.090456E-04 | 0.000000E+00 | 0.000000E+00 |
| 32 | -2.966141E-04 | 0.000000E+00 | 0.000000E+00 |
| 41 | -4.927430E-03 | 0.000000E+00 | 0.000000E+00 |
| 42 | -2.534833E-03 | 0.000000E+00 | 0.000000E+00 |
| 51 | 9.410577E-03 | -1.180427E-02 | 0.000000E+00 |
| 52 | -2.194639E-02 | 2.839614E-03 | 0.000000E+00 |
| 61 | -4.454730E-03 | 5.808116E-04 | -3.513319E-05 |
| 62 | -4.169980E-03 | 4.129917E-04 | -1.979216E-05 |

FIG.13

| third embodiment |||||||
|---|---|---|---|---|---|---|
| Total focal length =7.070 mm, half field of view=18.678°, F number=2.399, Total length =6.380 mm, Image height=2.400 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.766 | | | |
| First lens element3 | Object-side surface31 | 1.758 | 1.008 | 1.545 | 55.987 | 3.225 |
| | image-side surface32 | 575.438 | 0.073 | | | |
| Second lens element4 | Object-side surface41 | 2.232 | 0.181 | 1.642 | 22.409 | -4.657 |
| | image-side surface42 | 1.241 | 2.239 | | | |
| Third lens element5 | Object-side surface51 | -6.218 | 0.500 | 1.642 | 22.409 | 8.051 |
| | image-side surface52 | -2.925 | 0.088 | | | |
| Fourth lens element6 | Object-side surface61 | -3.673 | 0.334 | 1.535 | 55.690 | -5.475 |
| | image-side surface62 | 15.141 | 0.400 | | | |
| Filter9 | Object-side surface91 | Infinity | 0.210 | 1.517 | 64.167 | |
| | image-side surface92 | Infinity | 1.347 | | | |
| | Image plane100 | Infinity | 0.000 | | | |

FIG.16

| Surface | K | $a_4$ | $a_6$ |
|---|---|---|---|
| 31 | 0.000000E+00 | -5.553984E-03 | 5.929521E-03 |
| 32 | 0.000000E+00 | 3.479411E-02 | -3.270452E-02 |
| 41 | 0.000000E+00 | -9.416523E-02 | -2.017589E-02 |
| 42 | 0.000000E+00 | -1.578985E-01 | 1.242083E-02 |
| 51 | 0.000000E+00 | -7.098611E-03 | -3.141413E-02 |
| 52 | 0.000000E+00 | 3.502426E-02 | -4.422711E-02 |
| 61 | 0.000000E+00 | -9.864910E-02 | 2.812385E-02 |
| 62 | 0.000000E+00 | -1.357230E-01 | 5.079558E-02 |
| Surface | $a_8$ | $a_{10}$ | $a_{12}$ |
| 31 | -2.453379E-03 | -4.933759E-05 | 0.000000E+00 |
| 32 | 1.308462E-02 | -1.728746E-03 | 0.000000E+00 |
| 41 | 3.774968E-02 | -9.447684E-03 | 0.000000E+00 |
| 42 | 2.487674E-02 | -8.763898E-03 | 0.000000E+00 |
| 51 | -5.803888E-03 | -7.718616E-04 | 0.000000E+00 |
| 52 | -7.971029E-03 | 5.199190E-03 | 0.000000E+00 |
| 61 | -1.982623E-02 | 1.044253E-02 | -1.476476E-03 |
| 62 | -7.390909E-03 | -1.162670E-03 | 2.918639E-04 |

FIG.17

| fourth embodiment |||||||
|---|---|---|---|---|---|---|
| Total focal length =7.070 mm, half field of view=18.684°, F number=2.390, Total length =6.380 mm, Image height=2.400 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.671 | | | |
| First lens element3 | Object-side surface31 | 1.874 | 0.945 | 1.545 | 55.987 | 3.385 |
| | image-side surface32 | -116.976 | 0.074 | | | |
| Second lens element4 | Object-side surface41 | 4.762 | 0.230 | 1.642 | 22.409 | -5.976 |
| | image-side surface42 | 2.094 | 2.605 | | | |
| Third lens element5 | Object-side surface51 | -5.910 | 0.836 | 1.642 | 22.409 | 11.370 |
| | image-side surface52 | -3.460 | 0.148 | | | |
| Fourth lens element6 | Object-side surface61 | -2.069 | 0.329 | 1.535 | 55.690 | -4.767 |
| | image-side surface62 | -11.412 | 0.400 | | | |
| Filter9 | Object-side surface91 | Infinity | 0.210 | 1.517 | 64.167 | |
| | image-side surface92 | Infinity | 0.604 | | | |
| | Image plane100 | Infinity | 0.000 | | | |

FIG.20

| Surface | K | $a_4$ | $a_6$ |
|---|---|---|---|
| 31 | 0.000000E+00 | -6.018369E-03 | 5.321605E-03 |
| 32 | 0.000000E+00 | 1.369106E-02 | -1.830079E-02 |
| 41 | 0.000000E+00 | -6.589472E-03 | -3.281700E-02 |
| 42 | 0.000000E+00 | -1.557072E-02 | 7.866769E-03 |
| 51 | 0.000000E+00 | -3.809440E-02 | -2.410032E-02 |
| 52 | 0.000000E+00 | -8.529294E-03 | -3.114921E-04 |
| 61 | 0.000000E+00 | -2.936066E-02 | 6.160231E-02 |
| 62 | 0.000000E+00 | -6.696173E-02 | 3.015141E-02 |
| Surface | $a_8$ | $a_{10}$ | $a_{12}$ |
| 31 | -2.799913E-03 | 8.100415E-05 | 0.000000E+00 |
| 32 | 8.991000E-03 | -1.348875E-03 | 0.000000E+00 |
| 41 | 2.941678E-02 | -5.976192E-03 | 0.000000E+00 |
| 42 | 6.447449E-03 | 5.019657E-03 | 0.000000E+00 |
| 51 | 1.334933E-03 | -3.877199E-03 | 0.000000E+00 |
| 52 | -1.403132E-02 | 3.482015E-03 | 0.000000E+00 |
| 61 | -3.853733E-02 | 1.029801E-02 | -8.567344E-04 |
| 62 | -5.709180E-03 | -5.994919E-05 | 7.064858E-05 |

FIG.21

| fifth embodiment ||||||
|---|---|---|---|---|---|---|
| Total focal length =7.070 mm, half field of view=18.322°, F number=2.377, Total length =6.380 mm, Image height=2.400 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.617 | | | |
| First lens element3 | Object-side surface31 | 1.970 | 0.898 | 1.545 | 55.987 | 3.810 |
| | image-side surface32 | 30.974 | 0.045 | | | |
| Second lens element4 | Object-side surface41 | 21.164 | 0.540 | 1.661 | 20.401 | -10.491 |
| | image-side surface42 | 5.201 | 1.784 | | | |
| Third lens element5 | Object-side surface51 | -1.922 | 0.283 | 1.545 | 55.987 | -10.514 |
| | image-side surface52 | -3.038 | 1.162 | | | |
| Fourth lens element6 | Object-side surface61 | -46.124 | 0.588 | 1.661 | 20.401 | -15.454 |
| | image-side surface62 | 13.325 | 0.400 | | | |
| Filter9 | Object-side surface91 | Infinity | 0.210 | 1.517 | 64.167 | |
| | image-side surface92 | Infinity | 0.470 | | | |
| | Image plane100 | Infinity | 0.000 | | | |

FIG.24

| Surface | K | $a_4$ | $a_6$ | $a_8$ | $a_{10}$ |
|---|---|---|---|---|---|
| 31 | 0.000000E+00 | -3.398645E-03 | 3.384160E-04 | -3.967881E-04 | 0.000000E+00 |
| 32 | 0.000000E+00 | -4.784935E-03 | -6.663991E-04 | 1.325713E-05 | 0.000000E+00 |
| 41 | 0.000000E+00 | -4.481955E-03 | -1.012843E-03 | -9.961936E-05 | 0.000000E+00 |
| 42 | 0.000000E+00 | 5.336766E-03 | -1.210988E-03 | -1.504696E-05 | 0.000000E+00 |
| 51 | 0.000000E+00 | -5.674658E-02 | -1.945643E-02 | -5.396176E-04 | 0.000000E+00 |
| 52 | 0.000000E+00 | -2.644589E-03 | -1.670865E-02 | 1.034554E-02 | 0.000000E+00 |
| 61 | 3.124681E-02 | -2.116021E-02 | 3.140061E-03 | 7.318662E-04 | -1.355654E-04 |
| 62 | -2.869410E+04 | -3.766078E-02 | 5.706698E-03 | 2.443148E-04 | -8.912402E-05 |

FIG.25

| sixth embodiment |||||| 
|---|---|---|---|---|---|
| Total focal length =7.070 mm, half field of view=18.125°, F number=2.369, Total length =6.384 mm, Image height=2.400 mm |||||| 
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.508 | | | |
| First lens element3 | Object-side surface31 | 2.194 | 0.874 | 1.545 | 55.987 | 3.991 |
| | image-side surface32 | -282.573 | 0.093 | | | |
| Second lens element4 | Object-side surface41 | -9.971 | 0.589 | 1.661 | 20.401 | -14.530 |
| | image-side surface42 | 342.221 | 2.446 | | | |
| Third lens element5 | Object-side surface51 | -1.640 | 0.282 | 1.545 | 55.987 | -9.332 |
| | image-side surface52 | -2.565 | 0.735 | | | |
| Fourth lens element6 | Object-side surface61 | -18.543 | 0.365 | 1.661 | 20.401 | -11.311 |
| | image-side surface62 | 12.798 | 0.400 | | | |
| Filter9 | Object-side surface91 | Infinity | 0.210 | 1.517 | 64.167 | |
| | image-side surface92 | Infinity | 0.390 | | | |
| | Image plane100 | Infinity | 0.000 | | | |

FIG.28

| Surface | K | $a_4$ | $a_6$ | $a_8$ | $a_{10}$ |
|---|---|---|---|---|---|
| 31 | 0.000000E+00 | -7.828575E-03 | 1.802231E-03 | -1.096325E-03 | 0.000000E+00 |
| 32 | 0.000000E+00 | -3.750559E-02 | 1.221866E-02 | -1.319360E-03 | 0.000000E+00 |
| 41 | 0.000000E+00 | -2.375832E-02 | 1.185786E-02 | -1.538182E-03 | 0.000000E+00 |
| 42 | 0.000000E+00 | 5.867540E-03 | 2.816927E-03 | -1.376823E-03 | 0.000000E+00 |
| 51 | 0.000000E+00 | -4.804994E-02 | -8.066447E-03 | 4.170203E-02 | 0.000000E+00 |
| 52 | 0.000000E+00 | -2.745164E-02 | -1.761504E-02 | 1.161484E-02 | 0.000000E+00 |
| 61 | -1.636359E+02 | -1.974190E-02 | 3.380884E-03 | 1.993543E-04 | -4.130544E-05 |
| 62 | -1.197299E-03 | -3.853759E-02 | 5.679406E-03 | 4.509625E-04 | -1.018504E-04 |

FIG.29

| seventh embodiment |||||||
|---|---|---|---|---|---|---|
| Total focal length =7.067 mm, half field of view=18.338°, F number=2.400, Total length =6.379 mm, Image height=2.400 mm |||||||
| Lens element | Surface | Radius of curvature(mm) | Thickness(mm) | Refractive index | dispersion coefficient | Focal length(mm) |
| Object |  | Infinity | 1E+10 |  |  |  |
| Aperture2 |  | Infinity | -0.673 |  |  |  |
| First lens element3 | Object-side surface31 | 1.882 | 0.969 | 1.545 | 55.987 | 3.217 |
|  | image-side surface32 | -21.699 | 0.048 |  |  |  |
| Second lens element4 | Object-side surface41 | -26.988 | 0.237 | 1.642 | 22.409 | -6.128 |
|  | image-side surface42 | 4.666 | 1.352 |  |  |  |
| Third lens element5 | Object-side surface51 | 2.616 | 0.436 | 1.535 | 55.690 | -9.001 |
|  | image-side surface52 | 1.598 | 1.456 |  |  |  |
| Fourth lens element6 | Object-side surface61 | -16.001 | 0.751 | 1.642 | 22.409 | -48.858 |
|  | image-side surface62 | -32.983 | 0.400 |  |  |  |
| Filter9 | Object-side surface91 | Infinity | 0.210 | 1.517 | 64.167 |  |
|  | image-side surface92 | Infinity | 0.519 |  |  |  |
|  | Image plane100 | Infinity | 0.000 |  |  |  |

FIG.32

| Surface | K | $a_4$ | $a_6$ |
|---|---|---|---|
| 31 | 0.000000E+00 | -5.852599E-03 | 1.726325E-03 |
| 32 | 0.000000E+00 | 5.767363E-03 | 6.466793E-03 |
| 41 | 0.000000E+00 | 8.818280E-03 | 4.612579E-03 |
| 42 | 0.000000E+00 | 1.041371E-03 | 5.905986E-03 |
| 51 | 0.000000E+00 | -9.849064E-02 | -5.273695E-02 |
| 52 | 0.000000E+00 | -8.371156E-02 | -6.034968E-02 |
| 61 | 0.000000E+00 | -3.879795E-02 | 2.144711E-02 |
| 62 | 0.000000E+00 | -6.860174E-02 | 2.135773E-02 |
| Surface | $a_8$ | $a_{10}$ | $a_{12}$ |
| 31 | -1.400553E-03 | 2.959844E-04 | 0.000000E+00 |
| 32 | -5.391722E-03 | 1.032902E-03 | 0.000000E+00 |
| 41 | -6.959525E-03 | 1.612118E-03 | 0.000000E+00 |
| 42 | -8.479538E-03 | 2.875642E-03 | 0.000000E+00 |
| 51 | -2.059875E-02 | 3.411976E-02 | -1.851384E-02 |
| 52 | 2.954451E-02 | -5.019010E-03 | -6.433284E-04 |
| 61 | -5.151359E-03 | 5.803677E-04 | -2.151899E-05 |
| 62 | -4.018450E-03 | 4.134886E-04 | -1.585447E-05 |

FIG.33

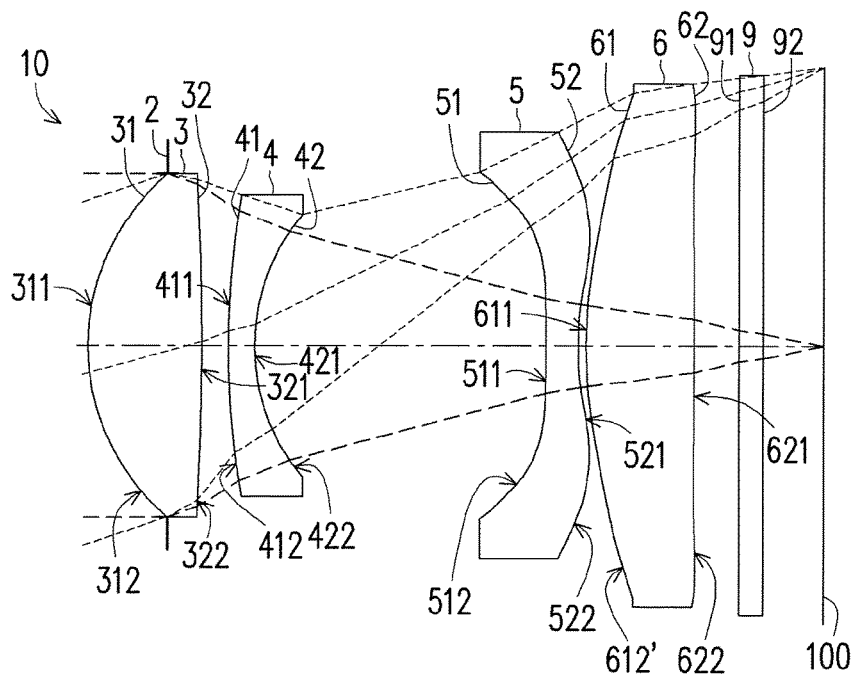
FIG.34
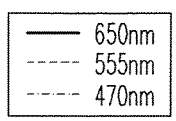
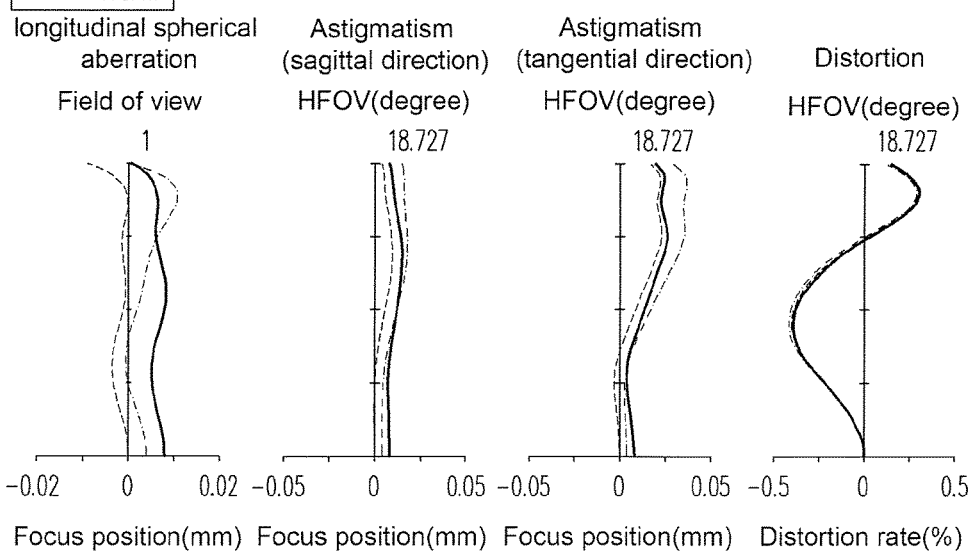
FIG.35A  FIG.35B  FIG.35C  FIG.35D

| Eighth embodiment | | | | | | |
|---|---|---|---|---|---|---|
| Total focal length =7.070 mm, half field of view=18.727°, F number=2.393, Total length =6.380 mm, Image height=2.400 mm | | | | | | |
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.684 | | | |
| First lens element3 | Object-side surface31 | 1.849 | 0.987 | 1.545 | 55.987 | 3.105 |
| | image-side surface32 | -16.611 | 0.235 | | | |
| Second lens element4 | Object-side surface41 | 7.030 | 0.230 | 1.642 | 22.409 | -4.204 |
| | image-side surface42 | 1.937 | 2.522 | | | |
| Third lens element5 | Object-side surface51 | 44.043 | 0.278 | 1.535 | 55.690 | -4.516 |
| | image-side surface52 | 2.292 | 0.066 | | | |
| Fourth lens element6 | Object-side surface61 | 3.573 | 0.930 | 1.642 | 22.409 | 8.178 |
| | image-side surface62 | 9.867 | 0.400 | | | |
| Filter9 | Object-side surface91 | Infinity | 0.210 | 1.517 | 64.167 | |
| | image-side surface92 | Infinity | 0.522 | | | |
| | Image plane100 | Infinity | 0.000 | | | |

FIG.36

| Surface | K | $a_4$ | $a_6$ |
|---|---|---|---|
| 31 | 0.000000E+00 | -2.885813E-03 | 1.188373E-03 |
| 32 | 0.000000E+00 | 2.299053E-02 | -1.647350E-02 |
| 41 | 0.000000E+00 | -1.584379E-03 | -3.158238E-02 |
| 42 | 0.000000E+00 | -8.970142E-03 | 3.644487E-03 |
| 51 | 0.000000E+00 | -1.446872E-01 | 2.365599E-03 |
| 52 | 0.000000E+00 | -1.634377E-01 | 2.575253E-02 |
| 61 | 0.000000E+00 | -5.927639E-02 | 2.672376E-02 |
| 62 | 0.000000E+00 | -6.516754E-02 | 3.379270E-02 |
| Surface | $a_8$ | $a_{10}$ | $a_{12}$ |
| 31 | -9.945374E-04 | -2.430557E-04 | 0.000000E+00 |
| 32 | 5.884696E-03 | -7.096110E-04 | 0.000000E+00 |
| 41 | 3.079911E-02 | -7.201955E-03 | 0.000000E+00 |
| 42 | 1.179195E-02 | 8.910290E-03 | 0.000000E+00 |
| 51 | 1.678263E-03 | 9.030261E-04 | 0.000000E+00 |
| 52 | -1.637630E-03 | -4.143958E-05 | 0.000000E+00 |
| 61 | -6.702880E-03 | 8.650505E-04 | -4.694387E-05 |
| 62 | -8.367287E-03 | 1.006446E-03 | -4.976891E-05 |

FIG.37

| Ninth embodiment ||||||||
| --- | --- | --- | --- | --- | --- | --- |
| Total focal length =7.070 mm, half field of view=18.663°, F number=2.389, Total length =6.379 mm, Image height=2.400 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.610 | | | |
| First lens element3 | Object-side surface31 | 2.017 | 0.972 | 1.545 | 55.987 | 3.036 |
| | image-side surface32 | -7.733 | 0.044 | | | |
| Second lens element4 | Object-side surface41 | -7.767 | 0.230 | 1.642 | 22.409 | -6.114 |
| | image-side surface42 | 8.164 | 2.249 | | | |
| Third lens element5 | Object-side surface51 | -2.756 | 0.726 | 1.545 | 55.987 | -12.112 |
| | image-side surface52 | -5.162 | 0.411 | | | |
| Fourth lens element6 | Object-side surface61 | -5.124 | 0.746 | 1.545 | 55.987 | -9.466 |
| | image-side surface62 | -589.206 | 0.400 | | | |
| Filter9 | Object-side surface91 | Infinity | 0.210 | 1.517 | 64.167 | |
| | image-side surface92 | Infinity | 0.391 | | | |
| | Image plane100 | Infinity | 0.000 | | | |

FIG.40

| Surface | K | $a_4$ | $a_6$ |
|---|---|---|---|
| 31 | 0.000000E+00 | -8.722851E-03 | 7.399055E-03 |
| 32 | 0.000000E+00 | -7.396525E-03 | 1.873373E-02 |
| 41 | 0.000000E+00 | -1.121146E-02 | 3.113518E-02 |
| 42 | 0.000000E+00 | -1.060739E-02 | 3.444379E-02 |
| 51 | 0.000000E+00 | -5.574919E-02 | -6.366599E-02 |
| 52 | 0.000000E+00 | -3.435106E-02 | -1.138353E-02 |
| 61 | 0.000000E+00 | -7.112048E-02 | 2.689540E-02 |
| 62 | 0.000000E+00 | -8.370542E-02 | 2.822901E-02 |
| Surface | $a_8$ | $a_{10}$ | $a_{12}$ |
| 31 | -4.718327E-03 | 1.111398E-03 | 0.000000E+00 |
| 32 | -5.424996E-03 | 2.787203E-04 | 0.000000E+00 |
| 41 | -1.269939E-02 | 1.419259E-03 | 0.000000E+00 |
| 42 | -2.076978E-02 | 4.652586E-03 | 0.000000E+00 |
| 51 | 4.340992E-02 | -1.826329E-02 | 0.000000E+00 |
| 52 | 1.464754E-02 | -2.357548E-03 | 0.000000E+00 |
| 61 | -3.073377E-04 | -7.138085E-04 | 6.713514E-05 |
| 62 | -6.271165E-03 | 6.702117E-04 | -2.083982E-05 |

FIG.41

| Tenth embodiment ||||||||
|---|---|---|---|---|---|---|
| Total focal length =9.000 mm, half field of view=18.021°, F number=2.391, Total length =7.952 mm, Image height=2.944 mm ||||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.843 | | | |
| First lens element3 | Object-side surface31 | 2.476 | 1.374 | 1.545 | 55.987 | 3.758 |
| | image-side surface32 | -9.660 | 0.178 | | | |
| Second lens element4 | Object-side surface41 | -8.476 | 0.240 | 1.642 | 22.409 | -6.232 |
| | image-side surface42 | 7.783 | 2.129 | | | |
| Fifth Lens element7 | Object-side surface71 | -11.805 | 0.295 | 1.535 | 55.690 | -28.213 |
| | image-side surface72 | -54.080 | 1.423 | | | |
| Third lens element5 | Object-side surface51 | -3.265 | 0.321 | 1.545 | 55.987 | -5.624 |
| | image-side surface52 | 53.821 | 0.049 | | | |
| Fourth lens element6 | Object-side surface61 | 8.888 | 0.831 | 1.642 | 22.409 | 13.278 |
| | image-side surface62 | -251.045 | 0.400 | | | |
| Filter9 | Object-side surface91 | Infinity | 0.210 | 1.517 | 64.167 | |
| | image-side surface92 | Infinity | 0.500 | | | |
| | Image plane100 | Infinity | 0.000 | | | |

FIG.44

| Surface | K | $a_4$ | $a_6$ | $a_8$ |
|---|---|---|---|---|
| 31 | 0.000000E+00 | -7.489541E-04 | 9.337322E-05 | -1.052282E-04 |
| 32 | 0.000000E+00 | 1.184819E-02 | -1.320674E-03 | 3.052808E-04 |
| 41 | 0.000000E+00 | 1.257896E-02 | 8.563498E-04 | -1.152542E-03 |
| 42 | 0.000000E+00 | 4.932233E-03 | 1.889021E-03 | -5.320684E-06 |
| 71 | 0.000000E+00 | -6.392603E-02 | 1.511718E-02 | -4.327186E-03 |
| 72 | 0.000000E+00 | -4.324263E-02 | 1.702888E-02 | 1.533290E-03 |
| 51 | 1.058660E-01 | 5.741333E-03 | 2.491136E-03 | -3.076014E-05 |
| 52 | 0.000000E+00 | -7.297549E-03 | 1.580213E-04 | 4.694533E-05 |
| 61 | 4.447768E+00 | -3.163618E-02 | 4.483542E-03 | -4.129700E-04 |
| 62 | 0.000000E+00 | -3.297237E-02 | 4.328230E-03 | -3.154601E-04 |
| Surface | $a_{10}$ | $a_{12}$ | $a_{14}$ | $a_{16}$ |
| 31 | 4.951313E-05 | -5.217396E-06 | 0.000000E+00 | 0.000000E+00 |
| 32 | -9.640060E-05 | 1.075975E-05 | 0.000000E+00 | 0.000000E+00 |
| 41 | 1.878164E-04 | 1.819630E-05 | -3.967366E-06 | 0.000000E+00 |
| 42 | -1.332207E-04 | -1.123328E-05 | 3.002372E-05 | 0.000000E+00 |
| 71 | 1.658321E-03 | -5.901483E-04 | 0.000000E+00 | 0.000000E+00 |
| 72 | -1.258796E-03 | 1.503700E-04 | 0.000000E+00 | 0.000000E+00 |
| 51 | -2.184580E-05 | 1.519806E-06 | -3.126418E-08 | 0.000000E+00 |
| 52 | -3.032920E-05 | 1.405184E-06 | -6.338142E-09 | 0.000000E+00 |
| 61 | 1.846931E-06 | 2.065052E-07 | 6.128636E-08 | 1.002474E-08 |
| 62 | 2.418451E-06 | 8.078747E-07 | 8.472300E-09 | 1.750812E-09 |

FIG.45

| Eleventh embodiment | | | | | | |
|---|---|---|---|---|---|---|
| Total focal length =9.000 mm, half field of view=18.083°, F number=2.400, Total length =8.178 mm, Image height=2.944 mm | | | | | | |
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.814 | | | |
| First lens element3 | Object-side surface31 | 2.480 | 1.470 | 1.545 | 55.987 | 3.567 |
| | image-side surface32 | -7.197 | 0.052 | | | |
| Second lens element4 | Object-side surface41 | -8.885 | 0.232 | 1.642 | 22.409 | -6.513 |
| | image-side surface42 | 8.106 | 1.785 | | | |
| Fifth Lens element7 | Object-side surface71 | -11.256 | 0.297 | 1.545 | 55.987 | -7.884 |
| | image-side surface72 | 7.042 | 0.251 | | | |
| Third lens element5 | Object-side surface51 | -30.441 | 0.706 | 1.642 | 22.409 | 21.608 |
| | image-side surface52 | -9.671 | 1.407 | | | |
| Fourth lens element6 | Object-side surface61 | -6.819 | 0.868 | 1.545 | 55.987 | -13.357 |
| | image-side surface62 | -108.961 | 0.400 | | | |
| Filter9 | Object-side surface91 | Infinity | 0.210 | 1.517 | 64.167 | |
| | image-side surface92 | Infinity | 0.500 | | | |
| | Image plane100 | Infinity | 0.000 | | | |

FIG.48

| Surface | K | $a_4$ | $a_6$ | $a_8$ | $a_{10}$ |
|---|---|---|---|---|---|
| 31 | 0.000000E+00 | -1.293610E-03 | -2.770561E-05 | -9.066532E-05 | 0.000000E+00 |
| 32 | 0.000000E+00 | 4.115178E-03 | 9.000512E-04 | -1.475975E-04 | 0.000000E+00 |
| 41 | 0.000000E+00 | -3.299046E-03 | 2.793504E-03 | -4.124830E-04 | 0.000000E+00 |
| 42 | 0.000000E+00 | -5.954427E-03 | 1.460859E-03 | -3.306155E-04 | 0.000000E+00 |
| 71 | 0.000000E+00 | -3.146653E-02 | -1.288319E-02 | -7.363182E-04 | 0.000000E+00 |
| 72 | 0.000000E+00 | 1.015711E-02 | -1.143976E-02 | 8.314309E-04 | 0.000000E+00 |
| 51 | 0.000000E+00 | -1.981287E-03 | 4.750896E-03 | -2.475791E-03 | 0.000000E+00 |
| 52 | 0.000000E+00 | -1.185943E-02 | 2.693246E-03 | 1.014282E-04 | 0.000000E+00 |
| 61 | 0.000000E+00 | -2.304034E-02 | 4.390218E-03 | -1.626058E-04 | -2.791000E-06 |
| 62 | 0.000000E+00 | -3.215209E-02 | 4.185876E-03 | -3.883922E-04 | 1.619316E-05 |

FIG.49

| Twelfth embodiment |||||||
|---|---|---|---|---|---|---|
| Total focal length =9.000 mm, half field of view=18.046°, F number=2.396, Total length =8.044 mm, Image height=2.944 mm |||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.878 | | | |
| First lens element3 | Object-side surface31 | 2.390 | 1.451 | 1.545 | 55.987 | 3.670 |
| | image-side surface32 | -9.772 | 0.050 | | | |
| Second lens element4 | Object-side surface41 | -14.483 | 0.237 | 1.642 | 22.409 | -6.629 |
| | image-side surface42 | 6.136 | 1.717 | | | |
| Fifth Lens element7 | Object-side surface71 | -6.392 | 0.296 | 1.545 | 55.987 | -13.305 |
| | image-side surface72 | -53.904 | 1.461 | | | |
| Third lens element5 | Object-side surface51 | -8.327 | 0.848 | 1.661 | 20.401 | 10.762 |
| | image-side surface52 | -4.010 | 0.214 | | | |
| Fourth lens element6 | Object-side surface61 | -4.272 | 0.416 | 1.535 | 55.690 | -6.067 |
| | image-side surface62 | 14.143 | 0.400 | | | |
| Filter9 | Object-side surface91 | Infinity | 0.210 | 1.517 | 64.167 | |
| | image-side surface92 | Infinity | 0.743 | | | |
| | Image plane100 | Infinity | 0.000 | | | |

FIG.52

| Surface | K | $a_4$ | $a_6$ |
|---|---|---|---|
| 31 | 0.000000E+00 | -1.708735E-03 | 3.274179E-04 |
| 32 | 0.000000E+00 | 8.251905E-03 | 5.282691E-05 |
| 41 | 0.000000E+00 | 3.507708E-03 | 1.089558E-03 |
| 42 | 0.000000E+00 | -1.006291E-03 | 2.376418E-03 |
| 71 | 1.622596E+01 | -1.725669E-02 | 1.206422E-03 |
| 72 | -7.270807E+02 | -8.308592E-03 | 6.507173E-03 |
| 51 | -7.880525E+01 | -2.354035E-02 | 7.250248E-04 |
| 52 | -5.252697E+01 | -2.382066E-02 | 7.603847E-05 |
| 61 | -9.466210E+01 | -2.549802E-02 | 7.782612E-04 |
| 62 | 2.360683E+01 | -2.829545E-02 | 3.447082E-03 |
| Surface | $a_8$ | $a_{10}$ | $a_{12}$ |
| 31 | -1.244912E-04 | 1.280626E-05 | 0.000000E+00 |
| 32 | -1.028364E-04 | -1.414366E-06 | 0.000000E+00 |
| 41 | -2.066889E-04 | -5.228860E-06 | 0.000000E+00 |
| 42 | -5.203456E-04 | 1.075689E-04 | 0.000000E+00 |
| 71 | -4.011312E-04 | -4.845793E-04 | 0.000000E+00 |
| 72 | -1.514714E-03 | 1.632837E-04 | 0.000000E+00 |
| 51 | -6.868434E-05 | 2.638897E-05 | 0.000000E+00 |
| 52 | -4.834964E-05 | 4.212527E-05 | 0.000000E+00 |
| 61 | 1.786075E-04 | -7.326023E-06 | 1.122922E-06 |
| 62 | -4.496736E-04 | 2.444202E-05 | -7.809910E-07 |

FIG.53

| Thirteenth embodiment ||||||
|---|---|---|---|---|---|
| Total focal length =9.000 mm, half field of view=17.924°, F number=2.397, Total length =8.176 mm, Image height=2.944 mm ||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.902 | | | |
| First lens element3 | Object-side surface31 | 2.354 | 1.463 | 1.545 | 55.987 | 3.744 |
| | image-side surface32 | -12.161 | 0.068 | | | |
| Second lens element4 | Object-side surface41 | -20.078 | 0.238 | 1.642 | 22.409 | -6.594 |
| | image-side surface42 | 5.446 | 1.540 | | | |
| Fifth Lens element7 | Object-side surface71 | -5.408 | 0.463 | 1.545 | 55.987 | -13.024 |
| | image-side surface72 | -23.233 | 1.440 | | | |
| Third lens element5 | Object-side surface51 | -69.109 | 0.548 | 1.661 | 20.401 | 61.508 |
| | image-side surface52 | -25.809 | 0.170 | | | |
| Fourth lens element6 | Object-side surface61 | -29.424 | 0.409 | 1.535 | 55.690 | -20.484 |
| | image-side surface62 | 17.631 | 0.400 | | | |
| Filter9 | Object-side surface91 | Infinity | 0.210 | 1.517 | 64.167 | |
| | image-side surface92 | Infinity | 1.225 | | | |
| | Image plane100 | Infinity | 0.000 | | | |

FIG.56

| Surface | K | $a_4$ | $a_6$ |
|---|---|---|---|
| 31 | 0.000000E+00 | -1.704676E-03 | 4.908152E-04 |
| 32 | 0.000000E+00 | 5.192363E-03 | 3.028663E-04 |
| 41 | 0.000000E+00 | 1.328260E-03 | 9.856375E-04 |
| 42 | 0.000000E+00 | 7.901943E-04 | 1.825948E-03 |
| 71 | 1.138265E+01 | -4.346328E-03 | -5.954809E-03 |
| 72 | 1.486260E+02 | -1.428866E-03 | 5.525668E-03 |
| 51 | 1.678054E+02 | -3.198983E-02 | 4.876817E-04 |
| 52 | 2.028506E+01 | -4.517485E-02 | 2.775297E-03 |
| 61 | 8.579803E+01 | -3.496141E-02 | 1.237954E-03 |
| 62 | 4.181267E+01 | -1.859263E-02 | 2.049010E-04 |
| Surface | $a_8$ | $a_{10}$ | $a_{12}$ |
| 31 | -1.764680E-04 | 1.753363E-05 | 0.000000E+00 |
| 32 | -1.225361E-04 | 1.061604E-05 | 0.000000E+00 |
| 41 | -1.405052E-04 | -8.846715E-07 | 0.000000E+00 |
| 42 | -3.902409E-04 | 9.709379E-05 | 0.000000E+00 |
| 71 | 4.244028E-03 | -1.423908E-03 | 0.000000E+00 |
| 72 | -6.615819E-04 | 8.659105E-05 | 0.000000E+00 |
| 51 | 5.749523E-04 | -8.088317E-06 | 0.000000E+00 |
| 52 | 2.515804E-04 | 2.104501E-05 | 0.000000E+00 |
| 61 | 3.240496E-04 | 7.491570E-06 | -5.720275E-07 |
| 62 | -2.268607E-04 | 3.664142E-05 | -1.846125E-06 |

FIG.57

| Fourteenth embodiment | | | | | | |
|---|---|---|---|---|---|---|
| Total focal length =9.000 mm, half field of view=18.045°, F number=2.394, Total length =8.173 mm, Image height=2.944 mm | | | | | | |
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.815 | | | |
| First lens element3 | Object-side surface31 | 2.503 | 1.469 | 1.545 | 55.987 | 3.443 |
| | image-side surface32 | -5.998 | 0.050 | | | |
| Second lens element4 | Object-side surface41 | -7.814 | 0.384 | 1.642 | 22.409 | -5.478 |
| | image-side surface42 | 6.617 | 1.214 | | | |
| Fifth Lens element7 | Object-side surface71 | 3.878 | 0.295 | 1.545 | 55.987 | -6.093 |
| | image-side surface72 | 1.743 | 0.239 | | | |
| Third lens element5 | Object-side surface51 | 4.540 | 0.438 | 1.642 | 22.409 | 10.144 |
| | image-side surface52 | 14.151 | 1.882 | | | |
| Fourth lens element6 | Object-side surface61 | -9.562 | 0.850 | 1.545 | 55.987 | -15.397 |
| | image-side surface62 | 72.063 | 0.400 | | | |
| Filter9 | Object-side surface91 | Infinity | 0.210 | 1.517 | 64.167 | |
| | image-side surface92 | Infinity | 0.740 | | | |
| | Image plane100 | Infinity | 0.000 | | | |

FIG.60

| Surface | K | $a_4$ | $a_6$ | $a_8$ | $a_{10}$ |
|---|---|---|---|---|---|
| 31 | 0.000000E+00 | -1.518907E-03 | 1.655257E-04 | -3.507644E-05 | 0.000000E+00 |
| 32 | 0.000000E+00 | 1.576469E-02 | -2.264435E-03 | 1.980122E-04 | 0.000000E+00 |
| 41 | 0.000000E+00 | 4.172385E-03 | -1.244411E-04 | 2.906804E-05 | 0.000000E+00 |
| 42 | 0.000000E+00 | -1.271461E-02 | 2.488256E-03 | -2.019746E-04 | 0.000000E+00 |
| 71 | 0.000000E+00 | -1.098631E-01 | 2.319786E-02 | -4.650135E-03 | 0.000000E+00 |
| 72 | 0.000000E+00 | -1.452199E-01 | 4.398776E-02 | -1.080361E-02 | 0.000000E+00 |
| 51 | 0.000000E+00 | -4.821918E-02 | 3.338782E-02 | -8.144514E-03 | 0.000000E+00 |
| 52 | 0.000000E+00 | -2.755995E-02 | 2.528267E-02 | -4.752576E-03 | 0.000000E+00 |
| 61 | 0.000000E+00 | -3.212960E-02 | 7.661121E-03 | -5.918558E-04 | 1.527200E-05 |
| 62 | 0.000000E+00 | -3.757047E-02 | 5.703924E-03 | -5.431315E-04 | 2.122289E-05 |

FIG.61

| Fifteenth embodiment | | | | | | |
|---|---|---|---|---|---|---|
| Total focal length =9.000 mm, half field of view=17.988°, F number=2.400, Total length =8.173 mm, Image height=2.944 mm | | | | | | |
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.823 | | | |
| First lens element3 | Object-side surface31 | 2.514 | 1.361 | 1.545 | 55.987 | 3.793 |
| | image-side surface32 | -9.533 | 0.295 | | | |
| Second lens element4 | Object-side surface41 | -7.574 | 0.259 | 1.642 | 22.409 | -5.786 |
| | image-side surface42 | 7.508 | 1.919 | | | |
| Fifth Lens element7 | Object-side surface71 | 532.136 | 0.298 | 1.535 | 55.690 | -80.130 |
| | image-side surface72 | 39.775 | 1.118 | | | |
| Third lens element5 | Object-side surface51 | -3.452 | 0.325 | 1.545 | 55.987 | -5.205 |
| | image-side surface52 | 16.671 | 0.049 | | | |
| Fourth lens element6 | Object-side surface61 | 6.828 | 1.142 | 1.642 | 22.409 | 9.989 |
| | image-side surface62 | -113.905 | 0.400 | | | |
| Filter9 | Object-side surface91 | Infinity | 0.210 | 1.517 | 64.167 | |
| | image-side surface92 | Infinity | 0.797 | | | |
| | Image plane100 | Infinity | 0.000 | | | |

FIG.64

| Surface | K | $a_4$ | $a_6$ | $a_8$ |
|---|---|---|---|---|
| 31 | 0.000000E+00 | -5.036376E-04 | 6.334067E-05 | -1.084530E-04 |
| 32 | 0.000000E+00 | 1.096569E-02 | -1.323736E-03 | 3.184048E-04 |
| 41 | 0.000000E+00 | 1.261610E-02 | 7.967355E-04 | -1.152328E-03 |
| 42 | 0.000000E+00 | 4.503896E-03 | 1.968958E-03 | -1.534486E-05 |
| 71 | 0.000000E+00 | -6.358760E-02 | 1.497116E-02 | -4.248702E-03 |
| 72 | 0.000000E+00 | -4.667388E-02 | 1.794989E-02 | 1.669917E-03 |
| 51 | 8.565418E-02 | 6.023529E-03 | 2.477020E-03 | -4.998359E-05 |
| 52 | 0.000000E+00 | -1.169583E-02 | -1.933645E-04 | 1.209668E-04 |
| 61 | 5.007297E+00 | -3.708614E-02 | 4.623943E-03 | -5.184164E-04 |
| 62 | 0.000000E+00 | -2.569661E-02 | 3.143175E-03 | -2.896905E-04 |
| Surface | $a_{10}$ | $a_{12}$ | $a_{14}$ | $a_{16}$ |
| 31 | 4.824272E-05 | -5.748946E-06 | 0.000000E+00 | 0.000000E+00 |
| 32 | -9.390775E-05 | 1.063815E-05 | 0.000000E+00 | 0.000000E+00 |
| 41 | 1.910322E-04 | 1.920320E-05 | -3.827846E-06 | 0.000000E+00 |
| 42 | -1.379341E-04 | -9.605327E-06 | 3.174913E-05 | 0.000000E+00 |
| 71 | 1.703027E-03 | -5.764328E-04 | 0.000000E+00 | 0.000000E+00 |
| 72 | -1.261894E-03 | 1.353826E-04 | 0.000000E+00 | 0.000000E+00 |
| 51 | -2.351895E-05 | 1.454359E-06 | -3.424745E-08 | 0.000000E+00 |
| 52 | -3.879542E-05 | 2.367074E-07 | 3.901156E-09 | 0.000000E+00 |
| 61 | -1.004705E-06 | 2.294091E-07 | 4.443554E-08 | 1.359629E-08 |
| 62 | 3.959215E-06 | 7.306465E-07 | -5.107462E-09 | 7.888100E-10 |

FIG.65

| Sixteenth embodiment ||||||
| --- | --- | --- | --- | --- | --- |
| Total focal length =9.000 mm, half field of view=18.081°, F number=2.391, Total length =8.178 mm, Image height=2.944 mm ||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.917 | | | |
| First lens element3 | Object-side surface31 | 2.331 | 1.500 | 1.545 | 55.987 | 3.529 |
| | image-side surface32 | -8.623 | 0.088 | | | |
| Second lens element4 | Object-side surface41 | -29.715 | 0.239 | 1.642 | 22.409 | -5.604 |
| | image-side surface42 | 4.145 | 1.049 | | | |
| Fifth Lens element7 | Object-side surface71 | -16.216 | 0.299 | 1.545 | 55.987 | -13.005 |
| | image-side surface72 | 12.727 | 1.394 | | | |
| Third lens element5 | Object-side surface51 | -16.029 | 0.498 | 1.661 | 20.401 | 11.245 |
| | image-side surface52 | -5.170 | 0.205 | | | |
| Fourth lens element6 | Object-side surface61 | -7.569 | 0.543 | 1.535 | 55.690 | -8.752 |
| | image-side surface62 | 12.681 | 0.400 | | | |
| Filter9 | Object-side surface91 | Infinity | 0.210 | 1.517 | 64.167 | |
| | image-side surface92 | Infinity | 1.753 | | | |
| | Image plane100 | Infinity | 0.000 | | | |

FIG.68

| Surface | K | $a_4$ | $a_6$ |
|---|---|---|---|
| 31 | 0.0000E+00 | -1.6909E-03 | 6.8930E-04 |
| 32 | 0.0000E+00 | 2.1330E-02 | -6.2572E-03 |
| 41 | 0.0000E+00 | 1.3898E-02 | -3.3129E-03 |
| 42 | 0.0000E+00 | 4.4891E-03 | 5.1404E-03 |
| 71 | 1.1189E+02 | 2.7950E-02 | -1.9713E-03 |
| 72 | 1.7332E+01 | 3.4971E-02 | -7.3828E-03 |
| 51 | -2.7898E+03 | -2.0248E-02 | -1.0096E-03 |
| 52 | -1.0616E+02 | -2.4410E-02 | -2.0282E-03 |
| 61 | -2.2385E+02 | -5.3228E-02 | 6.1313E-03 |
| 62 | 2.4468E+01 | -5.2455E-02 | 9.7783E-03 |
| Surface | $a_8$ | $a_{10}$ | $a_{12}$ |
| 31 | -1.8810E-04 | 2.6464E-06 | 0.0000E+00 |
| 32 | 1.4059E-03 | -1.3058E-04 | 0.0000E+00 |
| 41 | 1.8199E-03 | -3.2005E-04 | 0.0000E+00 |
| 42 | 2.0960E-03 | -1.0964E-04 | 0.0000E+00 |
| 71 | 7.4977E-03 | -2.6323E-03 | 0.0000E+00 |
| 72 | 1.2906E-02 | -3.6725E-03 | 0.0000E+00 |
| 51 | -1.8370E-03 | 4.7243E-04 | 0.0000E+00 |
| 52 | -2.6651E-04 | 1.8902E-04 | 0.0000E+00 |
| 61 | 6.6012E-05 | -1.6431E-05 | 3.7364E-06 |
| 62 | -1.6879E-03 | 1.5349E-04 | -7.8281E-06 |

FIG.69

| Seventeenth embodiment ||||||
|---|---|---|---|---|---|
| Total focal length =8.999 mm, half field of view=18.004°, F number=2.399, Total length =8.176 mm, Image height=2.944 mm ||||||
| Lens element | Surface | Radius of curvature(mm) | Thickness(mm) | Refractive index | dispersion coefficient | Focal length(mm) |
| Object | | Infinity | 1E+10 | | | |
| Aperture2 | | Infinity | -0.902 | | | |
| First lens element3 | Object-side surface31 | 2.351 | 1.461 | 1.545 | 55.987 | 3.732 |
| | image-side surface32 | -11.977 | 0.066 | | | |
| Second lens element4 | Object-side surface41 | -19.225 | 0.401 | 1.642 | 22.409 | -6.548 |
| | image-side surface42 | 5.482 | 1.450 | | | |
| Fifth Lens element7 | Object-side surface71 | -5.356 | 0.393 | 1.545 | 55.987 | -13.107 |
| | image-side surface72 | -21.813 | 1.318 | | | |
| Third lens element5 | Object-side surface51 | -9.577 | 0.646 | 1.661 | 20.401 | 138.790 |
| | image-side surface52 | -8.912 | 0.092 | | | |
| Fourth lens element6 | Object-side surface61 | -32.705 | 0.572 | 1.535 | 55.690 | -21.527 |
| | image-side surface62 | 17.968 | 0.400 | | | |
| Filter9 | Object-side surface91 | Infinity | 0.210 | 1.517 | 64.167 | |
| | image-side surface92 | Infinity | 1.167 | | | |
| | Image plane100 | Infinity | 0.000 | | | |

FIG.72

| Surface | K | $a_4$ | $a_6$ |
|---|---|---|---|
| 31 | 0.000000E+00 | -1.885668E-03 | 4.856302E-04 |
| 32 | 0.000000E+00 | 5.147996E-03 | 3.616970E-04 |
| 41 | 0.000000E+00 | 1.283857E-03 | 8.835306E-04 |
| 42 | 0.000000E+00 | 4.860772E-04 | 2.023349E-03 |
| 71 | 1.163210E+01 | -2.684945E-03 | -5.734230E-03 |
| 72 | 1.110450E+02 | 3.734480E-04 | 6.024154E-03 |
| 51 | 6.578471E+00 | -3.223922E-02 | 9.362267E-04 |
| 52 | -4.866945E-01 | -4.405820E-02 | 2.782776E-03 |
| 61 | 1.481559E+02 | -3.530530E-02 | 1.256108E-03 |
| 62 | 4.332967E+01 | -2.016975E-02 | 3.865966E-04 |
| Surface | $a_8$ | $a_{10}$ | $a_{12}$ |
| 31 | -1.711813E-04 | 1.628300E-05 | 0.000000E+00 |
| 32 | -1.331094E-04 | 4.684664E-06 | 0.000000E+00 |
| 41 | -1.498103E-04 | -7.058480E-06 | 0.000000E+00 |
| 42 | -4.593453E-04 | 1.011409E-04 | 0.000000E+00 |
| 71 | 4.175162E-03 | -1.682337E-03 | 0.000000E+00 |
| 72 | -8.624092E-04 | 2.167487E-06 | 0.000000E+00 |
| 51 | 5.924985E-04 | -1.075645E-05 | 0.000000E+00 |
| 52 | 2.531917E-04 | 2.945849E-05 | 0.000000E+00 |
| 61 | 3.372544E-04 | 8.839408E-06 | -5.604872E-07 |
| 62 | -2.391755E-04 | 3.521828E-05 | -2.105689E-06 |

FIG.73

| Embodiment | 1 | 2 | 3 | 4 | 5 | 6 | 7 | 8 | 9 |
|---|---|---|---|---|---|---|---|---|---|
| T1 | 0.958 | 0.917 | 1.008 | 0.945 | 0.898 | 0.874 | 0.969 | 0.987 | 0.972 |
| G12 | 0.166 | 0.219 | 0.073 | 0.074 | 0.045 | 0.093 | 0.048 | 0.235 | 0.044 |
| T2 | 0.230 | 0.229 | 0.181 | 0.230 | 0.540 | 0.589 | 0.237 | 0.230 | 0.230 |
| G23 | 1.746 | 2.303 | 2.239 | 2.605 | 1.784 | 2.446 | 1.352 | 2.522 | 2.249 |
| T3 | 0.278 | 0.253 | 0.500 | 0.836 | 0.283 | 0.282 | 0.436 | 0.278 | 0.726 |
| G34 | 1.000 | 0.507 | 0.088 | 0.148 | 1.162 | 0.735 | 1.456 | 0.066 | 0.411 |
| T4 | 0.968 | 0.855 | 0.334 | 0.329 | 0.588 | 0.365 | 0.751 | 0.930 | 0.746 |
| G4F | 0.400 | 0.400 | 0.400 | 0.400 | 0.400 | 0.400 | 0.400 | 0.400 | 0.400 |
| TF | 0.210 | 0.210 | 0.210 | 0.210 | 0.210 | 0.210 | 0.210 | 0.210 | 0.210 |
| GFP | 0.424 | 0.486 | 1.347 | 0.604 | 0.470 | 0.390 | 0.519 | 0.522 | 0.391 |
| BFL | 1.034 | 1.096 | 1.957 | 1.214 | 1.080 | 1.000 | 1.129 | 1.132 | 1.001 |
| ALT | 2.434 | 2.255 | 2.024 | 2.339 | 2.309 | 2.110 | 2.394 | 2.425 | 2.674 |
| AAG | 2.912 | 3.030 | 2.400 | 2.827 | 2.992 | 3.274 | 2.856 | 2.823 | 2.704 |
| TL | 5.347 | 5.285 | 4.423 | 5.166 | 5.301 | 5.384 | 5.250 | 5.249 | 5.379 |
| TTL | 6.380 | 6.380 | 6.380 | 6.380 | 6.381 | 6.384 | 6.379 | 6.380 | 6.379 |
| (TTL*F/#)/EFL | 2.163 | 2.163 | 2.165 | 2.157 | 2.145 | 2.140 | 2.166 | 2.159 | 2.156 |
| EFL/TTL | 1.108 | 1.108 | 1.108 | 1.108 | 1.108 | 1.107 | 1.108 | 1.108 | 1.108 |
| G23/T1 | 1.823 | 2.511 | 2.221 | 2.757 | 1.987 | 2.800 | 1.395 | 2.554 | 2.313 |
| EFL/T4 | 7.300 | 8.265 | 21.160 | 21.518 | 12.015 | 19.393 | 9.406 | 7.603 | 9.472 |
| G23/T4 | 1.802 | 2.693 | 6.701 | 7.929 | 3.032 | 6.710 | 1.800 | 2.712 | 3.013 |
| T3/G12 | 1.673 | 1.151 | 6.889 | 11.308 | 6.273 | 3.025 | 9.017 | 1.183 | 16.525 |
| ALT/G23 | 1.394 | 0.979 | 0.904 | 0.898 | 1.294 | 0.862 | 1.770 | 0.962 | 1.189 |
| AAG/T1 | 3.042 | 3.303 | 2.381 | 2.991 | 3.332 | 3.748 | 2.947 | 2.859 | 2.781 |
| G23/BFL | 1.689 | 2.102 | 1.144 | 2.145 | 1.652 | 2.445 | 1.198 | 2.229 | 2.248 |
| AAG/T4 | 3.007 | 3.542 | 7.182 | 8.604 | 5.084 | 8.981 | 3.802 | 3.036 | 3.623 |
| EFL/T3 | 25.417 | 27.997 | 14.142 | 8.458 | 25.008 | 25.035 | 16.210 | 25.413 | 9.744 |
| EFL/TL | 1.322 | 1.338 | 1.598 | 1.369 | 1.334 | 1.313 | 1.346 | 1.347 | 1.314 |
| G23/T3 | 6.276 | 9.121 | 4.479 | 3.117 | 6.311 | 8.661 | 3.102 | 9.066 | 3.100 |
| G23/T2 | 7.585 | 10.049 | 12.338 | 11.343 | 3.304 | 4.152 | 5.701 | 10.980 | 9.791 |
| T2/G12 | 1.384 | 1.045 | 2.501 | 3.107 | 11.982 | 6.310 | 4.906 | 0.977 | 5.232 |
| T1/G12 | 5.759 | 4.183 | 13.891 | 12.784 | 19.922 | 9.357 | 20.045 | 4.198 | 22.146 |
| EFL/T2 | 30.717 | 30.847 | 38.960 | 30.781 | 13.092 | 12.001 | 29.789 | 30.777 | 30.774 |
| BFL/G12 | 6.218 | 4.995 | 26.967 | 16.429 | 23.965 | 10.714 | 23.341 | 4.811 | 22.787 |
| G23/G12 | 10.500 | 10.501 | 30.854 | 35.244 | 39.591 | 26.200 | 27.971 | 10.723 | 51.228 |
| T4/G12 | 5.825 | 3.900 | 4.604 | 4.445 | 13.057 | 3.905 | 15.539 | 3.953 | 17.000 |

FIG.74

| Embodiment | 10 | 11 | 12 | 13 | 14 | 15 | 16 | 17 |
|---|---|---|---|---|---|---|---|---|
| T1 | 1.374 | 1.470 | 1.451 | 1.463 | 1.469 | 1.361 | 1.500 | 1.461 |
| G12 | 0.178 | 0.052 | 0.050 | 0.068 | 0.050 | 0.295 | 0.088 | 0.066 |
| T2 | 0.240 | 0.232 | 0.237 | 0.238 | 0.384 | 0.259 | 0.239 | 0.401 |
| G23 | 3.848 | 2.334 | 3.475 | 3.443 | 1.749 | 3.335 | 2.742 | 3.162 |
| T3 | 0.321 | 0.706 | 0.848 | 0.548 | 0.438 | 0.325 | 0.498 | 0.646 |
| G34 | 0.049 | 1.407 | 0.214 | 0.170 | 1.882 | 0.049 | 0.205 | 0.092 |
| T4 | 0.831 | 0.868 | 0.416 | 0.409 | 0.850 | 1.142 | 0.543 | 0.572 |
| G4F | 0.400 | 0.400 | 0.400 | 0.400 | 0.400 | 0.400 | 0.400 | 0.400 |
| TF | 0.210 | 0.210 | 0.210 | 0.210 | 0.210 | 0.210 | 0.210 | 0.210 |
| GFP | 0.500 | 0.500 | 0.743 | 1.225 | 0.740 | 0.797 | 1.753 | 1.167 |
| BFL | 1.110 | 1.110 | 1.353 | 1.835 | 1.350 | 1.407 | 2.363 | 1.777 |
| ALT | 2.768 | 3.276 | 2.952 | 2.658 | 3.142 | 3.088 | 2.781 | 3.080 |
| AAG | 4.075 | 3.792 | 3.739 | 3.682 | 3.681 | 3.679 | 3.034 | 3.320 |
| TL | 6.842 | 7.068 | 6.691 | 6.340 | 6.822 | 6.766 | 5.815 | 6.399 |
| TTL | 7.952 | 8.178 | 8.044 | 8.176 | 8.173 | 8.173 | 8.178 | 8.176 |
| (TTL*F/#)/EFL | 2.113 | 2.181 | 2.142 | 2.177 | 2.174 | 2.179 | 2.172 | 2.179 |
| EFL/TTL | 1.132 | 1.100 | 1.119 | 1.101 | 1.101 | 1.101 | 1.100 | 1.101 |
| G23/T1 | 2.800 | 1.587 | 2.394 | 2.354 | 1.190 | 2.450 | 1.828 | 2.165 |
| EFL/T4 | 10.825 | 10.370 | 21.624 | 22.000 | 10.588 | 7.882 | 16.564 | 15.742 |
| G23/T4 | 4.628 | 2.689 | 8.349 | 8.417 | 2.057 | 2.920 | 5.046 | 5.531 |
| T3/G12 | 1.805 | 13.696 | 16.928 | 8.066 | 8.769 | 1.102 | 5.693 | 9.820 |
| ALT/G23 | 0.719 | 1.404 | 0.850 | 0.772 | 1.796 | 0.926 | 1.014 | 0.974 |
| AAG/T1 | 2.965 | 2.579 | 2.576 | 2.517 | 2.505 | 2.703 | 2.023 | 2.273 |
| G23/BFL | 3.467 | 2.102 | 2.568 | 1.876 | 1.295 | 2.370 | 1.160 | 1.779 |
| AAG/T4 | 4.901 | 4.369 | 8.983 | 9.000 | 4.330 | 3.222 | 5.584 | 5.807 |
| EFL/T3 | 28.000 | 12.755 | 10.610 | 16.414 | 20.527 | 27.665 | 18.059 | 13.932 |
| EFL/TL | 1.315 | 1.273 | 1.345 | 1.419 | 1.319 | 1.330 | 1.548 | 1.406 |
| G23/T3 | 11.971 | 3.307 | 4.096 | 6.280 | 3.989 | 10.250 | 5.501 | 4.895 |
| G23/T2 | 16.000 | 10.048 | 14.686 | 14.456 | 4.554 | 12.860 | 11.476 | 7.876 |
| T2/G12 | 1.351 | 4.508 | 4.722 | 3.504 | 7.681 | 0.879 | 2.729 | 6.103 |
| T1/G12 | 7.718 | 28.537 | 28.959 | 21.520 | 29.382 | 4.613 | 17.137 | 22.206 |
| EFL/T2 | 37.423 | 38.750 | 38.038 | 37.785 | 23.435 | 34.709 | 37.671 | 22.417 |
| BFL/G12 | 6.234 | 21.550 | 27.001 | 27.001 | 27.007 | 4.767 | 27.000 | 27.020 |
| G23/G12 | 21.610 | 45.297 | 69.342 | 50.656 | 34.976 | 11.301 | 31.321 | 48.070 |
| T4/G12 | 4.669 | 16.844 | 8.306 | 6.018 | 17.001 | 3.870 | 6.207 | 8.691 |

FIG.75

OPTICAL LENS ASSEMBLY

CROSS-REFERENCE TO RELATED APPLICATION

This application claims the priority benefit of China application serial no. 201610157110.8, filed on Mar. 18, 2016. The entirety of the above-mentioned patent application is hereby incorporated by reference herein and made a part of this specification.

BACKGROUND OF THE INVENTION

Field of the Invention

The invention relates to an optical lens, and particularly relates to an optical lens assembly.

Description of Related Art

In recent years, as use of portable electronic devices (e.g., mobile phones and digital cameras, etc.) becomes ubiquitous, techniques related to image modules have also been developed significantly, wherein the image module mainly includes an optical lens assembly, a module holder unit and a sensor, etc., and the demand for minimized image module increases due to a thinning and lightweight trend of mobile phones and digital cameras. As dimensions of a charged coupled device (CCD) and complementary metal-oxide semiconductor (CMOS) are reduced and significant progress is made in related technology, the length of the optical lens assembly in the image module is also required to be correspondingly reduced. However, in order to avoid decline of image capturing effect and image capturing quality, good optical performance should also be achieved while the total length of the optical lens assembly is shortened. The most important characteristics of the optical imaging lens are imaging quality and a volume thereof.

Specifications of portable electronic products change rapidly, and the optical lens assemblies serving as key components are also developed in diversified ways. Applications of the optical lens sets not only include image capturing and video recording, but also include environment monitoring, driving data recording, etc., and along with progress of image sensing technology, consumers have higher demand on imaging quality. Therefore, the design of the optical lens assemblies not only requires achieving good imaging quality and a smaller lens space, but also has to be considered improvement of field of view and the size of an aperture due to a dynamic and light inadequate environment.

However, regarding the design of the optical lens assemblies, in order to fabricate the optical lens assemblies with both characteristics of good imaging quality and miniaturization, it is not enough to purely scale down the lenses with good imaging quality, and a material property is also involved, and practical problems in production such as an assembling yield, etc., are also considered.

A technical difficulty for fabricating the miniaturized lens is obviously higher than that of the conventional lens, so that it is still a target of the industry, government and academia to produce the optical lens assembly complied with demands of consumer electronics and to keep improving the imaging quality thereof.

SUMMARY OF THE INVENTION

The invention provides an optical lens assembly having good optical performance while the length of lens system is reduced.

An embodiment of the invention provides an optical lens assembly including a first lens element, a second lens element, a third lens element, and a fourth lens element arranged in a sequence from an object side to an image side along an optical axis, and each of the first lens element to the fourth lens element includes an object-side surface that faces the object side and allows imaging rays to pass through as well as an image-side surface that faces the image side and allows the imaging rays to pass through. The first lens element has positive refracting power, and the object-side surface of the first lens element has a convex portion in a vicinity of the optical axis and a convex portion in a vicinity of a periphery. The second lens element has negative refracting power. The object-side surface of the third lens element has a concave portion in a vicinity of the periphery. The image-side surface of the fourth lens element has a convex portion in a vicinity of the periphery. The optical lens assembly satisfies: $(TTL \times F/\#)/EFL \leq 2.2$ and $1.1 \leq EFL/TTL \leq 1.3$, where TTL is a distance from the object-side surface of the first lens element to an image plane along the optical axis, F/# is an f-number of the optical lens assembly, and EFL is an effective focal length of the optical lens assembly.

An embodiment of the invention provides an optical lens assembly including a first lens element, a second lens element, a third lens element, and a fourth lens element arranged in a sequence from an object side to an image side along an optical axis, and each of the first lens element to the fourth lens element includes an object-side surface that faces the object side and allows imaging rays to pass through as well as an image-side surface that faces the image side and allows the imaging rays to pass through. The first lens element has positive refracting power, and the object-side surface of the first lens element has a convex portion in a vicinity of the optical axis and a convex portion in a vicinity of a periphery. The second lens element has negative refracting power. The object-side surface of the third lens element has a concave portion in a vicinity of the periphery. The image-side surface of the fourth lens element has a convex portion in a vicinity of the periphery. The optical lens assembly satisfies: $(TTL \times F/\#)/EFL \leq 2.2$, $1.1 \leq EFL/TLS \leq 1.6$, and $AAG > ALT$, where TTL is a distance from the object-side surface of the first lens element to an image plane along the optical axis, F/# is an f-number of the optical lens assembly, EFL is an effective focal length of the optical lens assembly, TL is a distance from the object-side surface of the first lens element to the image-side surface of the fourth lens element along the optical axis, AAG is a sum of a distance from the first lens element to the second lens element along the optical axis, a distance from the second lens element to the third lens element along the optical axis, and a distance from the third lens element to the fourth lens element along the optical axis, and ALT is a sum of thicknesses of the first lens element, the second lens element, the third lens element, and the fourth lens element along the optical axis.

Based on the above, advantageous effects of the optical lens assembly according to the embodiments of the invention are as follows. With the concave and convex shape design and arrangement of the object-side surface or image-side surface of the lens elements, under the circumstances where the length of the lens system is reduced, the optical lens assembly maintains good optical performance sufficient to overcome aberration and provides good image quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating a surface shape structure of a lens.

FIG. 2 is a schematic diagram illustrating surface shape concave and convex structures and a light focal point.

FIG. 3 is a schematic diagram illustrating a surface shape structure of a lens of a first example.

FIG. 4 is a schematic diagram illustrating a surface shape structure of a lens of a second example.

FIG. 5 is a schematic diagram illustrating a surface shape structure of a lens of a third example.

FIG. 8 shows detailed optical data pertaining to the optical lens assembly according to the first embodiment of the invention.

FIG. 9 shows aspheric parameters pertaining to the optical lens assembly according to the first embodiment of the invention.

FIG. 12 shows detailed optical data pertaining to the optical lens assembly according to the second embodiment of the invention.

FIG. 13 shows aspheric parameters pertaining to the optical lens assembly according to the second embodiment of the invention.

FIG. 16 shows detailed optical data pertaining to the optical lens assembly according to the third embodiment of the invention.

FIG. 17 shows aspheric parameters pertaining to the optical lens assembly according to the third embodiment of the invention.

FIG. 20 shows detailed optical data pertaining to the optical lens assembly according to the fourth embodiment of the invention.

FIG. 21 shows aspheric parameters pertaining to the optical lens assembly according to the fourth embodiment of the invention.

FIG. 24 shows detailed optical data pertaining to the optical lens assembly according to the fifth embodiment of the invention.

FIG. 25 shows aspheric parameters pertaining to the optical lens assembly according to the fifth embodiment of the invention.

FIG. 28 shows detailed optical data pertaining to the optical lens assembly according to the sixth embodiment of the invention.

FIG. 29 shows aspheric parameters pertaining to the optical lens assembly according to the sixth embodiment of the invention.

FIG. 32 shows detailed optical data pertaining to the optical lens assembly according to the seventh embodiment of the invention.

FIG. 33 shows aspheric parameters pertaining to the optical lens assembly according to the seventh embodiment of the invention.

FIG. 34 is a schematic diagram illustrating an optical lens assembly according to an eighth embodiment of the invention.

FIGS. 35A to 35D are diagrams illustrating a longitudinal spherical aberration and various aberrations of the optical lens assembly according to the eighth embodiment.

FIG. 36 shows detailed optical data pertaining to the optical lens assembly according to the eighth embodiment of the invention.

FIG. 37 shows aspheric parameters pertaining to the optical lens assembly according to the eighth embodiment of the invention.

FIG. 40 shows detailed optical data pertaining to the optical lens assembly according to the ninth embodiment of the invention.

FIG. 41 shows aspheric parameters pertaining to the optical lens assembly according to the ninth embodiment of the invention.

FIG. 44 shows detailed optical data pertaining to the optical lens assembly according to the tenth embodiment of the invention.

FIG. 45 shows aspheric parameters pertaining to the optical lens assembly according to the tenth embodiment of the invention.

FIG. 48 shows detailed optical data pertaining to the optical lens assembly according to the eleventh embodiment of the invention.

FIG. 49 shows aspheric parameters pertaining to the optical lens assembly according to the eleventh embodiment of the invention.

FIG. 52 shows detailed optical data pertaining to the optical lens assembly according to the twelfth embodiment of the invention.

FIG. 53 shows aspheric parameters pertaining to the optical lens assembly according to the twelfth embodiment of the invention.

FIG. 56 shows detailed optical data pertaining to the optical lens assembly according to the thirteenth embodiment of the invention.

FIG. 57 shows aspheric parameters pertaining to the optical lens assembly according to the thirteenth embodiment of the invention.

FIG. 60 shows detailed optical data pertaining to the optical lens assembly according to the fourteenth embodiment of the invention.

FIG. 61 shows aspheric parameters pertaining to the optical lens assembly according to the fourteenth embodiment of the invention.

FIG. 64 shows detailed optical data pertaining to the optical lens assembly according to the fifteenth embodiment of the invention.

FIG. 65 shows aspheric parameters pertaining to the optical lens assembly according to the fifteenth embodiment of the invention.

FIG. 68 shows detailed optical data pertaining to the optical lens assembly according to the sixteenth embodiment of the invention.

FIG. 69 shows aspheric parameters pertaining to the optical lens assembly according to the sixteenth embodiment of the invention.

FIG. 72 shows detailed optical data pertaining to the optical lens assembly according to the seventeenth embodiment of the invention.

FIG. 73 shows aspheric parameters pertaining to the optical lens assembly according to the seventeenth embodiment of the invention.

FIG. 74 is a table diagram of various important parameters and expressions of the optical imaging lenses of the first through the ninth embodiments of the invention.

FIG. 75 is a table diagram of various important parameters and expressions of the optical imaging lenses of the tenth through the seventeenth embodiments of the invention.

DESCRIPTION OF THE EMBODIMENTS

Figure 6:
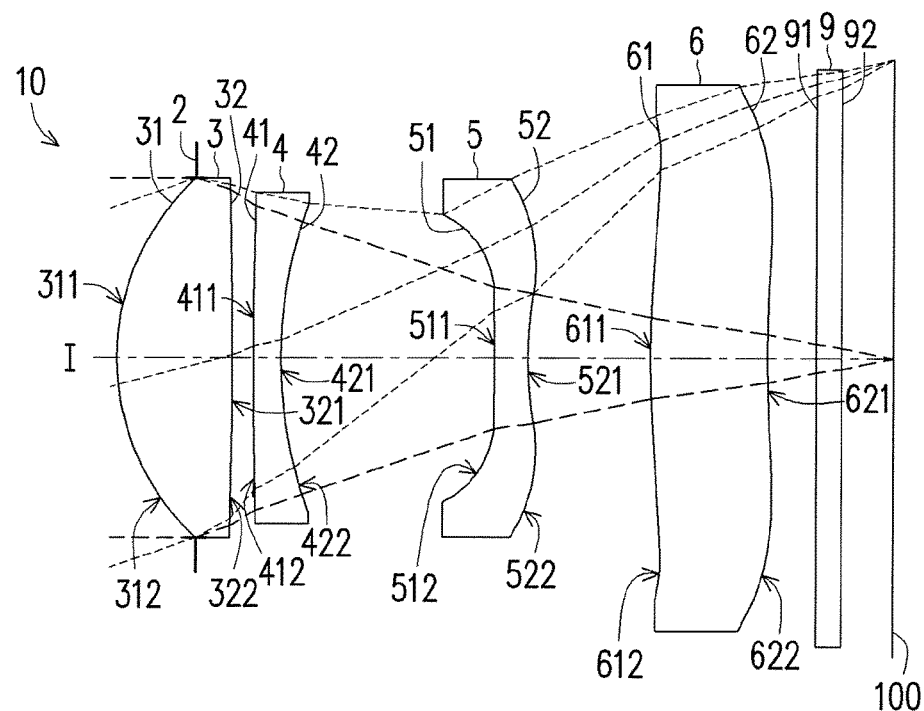
FIG. 6 is a schematic diagram illustrating an optical lens assembly according to a first embodiment of the invention.

In the present specification, the description "a lens element having positive refracting power (or negative refracting power)" means that the paraxial refracting power of the lens element in Gaussian optics is positive (or negative). The description "an object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic diagram illustrating an optical lens assembly according to a first embodiment of the invention, and FIGS. 7A to 7D are diagrams illustrating a longitudinal spherical aberration and various aberrations of the optical lens assembly according to the first embodiment of the invention. Referring to FIG. 6, an optical lens assembly 10 in a first embodiment of the invention includes an aperture stop 2, a first lens element 3, a second lens element 4, a third lens element 5, a fourth lens element 6, and a filter 9 arranged in a sequence from an object side to an image side along an optical axis I of the optical lens assembly 10. When a ray emitted from an object to be captured enters the optical lens assembly 10, the ray passes through the aperture stop 2, the first lens element 3, the second lens element 4, the third lens element 5, the fourth lens element 6, and the filter 9, so as to form an image on an image plane 100. The filter 9 is, for example, an infrared cut filter (IR cut filter) configured for preventing an IR ray in a part of the IR band in the ray from being transmitted to the image plane 100 and affecting the image quality. It should be noted that the object side is a side facing the object to be captured, and the image side is a side facing the image plane 100.

The first lens element 3, the second lens element 4, the third lens element 5, the fourth lens element 6, and the filter 9 respectively have object-side surfaces 31, 41, 51, 61, and 91 facing the object side and allowing imaging rays to pass through as well as image-side surfaces 32, 42, 52, 62, and 92 facing the image side and allowing the imaging rays to pass through.

In addition, in order to meet the product demand of lightweight, the first lens element 3 through the fourth lens element 6 all have refracting power and are all formed of plastic materials; however, the invention is not intended to limit the materials of the first lens element 3 through the fourth lens element 6.

The first lens element 3 has positive refracting power. The object-side surface 31 of the first lens element 3 has a convex portion 311 in the vicinity of the optical axis and a concave portion 312 in the vicinity of the periphery. The image-side surface 32 of the first lens element 3 has a convex portion 321 in the vicinity of the optical axis and a convex portion 322 in the vicinity of the periphery. In the present embodiment, the object-side surface 31 and the image-side surface 32 of the first lens element 3 are both aspheric surfaces.

The second lens element 4 has negative refracting power. The object-side surface 41 of the second lens element 4 has a convex portion 411 in the vicinity of the optical axis and a convex portion 412 in the vicinity of the periphery. The image-side surface 42 of the second lens element 4 has a concave portion 421 in the vicinity of the optical axis and a concave portion 422 in the vicinity of the periphery. In the present embodiment, the object-side surface 41 and the image-side surface 42 of the second lens element 4 are both aspheric surfaces.

The third lens element 5 has negative refracting power. The object-side surface 51 of the third lens element 5 has a convex portion 511 in the vicinity of the optical axis and a concave portion 512 in the vicinity of the periphery. The image-side surface 52 of the third lens element 5 has a concave portion 521 in the vicinity of the optical axis and a convex portion 522 in the vicinity of the periphery. In the present embodiment, the object-side surface 51 and the image-side surface 52 of the third lens element 5 are both aspheric surfaces.

The fourth lens element 6 has negative refracting power. The object-side surface 61 of the fourth lens element 6 has a convex portion 611 in the vicinity of the optical axis and a concave portion 612 in the vicinity of the periphery. The image-side surface 62 of the fourth lens element 6 has a concave portion 621 in the vicinity of the optical axis and a convex portion 622 in the vicinity of the periphery. In the present embodiment, the object-side surface 61 and the image-side surface 62 of the fourth lens element 6 are both aspheric surfaces.

In the first embodiment, only the lens elements described above have refracting power, and the number of lens elements that have refracting power is only four. In other words, in the first embodiment, the third lens element 5 is the second to the last lens element in the sequence, and the fourth lens element 6 is the last lens element in the sequence.

The detailed optical data in the first embodiment is described in FIG. 8. In the first embodiment, an effective focal length (EFL) of the total system is 7.070 mm, a half field of view (HFOV) thereof is 18.534', an f-number (F/#) thereof is 2.397, a total length of the total system is 6.380 mm, and an image height thereof is 2.400 mm. The total length refers to a distance from the object-side surface 31 of the first lens element 3 to the image plane 100 along the optical axis I.

In the embodiment, a total of eight surfaces, namely the object-side surfaces 31, 41, 51, 61 and the image-side surfaces 32, 42, 52, 62 of the first lens element 3, the second lens element 4, the third lens element 5, and the fourth lens element 6 are aspheric surfaces. The aspheric surfaces are defined by the following formula.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

Wherein,

Y is a distance from a point on an aspheric curve to the optical axis I;

Z is a depth of the aspheric surface (i.e. a perpendicular distance between the point on the aspheric surface that is spaced by the distance Y from the optical axis I and a tangent plane tangent to a vertex of the aspheric surface on the optical axis I.)

R is a radius of curvature of the surface of the lens element close to the optical axis I;

K is conic constant; and $a_i$ is $i^{th}$ aspheric coefficient.

The aspheric coefficients of the object-side surface 31 of the first lens element 3 through the image-side surface 62 of the fourth lens element 6 in the equation (1) are shown in FIG. 9. In detail, the column reference number 31 in FIG. 9 represents the aspheric coefficient of the object-side surface 31 of the first lens element 3 and so forth. Since the second aspheric coefficients a2 of eight surfaces are zero, it is omitted in FIG. 9.

In addition, the relations among parameters pertaining to the optical lens assembly 10 in the first embodiment are shown in FIG. 74.

Wherein,

T1 represents the thickness of the first lens element 3 along the optical axis I;

T2 represents the thickness of the second lens element 4 along the optical axis I;

T3 represents the thickness of the third lens element 5 along the optical axis I;

T4 represents the thickness of the fourth lens element 6 along the optical axis I;

TF represents the thickness of the filter 9 along the optical axis I;

G12 is a distance from the first lens element 3 to the second lens element 4 along the optical axis I, i.e. a distance from the image-side surface 32 of the first lens element 3 to the object-side surface 41 of the second lens element 4 along the optical axis I;

G23 is a distance from the second lens element 4 to the third lens element 5 along the optical axis I, i.e. a distance from the image-side surface 42 of the second lens element 4 to the object-side surface 51 of the third lens element 5 along the optical axis I;

G34 is a distance from the third lens element 5 to the fourth lens element 6 along the optical axis I, i.e. a distance from the image-side surface 52 of the third lens element 5 to the object-side surface 61 of the fourth lens element 6 along the optical axis I;

G4F is a distance from the fourth lens element 6 to the filter 9 along the optical axis I, i.e. a distance from the image-side surface 62 of the fourth lens element 6 to the object-side surface 91 of the filter 9 along the optical axis I;

GFP is a distance from the filter 9 to the image plane 100 along the optical axis I, i.e. a distance from the image-side surface 92 of the filter 9 to the image plane 100 along the optical axis I;

AAG is a sum of a distance G12 from the first lens element 3 to the second lens element 4 along the optical axis I, a distance G23 from the second lens element 4 to the third lens element 5 along the optical axis I, and a distance G34 from the third lens element 5 to the fourth lens element 6 along the optical axis I;

ALT is a sum of the thicknesses of the first lens element 3, the second lens element 4, the third lens element 5, and the fourth lens element 6 along the optical axis I, i.e., a total of T, T2, T3, and T4;

TL is a distance from the object-side surface 31 of the third lens element 3 to the image-side surface 62 of the fourth lens element 6 along the optical axis I;

TTL represents a distance from the object-side surface 31 of the first lens element 3 to the image plane 100 along the optical axis I;

BFL is a distance from the image-side surface 62 of the fourth lens element 6 to the image plane 100 along the optical axis I; and EFL is an effective focal length of the optical lens assembly 10.

In addition, it is further defined that:

f1 is a focal length of the first lens element 3;
f2 is a focal length of the second lens element 4;
f3 is a focal length of the third lens element 5;
f4 is a focal length of the fourth lens element 6;
n1 is a refractive index of the first lens element 3;
n2 is a refractive index of the second lens element 4;
n3 is a refractive index of the third lens element 5;
n4 is a refractive index of the fourth lens element 6;
$\upsilon 1$ is an Abbe number, which may also be called a dispersion coefficient, of the first lens element 3;
$\upsilon 2$ is an Abbe number of the second lens element 4;
$\upsilon 3$ is an Abbe number of the third lens element 5; and
$\upsilon 4$ is an Abbe number of the fourth lens element 6.

Figures 7A, 7B, 7C, 7D:
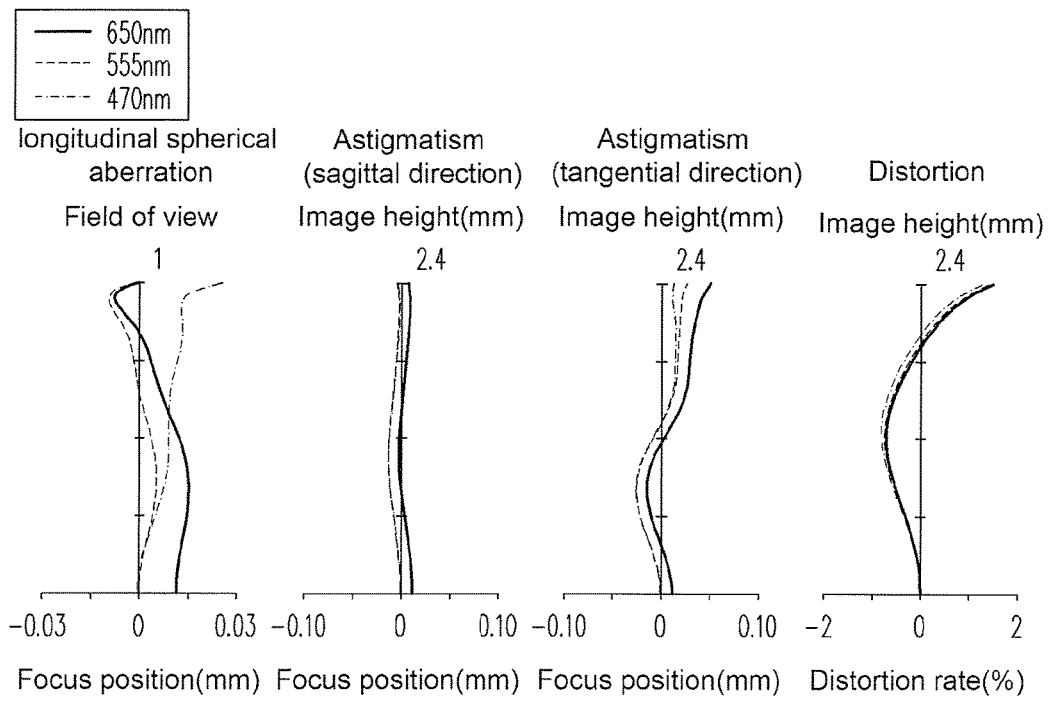
FIGS. 7A to 7D are diagrams illustrating a longitudinal spherical aberration and various aberrations of the optical lens assembly according to the first embodiment.

Referring to FIGS. 7A to 7D. The diagrams of FIG. 7A illustrates a longitudinal spherical aberration of the first embodiment when a pupil radius is 1.473 mm. In the diagram shown in FIG. 7A which illustrates the longitudinal spherical aberration, curves formed by each wavelength are close to each other and are gathered in the middle, which represents that off-axis lights of different heights of each wavelength are gathered around imaging points, and according to a deviation of the curve of each wavelength, it is learned that deviations of the imaging points of the off-axis lights of different heights are controlled within a range of ±0.03 mm, so that the spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated.

The diagrams of FIG. 7B and FIG. 7C respectively illustrates an astigmatism aberration in a sagittal direction and an astigmatism aberration in a tangential direction on the image plane 100 of the first embodiment. In FIGS. 7B and 7C which illustrate two diagrams of astigmatism aberration, the focal length variation of the three representative wavelengths in the entire field of view falls within ±0.06 mm, which represents that the optical system in the first embodiment can effectively eliminate aberration.

The diagram of FIG. 7D illustrates a distortion aberration on the image plane 100 in the first embodiment. In the diagram of the distortion aberration illustrated in FIG. 7D, the distortion aberration is maintained in a range of ±1.6%, which is in compliance with the image quality requirement of the optical system.

Based on the above, as compared to the existing optical lens, the first embodiment still maintains good image quality under a condition that the total length is reduced to about 6.380 mm. Specifically, the first lens element 3 having positive refracting power and the object-side surface 31 thereof is convex is beneficial to converge light. With the second lens element 4 having negative refracting power, it is easy to correct the main aberration generated by the first lens element 3.

The object-side surface 51 having the concave portion 512 in the vicinity of periphery of the third lens element 5 and the image-side surface 62 having the convex portion 622 in the vicinity of periphery of the fourth lens element 6 are utilized for correcting the main aberration generated by the first lens element 3 and the second lens element 4.

The aperture stop 2 is disposed at the object-side surface 31 of the first lens element 3, and with a sequence of lens elements from the second lens element 4 to the fourth lens element 6, it is beneficial to increase the aperture availability as well as reduce the f-number (F/#).

When (TTL×F/#)/EFL≤2.2 is satisfied, a light entering aperture is increased without increasing the total length of the optical lens assembly 10, which is utilized for the design of a telescope with a large aperture. In a preferable embodiment, the optical lens assembly 10 satisfies 0.8≤(TTL×F/#)/EFL≤2.2.

When 1.1≤EFL/TTL≤1.3 is satisfied, or when 1.1≤EFL/TL≤1.6 and AAG>ALT are both satisfied, a ratio of the effective focal length of the optical lens assembly 10 to the total length of the optical lens assembly 10 is maintained at an appropriate value, so as to prevent difficulties in capturing an image of a long-distance object due to the parameters being too small, or to prevent the total length of the optical lens assembly 10 being too long due to the parameters being too large.

The optical lens assembly 10 may further satisfy other conditions, so as to meet different design requirements. Several examples are given as follow; however, the present invention is not limited thereto.

For instance, the optical lens assembly 10 may further satisfy 7.3≤EFL/T4≤22. By limiting the ratio of the effective focal length (EFL) and the thickness T4 of the fourth lens element 6, conditions where the thickness T4 of the fourth lens element 6 being too little or large may be prevented, such that the optical lens assembly 10 may be easily manufactured and has good yield rate.

The optical lens assembly 10 may further satisfy 8.4≤EFL/T3. By limiting the ratio of the effective focal length (EFL) and the thickness T3 of the third lens element 5, the thickness T3 of the third lens element 5 may be prevented from being too small or too large, which is beneficial for reducing coma and manufacturing difficulties as well as increasing yield rate. In an embodiment, the optical lens assembly 10 satisfies 8.4≤EFL/T3≤28.

The optical lens assembly 10 may further satisfy EFL/T2≤39. By limiting the ratio of the effective focal length (EFL) and the thickness T2 of the second lens element 4, the thickness T2 of the second lens element 4 being too small or too large may be prevented, which is beneficial for reducing the main aberration generated by the first lens element 3. In a preferable embodiment, the optical lens assembly 10 satisfies 12≤EFL/T2≤39.

The optical lens assembly 10 may further satisfy 1.2≤G23/T1, 1.8≤G23/T4≤8.5, T3/G12≤17, ALT/G23≤1.8, 2≤AAG/T1, 1.1≤G23/BFL, 2.4≤AAG/T4≤9, 3.1≤G23/T3≤12, G23/T2≤16, 0.9≤T2/G12, 4.0≤T1/G12, 4.75≤BFL/G12, 10.5≤G23/G12≤72, or 3.85≤T4/G12. By maintaining the thickness of each lens element and distances therebetween to appropriate values, it is prevented that any one of the parameters from being too large which causes difficulty in achieving slim design of the optical lens assembly 10, or prevent any one of the parameters from being too small which makes the optical lens assembly 10 difficult to assemble or manufacture.

Due to the unpredictability in the design of an optical system, with the framework of the embodiments of the invention, under the circumstances where the above-described conditions are satisfied, shorter total length, bigger aperture availability, improved image quality or better assembly yield rate can be preferably achieved so as to improve the shortcomings of conventional art.

The above-limited circumstances are provided in an exemplary sense and can be randomly and selectively combined and applied to the embodiments of the invention in different manners; however, the present invention should not be limited to the above examples. In implementation of the present invention, apart from the above-described relations, it is also possible to add additional detailed structure such as more concave and convex curvatures arrangements of a specific lens element or a plurality of lens elements so as to enhance control of system property and/or resolution. For example, it is optional to form an additional concave portion in the vicinity of the optical axis or an additional concave portion in the vicinity of the periphery on the image-side surface 42 of the second lens element 4. It should be noted that the above-described details can be optionally combined and applied to the other embodiments of the invention under the condition where they are not in conflict with one another.

Figure 10:
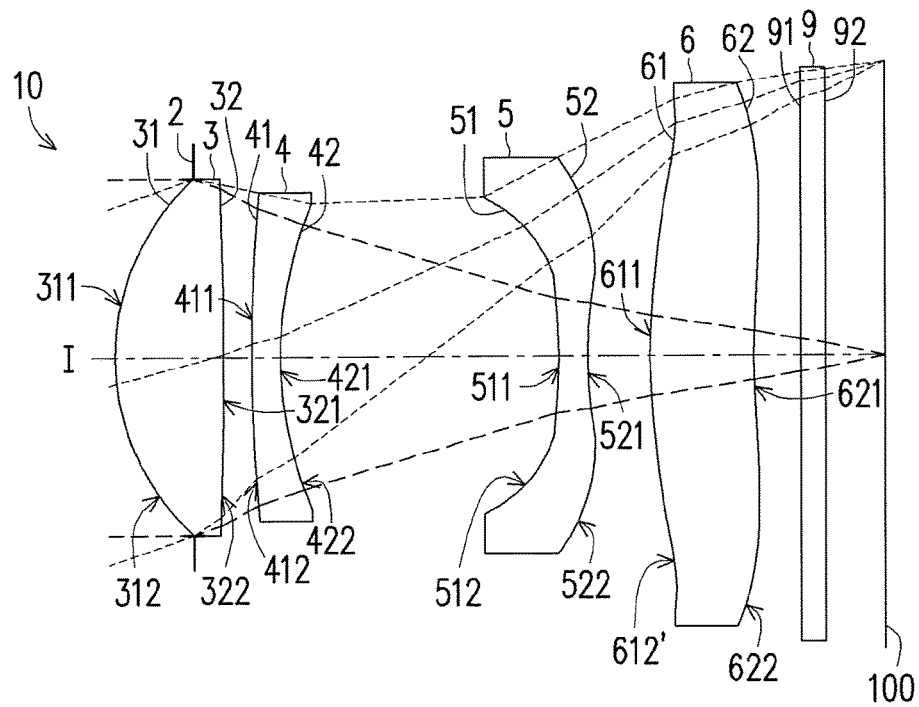
FIG. 10 is a schematic diagram illustrating an optical lens assembly according to a second embodiment of the invention.

FIG. 10 is a schematic diagram illustrating an optical lens assembly according to a second embodiment of the invention, and FIGS. 11A to 11D are diagrams illustrating a longitudinal spherical aberration and various aberrations of the optical lens assembly according to the second embodiment. Referring to FIG. 10, the second embodiment of the optical lens assembly 10 of the present invention is similar to the first embodiment. The main difference lies in optical data, aspheric coefficients and the parameters of the lens elements (the first, the second, the third, and the fourth lens elements 3, 4, 5, 6). Furthermore, the fourth lens element 6 has positive refracting power, and the object-side surface 61 of the fourth lens element 6 has a convex portion 612' in the vicinity of a periphery.

The detailed optical data pertaining to the optical lens assembly 10 of the second embodiment is shown in FIG. 12, and the EFL of the system in the second embodiment is 7.070 mm, the HFOV is 18.505', the F-number (F/#) is 2.397, the total length is 6.380 mm, and the image height thereof is 2.400 mm.

FIG. 13 shows each of the aspheric coefficients used in the formula (1) for the object-side surface 31 of the first lens element 3 through the image-side surface 62 of the fourth lens element 6 in the second embodiment.

In addition, the relations among parameters pertaining to the optical lens assembly 10 in the second embodiment are shown in FIG. 74.

Figures 11A, 11B, 11C, 11D:
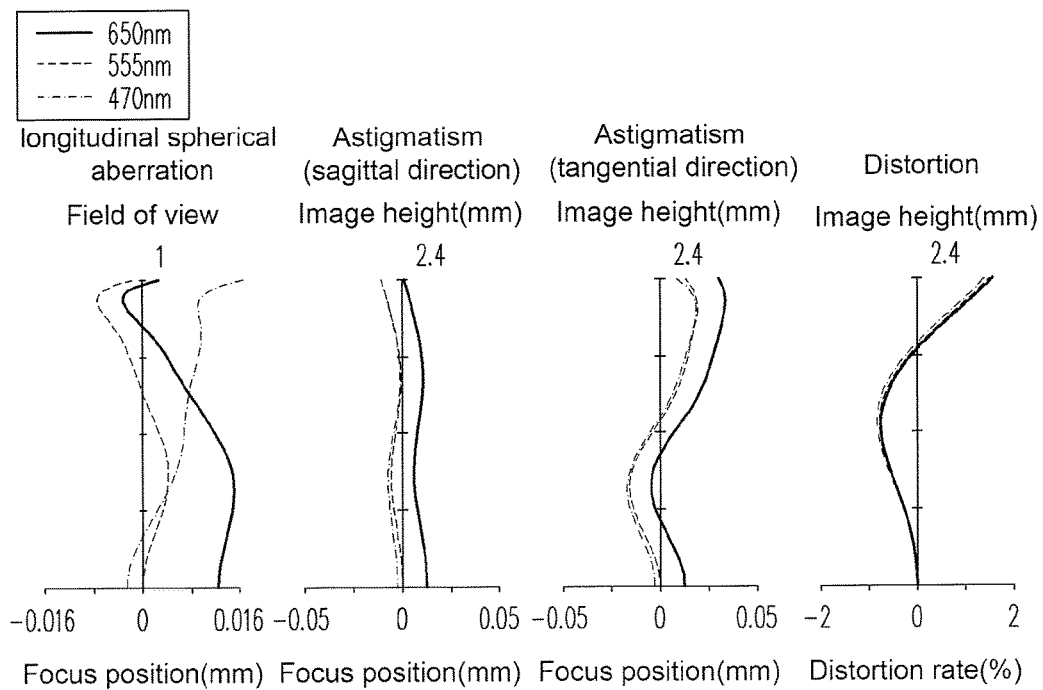
FIGS. 11A to 11D are diagrams illustrating a longitudinal spherical aberration and various aberrations of the optical lens assembly according to the second embodiment.

In the diagram shown in FIG. 11A which illustrates the longitudinal spherical aberration, a deviation of the imaging points of the off-axis rays of different heights is controlled within a range of ±0.016 mm. In the diagrams shown in FIG. 11B and FIG. 11C which illustrate two diagrams of the astigmatism aberration, a focal length variation of the three representative wavelengths in the whole field of view falls within ±0.035 mm. In the diagram of FIG. 11D which illustrates the distortion aberration, the distortion aberration is maintained within the range of ±1.6%. Therefore, as compared to the existing optical lens, the second embodiment still maintains good image quality under a condition that the total length is reduced to about 6.380 mm.

Based on the above, it can be obtained that the advantage of the second embodiment relative to the first embodiment lies in that less longitudinal spherical aberration and astigmatism aberration may be achieved, and the optical lens assembly of the second embodiment can be manufactured easier than the first embodiment, and therefore, a higher yield rate can be achieved.

Figure 14:
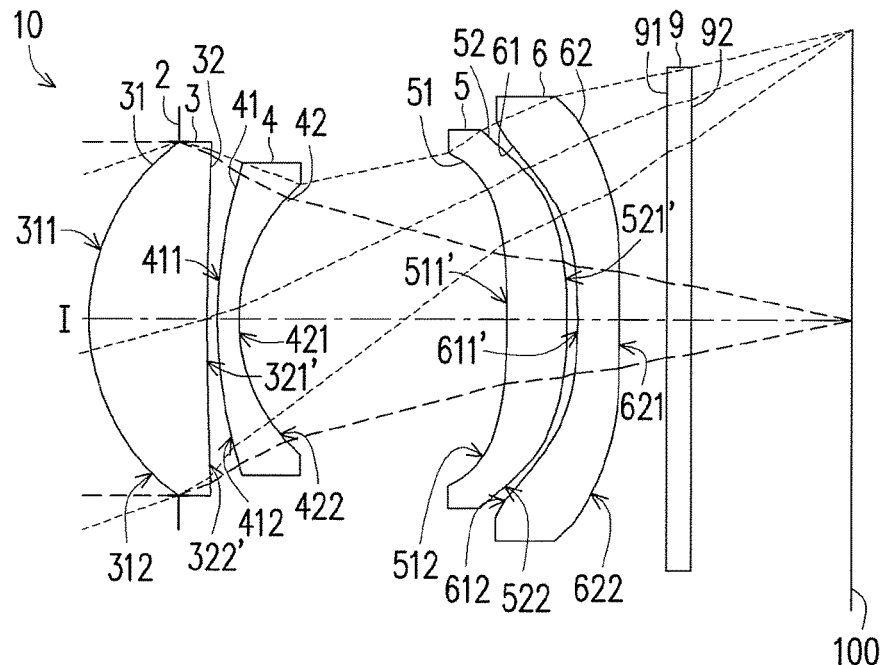
FIG. 14 is a schematic diagram illustrating an optical lens assembly according to a third embodiment of the invention.

FIG. 14 is a schematic diagram illustrating an optical lens assembly according to a third embodiment of the invention, and FIGS. 15A to 15D are diagrams illustrating a longitudinal spherical aberration and various aberrations of the optical lens assembly according to the third embodiment. Referring to FIG. 14, the third embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the image-side surface 32 of the first lens element 3 has a concave portion 321' in the vicinity of the optical axis and a concave portion 322' in the vicinity of the periphery. The third lens element 5 has positive refracting power, where the object-side surface 51 of the third lens element 5 has a concave portion 511' in the vicinity of the optical axis, and the image-side surface 52 of the third lens element 5 has a convex portion 521' in the vicinity of the optical axis. The object-side surface 61 of the fourth lens element 6 has a concave portion 611' in the vicinity of the optical axis.

The detailed optical data pertaining to the optical lens assembly 10 of the third embodiment is shown in FIG. 16. In the third embodiment, the EFL of the system is 7.070 mm, the HFOV is 18.678', the F-number (F/#) is 2.399, the total length is 6.380 mm, and the image height thereof is 2.400 mm.

FIG. 17 shows each of the aspheric coefficients used in the formula (1) for the object-side surface 31 of the first lens element 3 through the image-side surface 62 of the fourth lens element 6 in the third embodiment.

In addition, the relations among parameters pertaining to the optical lens assembly 10 in the third embodiment are shown in FIG. 74.

Figures 15A, 15B, 15C, 15D:
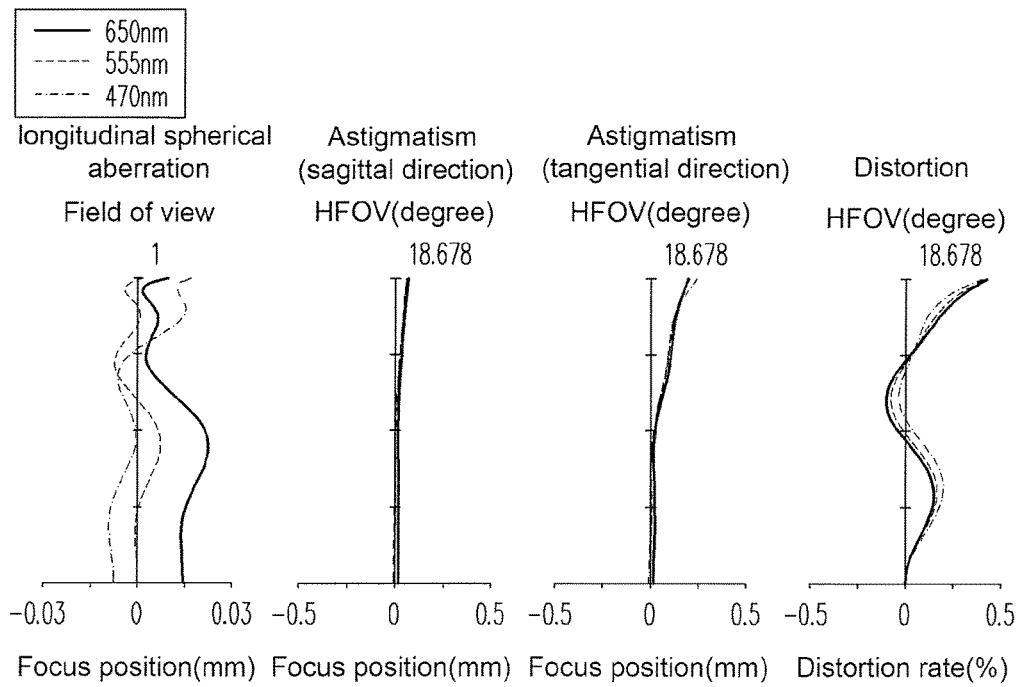
FIGS. 15A to 15D are diagrams illustrating a longitudinal spherical aberration and various aberrations of the optical lens assembly according to the third embodiment.

In the diagram shown in FIG. 15A which illustrates the longitudinal spherical aberration, a deviation of the imaging points of the off-axis rays of different heights is controlled within a range of ±0.025 mm. In the diagrams shown in FIG. 15B and FIG. 15C which illustrate two diagrams of astigmatism aberration, a focal length variation of the three representative wavelengths in the whole field of view falls within ±0.025 mm. In the diagram of FIG. 15D which illustrates the distortion aberration, the distortion aberration is maintained within the range of ±0.45%. Therefore, as compared to the existing optical lens, the third embodiment still maintains good image quality under a condition that the total length of the lens is reduced to about 6.380 mm.

Based on the above, it can be obtained that the advantages of the third embodiment relative to the first embodiment are that the third embodiment has a greater half field of view, less longitudinal spherical variation, astigmatism aberration, and distortion aberration may be achieved, and the third embodiment can be manufactured more easily than the first embodiment, therefore, a higher yield rate can be achieved.

Figure 18:
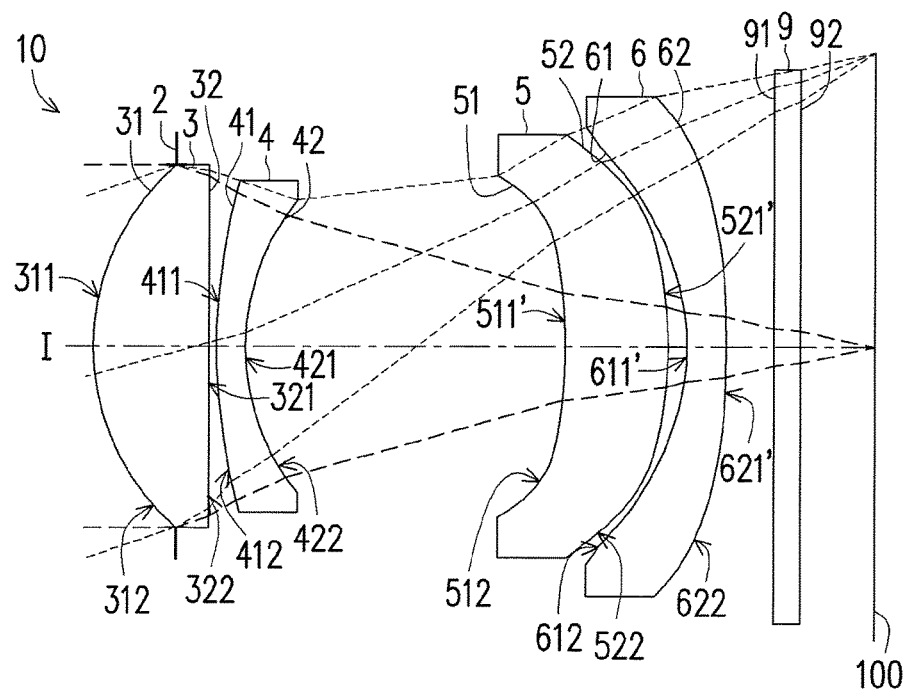
FIG. 18 is a schematic diagram illustrating an optical lens assembly according to a fourth embodiment of the invention.

FIG. 18 is a schematic diagram illustrating an optical lens assembly according to a fourth embodiment of the invention, and FIGS. 9A to 19D are diagrams illustrating a longitudinal spherical aberration and various aberrations of the optical lens assembly according to the fourth embodiment. Referring to FIG. 18, the fourth embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the third lens element 5 has positive refracting power, where the object-side surface 51 of the third lens element 5 has a concave portion 511' in the vicinity of the optical axis, and the image-side surface 52 of the third lens element 5 has a convex portion 521' in the vicinity of the optical axis. The object-side surface 61 of the fourth lens element 6 has a concave portion 611' in the vicinity of the optical axis, and the image-side surface 62 has a convex portion 621' in the vicinity of the optical axis.

The detailed optical data pertaining to the optical lens assembly 10 of the fourth embodiment is shown in FIG. 20. In the fourth embodiment, the EFL of the system is 7.070 mm, the HFOV is 18.684', the F-number (F/#) is 2.390, the total length is 6.380 mm, and the image height thereof is 2.400 mm.

FIG. 21 shows each of the aspheric coefficients used in the formula (1) for the object-side surface 31 of the first lens element 3 through the image-side surface 62 of the fourth lens element 6 in the fourth embodiment.

In addition, the relations among parameters pertaining to the optical lens assembly 10 in the fourth embodiment are shown in FIG. 74.

Figures 19A, 19B, 19C, 19D:
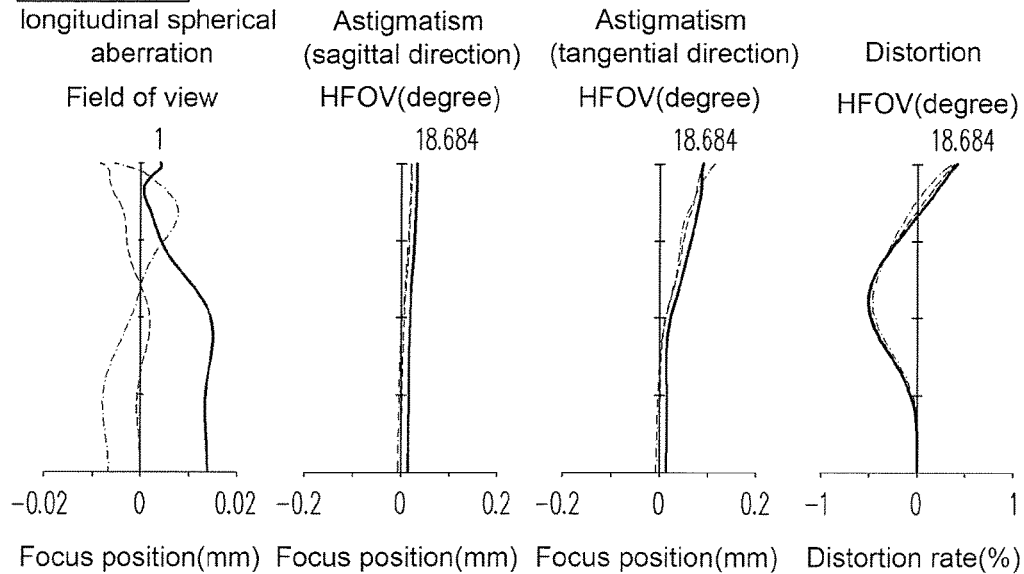
FIGS. 19A to 19D are diagrams illustrating a longitudinal spherical aberration and various aberrations of the optical lens assembly according to the fourth embodiment.

In the diagram shown in FIG. 19A which illustrates the longitudinal spherical aberration, a deviation of the imaging points of the off-axis rays of different heights is controlled within a range of ±0.016 mm. In the diagrams shown in FIG. 19B and FIG. 19C which illustrate two diagrams of astigmatism aberration, a focal length variation of the three representative wavelengths in the whole field of view falls within ±0.12 mm. In the diagram of FIG. 19D which illustrates the distortion aberration, the distortion aberration is maintained within the range of ±0.5%. Therefore, as compared to the existing optical lens, the fourth embodiment still maintains good image quality under a condition that the total length of the lens is reduced to about 6.380 mm.

Based on the above, it can be obtained that the advantages of the fourth embodiment relative to the first embodiment are that the fourth embodiment has a greater half field of view and a greater f-number (F/#), less longitudinal spherical aberration and distortion aberration can be achieved, and the fourth embodiment can be manufactured more easily than the first embodiment, therefore, a higher yield rate can be achieved.

Figure 22:
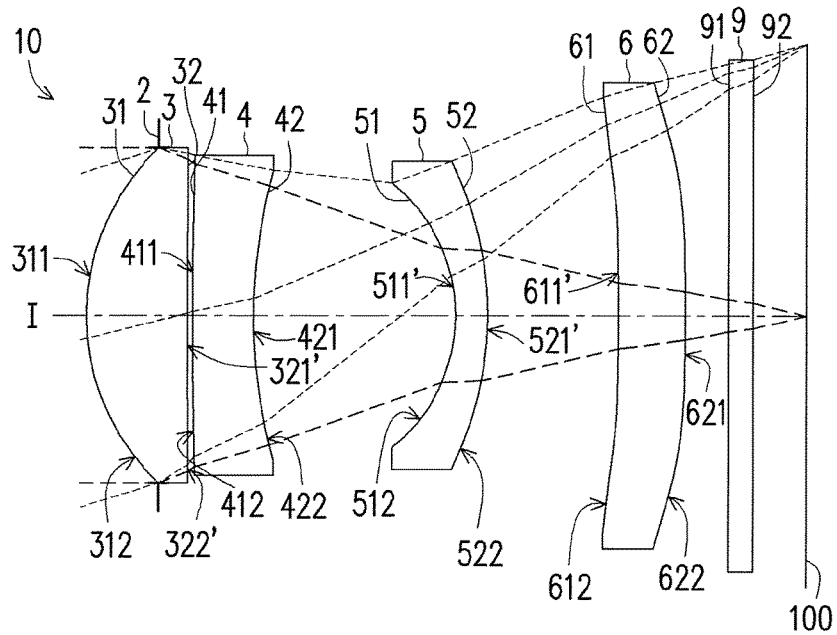
FIG. 22 is a schematic diagram illustrating an optical lens assembly according to a fifth embodiment of the invention.

FIG. 22 is a schematic diagram illustrating an optical lens assembly according to a fifth embodiment of the invention, and FIGS. 23A to 23D are diagrams illustrating a longitudinal spherical aberration and various aberrations of the optical lens assembly according to the fifth embodiment. Referring to FIG. 22, a fifth embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the image-side surface 32 of the first lens element 3 has a concave portion 321' in the vicinity of the optical axis and a concave portion 322' in the vicinity of the periphery. The object-side surface 51 of the third lens element 5 has a concave portion 511' in the vicinity of the optical axis, and the image-side surface 52 of the third lens element 5 has a convex portion 521' in the vicinity of the optical axis. The object-side surface 61 of the fourth lens element 6 has a concave portion 611' in the vicinity of the optical axis.

The detailed optical data pertaining to the optical lens assembly 10 of the fifth embodiment is shown in FIG. 24. In the fifth embodiment, the EFL of the system is 7.070 mm, the HFOV is 18.322', the F-number (F/#) is 2.377, the total length is 6.380 mm, and the image height thereof is 2.400 mm.

FIG. 25 shows each of the aspheric coefficients used in the formula (1) for the object-side surface 31 of the first lens element 3 through the image-side surface 62 of the fourth lens element 6 in the fifth embodiment.

In addition, the relations among parameters pertaining to the optical lens assembly 10 in the fifth embodiment are shown in FIG. 74.

Figures 23A, 23B, 23C, 23D:
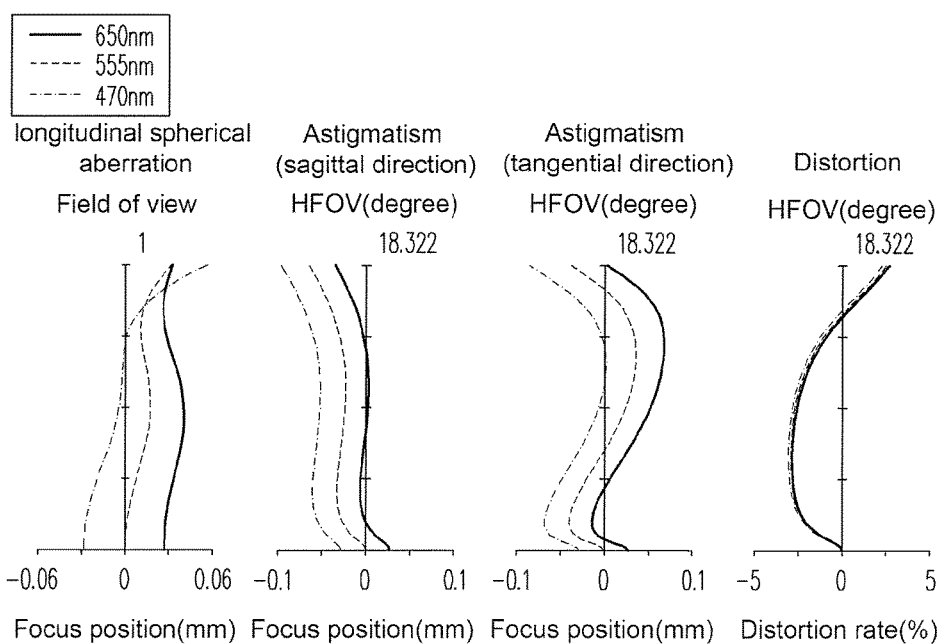
FIGS. 23A to 23D are diagrams illustrating a longitudinal spherical aberration and various aberrations of the optical lens assembly according to the fifth embodiment.

In the diagram shown in FIG. 23A which illustrates the longitudinal spherical aberration, a deviation of the imaging points of the off-axis rays of different heights is controlled within a range of ±0.06 mm. In the diagrams shown in FIG. 23B and FIG. 23C which illustrate two diagrams of the astigmatism aberration, a focal length variation of the three representative wavelengths in the whole field of view falls within ±0.10 mm. In the diagram of FIG. 23D which illustrates the distortion aberration, the distortion aberration is maintained within the range of ±3.5%. Therefore, as compared to the existing optical lens, the fifth embodiment still maintains good image quality under a condition that the total length is reduced to about 6.380 mm.

Based on the above, it can be obtained that the advantage of the fifth embodiment relative to the first embodiment lies in that the fifth embodiment has a greater aperture (less F/#), and the fifth embodiment can be manufactured easier as compared to the first embodiment, and therefore, a higher yield rate can be achieved.

Figure 26:
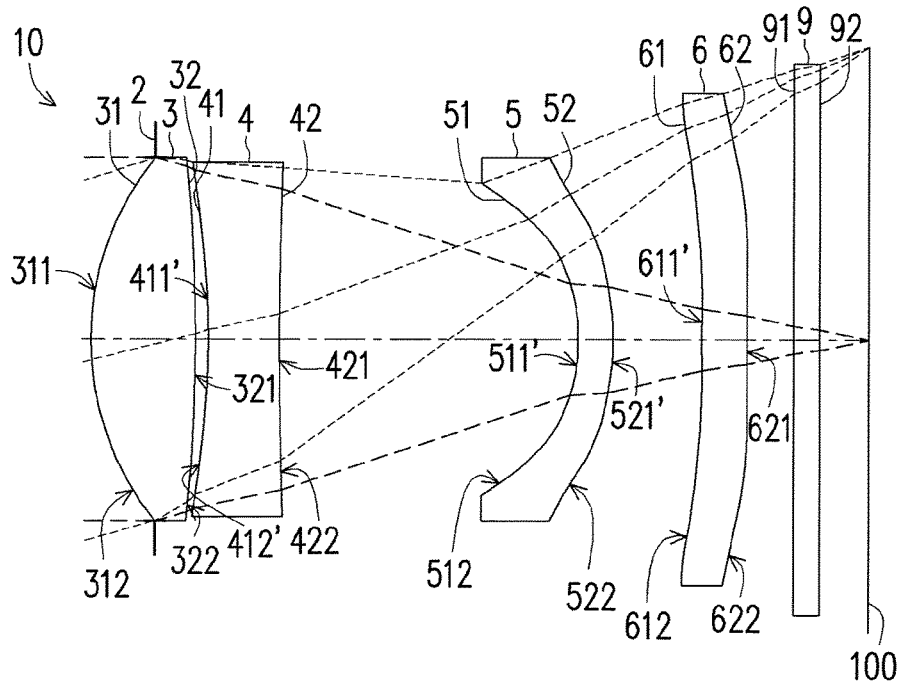
FIG. 26 is a schematic diagram illustrating an optical lens assembly according to a sixth embodiment of the invention.

FIG. 26 is a schematic diagram illustrating an optical lens assembly according to a sixth embodiment of the invention, and FIGS. 27A to 27D are diagrams illustrating a longitudinal spherical aberration and various aberrations of the optical lens assembly according to the sixth embodiment. Referring to FIG. 26, the sixth embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the object-side surface 41 of the second lens element 4 has a concave portion 411' in the vicinity of the optical axis and a concave portion 412' in the vicinity of the periphery. The object-side surface 51 of the third lens element 5 has a concave portion 511' in the vicinity of the optical axis, and the image-side surface 52 of the third lens element 5 has a convex portion 521' in the vicinity of the optical axis. The object-side surface 61 of the fourth lens element 6 has a concave portion 611' in the vicinity of the optical axis.

The detailed optical data pertaining to the optical lens assembly 10 of the sixth embodiment is shown in FIG. 28. In the sixth embodiment, the EFL of the system is 7.070 mm, the HFOV is 18.125', the f-number (F/#) is 2.369, the total length is 6.384 mm, and the image height thereof is 2.400 mm.

FIG. 29 shows each of the aspheric coefficients used in the formula (1) for the object-side surface 31 of the first lens element 3 through the image-side surface 62 of the fourth lens element 6 in the sixth embodiment.

In addition, the relations among parameters pertaining to the optical lens assembly 10 in the sixth embodiment are shown in FIG. 74.

Figures 27A, 27B, 27C, 27D:
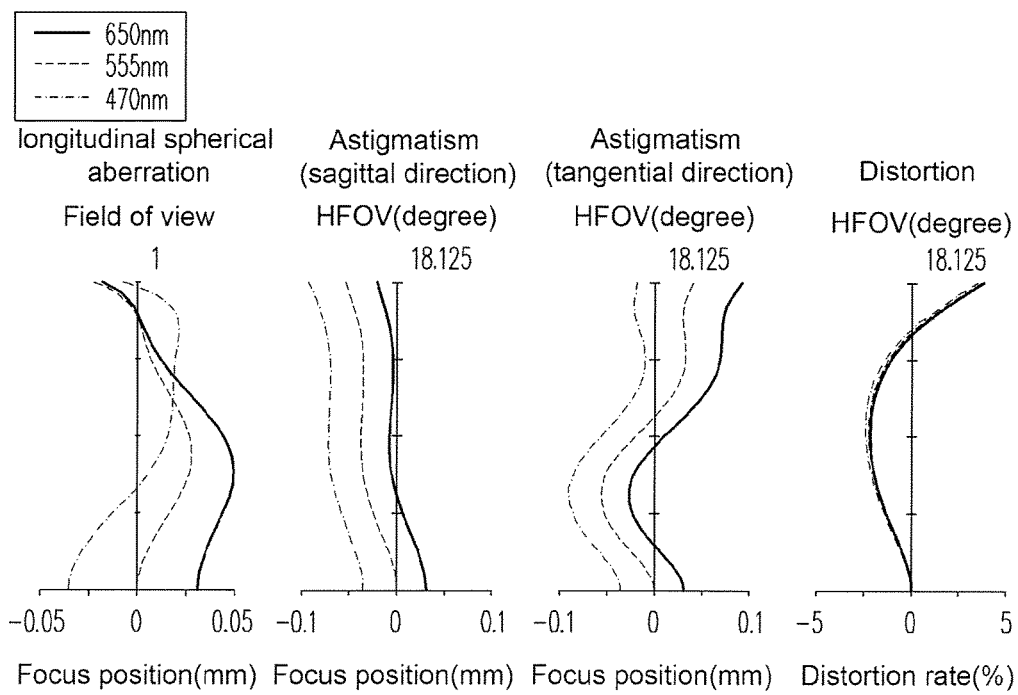
FIGS. 27A to 27D are diagrams illustrating a longitudinal spherical aberration and various aberrations of the optical lens assembly according to the sixth embodiment.

In the diagram shown in FIG. 27A which illustrates the longitudinal spherical aberration, a deviation of the imaging points of the off-axis rays of different heights is controlled within a range of ±0.05 mm. In the diagrams shown in FIG. 27B and FIG. 27C which illustrate two diagrams of the astigmatism aberration, a focal length variation of the three representative wavelengths in the whole field of view falls within ±0.10 mm. In the diagram of FIG. 27D which illustrates the distortion aberration, the distortion aberration is maintained within the range of ±4.0%. Therefore, as compared to the existing optical lens, the sixth embodiment maintains good image quality under a condition that the total length is reduced to about 6.384 mm.

Based on the above, it can be obtained that the advantage of the sixth embodiment relative to the first embodiment lies in that the sixth embodiment has a greater aperture (less F/#), and the sixth embodiment can be manufactured easier as compared to the first embodiment, and therefore, a higher yield rate can be achieved.

Figure 30:
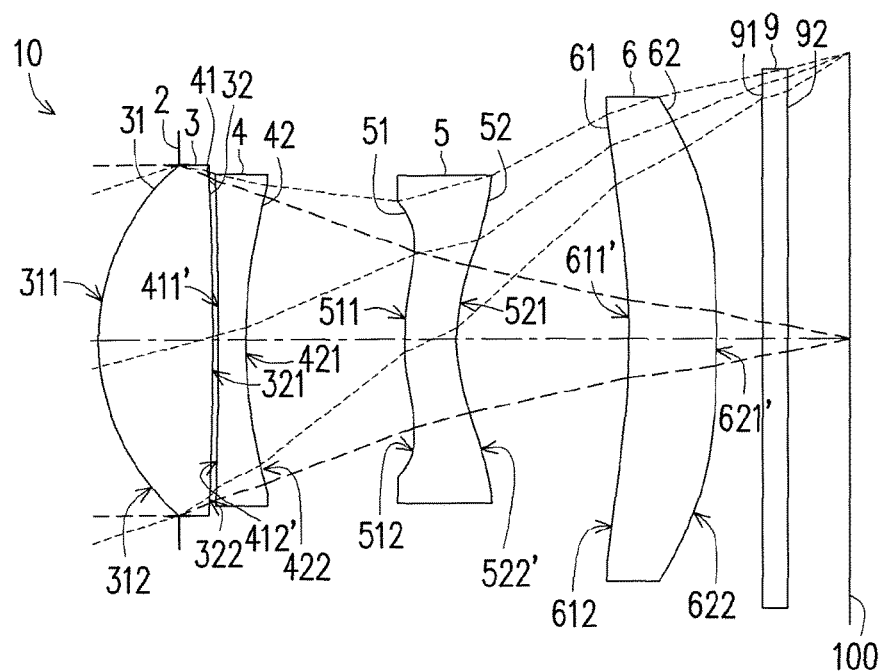
FIG. 30 is a schematic diagram illustrating an optical lens assembly according to a seventh embodiment of the invention.

FIG. 30 is a schematic diagram illustrating an optical lens assembly according to a seventh embodiment of the invention, and FIGS. 31A to 31D are diagrams illustrating a longitudinal spherical aberration and various aberrations of the optical lens assembly according to the seventh embodiment. Referring to FIG. 30, the seventh embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the object-side surface 41 of the second lens element 4 has a concave portion 411' in the vicinity of the optical axis and a concave portion 412' in the vicinity of the periphery. The object-side surface 52 of the third lens element 5 has a concave portion 522' in the vicinity of the periphery. The object-side surface 61 of the fourth lens element 6 has a concave portion 611' in the vicinity of the optical axis, and the image-side surface 62 of the fourth lens element 6 has a convex portion 621' in the vicinity of the optical axis.

The detailed optical data pertaining to the optical lens assembly 10 of the seventh embodiment is shown in FIG. 32. In the seventh embodiment, the EFL of the system is 7.067 mm, the HFOV is 18.338', the f-number (F/#) is 2.400, the total length is 6.379 mm, and the image height thereof is 2.400 mm.

FIG. 33 shows each of the aspheric coefficients used in the formula (1) for the object-side surface 31 of the first lens element 3 through the image-side surface 62 of the fourth lens element 6 in the seventh embodiment.

In addition, the relations among parameters pertaining to the optical lens assembly 10 in the seventh embodiment are shown in FIG. 74.

Figures 31A, 31B, 31C, 31D:
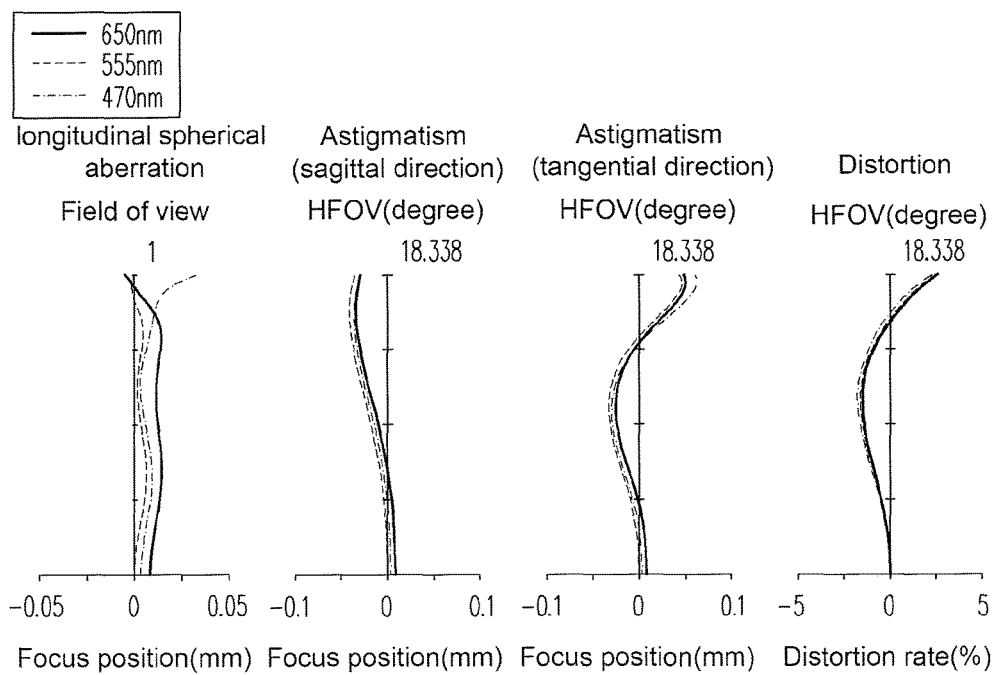
FIGS. 31A to 31D are diagrams illustrating a longitudinal spherical aberration and various aberrations of the optical lens assembly according to the seventh embodiment.

In the diagram shown in FIG. 31A which illustrates the longitudinal spherical aberration, a deviation of the imaging points of the off-axis rays of different heights is controlled within a range of ±0.035 mm. In the diagrams shown in FIG. 31B and FIG. 31C which illustrate two diagrams of the astigmatism aberration, a focal length variation of the three representative wavelengths in the whole field of view falls within ±0.07 mm. In the diagram of FIG. 31D which illustrates the distortion aberration, the distortion aberration is maintained within the range of ±3.0%. Therefore, as compared to the existing optical lens, the seventh embodiment still maintains good image quality under a condition that the total length is reduced to about 6.379 mm.

Based on the above, it can be obtained that the advantage of the seventh embodiment relative to the first embodiment lies in that the seventh embodiment has a shorter total length and can be manufactured easier than the first embodiment, and therefore, a higher yield rate can be achieved.

FIG. 34 is a schematic diagram illustrating an optical lens assembly according to an eighth embodiment of the invention, and FIGS. 35A to 35D are diagrams illustrating a longitudinal spherical aberration and various aberrations of the optical lens assembly according to the eighth embodiment. Referring to FIG. 34, the eighth embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Furthermore, the fourth lens element 6 has positive refracting power, and the object-side surface 61 of the fourth lens element 6 has a convex portion 612' in the vicinity of periphery.

The detailed optical data pertaining to the optical lens assembly 10 of the eighth embodiment is shown in FIG. 36. In the eighth embodiment, the EFL of the system is 7.070 mm, the HFOV is 18.727', the f-number (F/#) is 2.393, the total length is 6.380 mm, and the image height thereof is 2.400 mm.

FIG. 37 shows each of the aspheric coefficients used in the formula (1) for the object-side surface 31 of the first lens element 3 through the image-side surface 62 of the fourth lens element 6 in the eighth embodiment.

In addition, the relations among parameters pertaining to the optical lens assembly 10 in the eighth embodiment are shown in FIG. 74.

In the diagram shown in FIG. 35A which illustrates the longitudinal spherical aberration, a deviation of the imaging points of the off-axis rays of different heights is controlled within a range of ±0.012 mm. In the diagrams shown in FIG. 35B and FIG. 35C which illustrate two diagrams of astigmatism aberration, a focal length variation of the three representative wavelengths in the whole field of view falls within ±0.04 mm. In the diagram of FIG. 35D which illustrates the distortion aberration, the distortion aberration is maintained within the range of ±0.45%. Therefore, as compared to the existing optical lens, the eighth embodiment still maintains good image quality under a condition that the total length is reduced to about 6.380 mm.

Based on the above, it can be obtained that the advantages of the eighth embodiment relative to the first embodiment are that the eighth embodiment has a greater half field of view and a greater aperture (less F/#), less longitudinal spherical aberration and distortion aberration can be achieved, and the eighth embodiment can be manufactured more easily than the first embodiment, therefore, a higher yield rate can be achieved.

Figure 38:
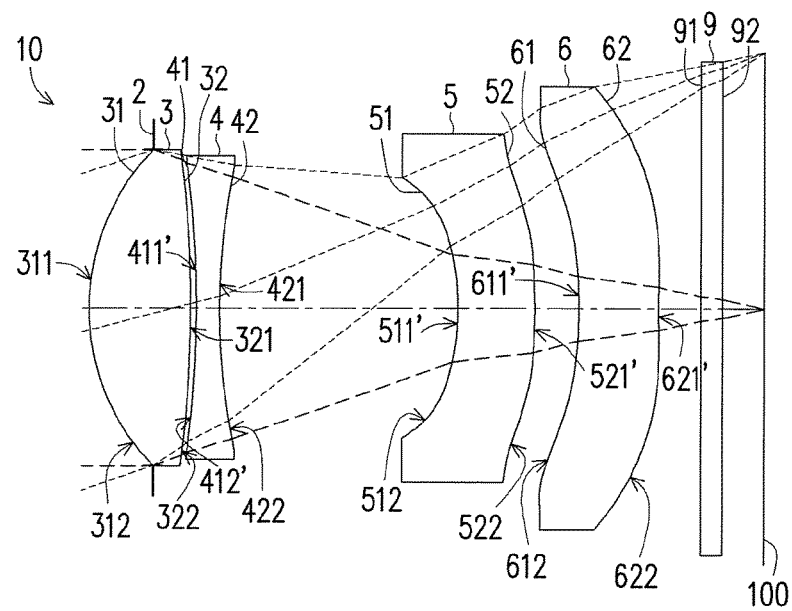
FIG. 38 is a schematic diagram illustrating an optical lens assembly according to a ninth embodiment of the invention.

FIG. 38 is a schematic diagram illustrating an optical lens assembly according to a ninth embodiment of the invention, and FIGS. 39A to 39D are diagrams illustrating a longitudinal spherical aberration and various aberrations of the optical lens assembly according to the ninth embodiment. Referring to FIG. 38, the ninth embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the object-side surface 41 of the second lens element 4 has a concave portion 411' in the vicinity of the optical axis and a concave portion 412' in the vicinity of the periphery. The object-side surface 51 of the third lens element 5 has a concave portion 511' in the vicinity of the optical axis, and the image-side surface 52 of the third lens element 5 has a convex portion 521' in the vicinity of the optical axis. The object-side surface 61 of the fourth lens element 6 has a concave portion 611' in the vicinity of the optical axis, and the image-side surface 62 has a convex portion 621' in the vicinity of the optical axis.

The detailed optical data pertaining to the optical lens assembly 10 of the ninth embodiment is shown in FIG. 40. In the ninth embodiment, the EFL of the system is 7.070 mm, the HFOV is 18.663', the f-number (F/#) is 2.389, the total length is 6.379 mm, and the image height thereof is 2.400 mm.

FIG. 41 shows each of the aspheric coefficients used in the formula (1) for the object-side surface 31 of the first lens element 3 through the image-side surface 62 of the fourth lens element 6 in the ninth embodiment.

In addition, the relations among parameters pertaining to the optical lens assembly 10 in the ninth embodiment are shown in FIG. 74.

Figures 39A, 39B, 39C, 39D:
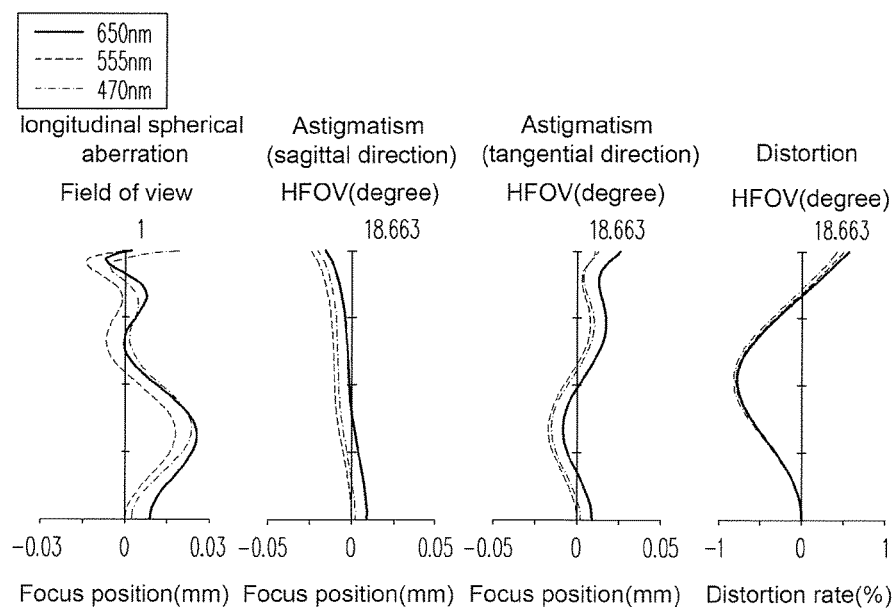
FIGS. 39A to 39D are diagrams illustrating a longitudinal spherical aberration and various aberrations of the optical lens assembly according to the ninth embodiment.

In the diagram shown in FIG. 39A which illustrates the longitudinal spherical aberration, a deviation of the imaging points of the off-axis rays of different heights is controlled within a range of ±0.03 mm. In the diagrams shown in FIG. 39B and FIG. 35C which illustrate two diagrams of astigmatism aberration, a focal length variation of the three representative wavelengths in the whole field of view falls within ±0.03 mm. In the diagram of FIG. 35D which illustrates the distortion aberration, the distortion aberration is maintained within the range of ±0.9%. Therefore, as compared to the existing optical lens, the ninth embodiment may still maintain better image quality under a condition that the total length is reduced to about 6.379 mm.

Based on the above, it can be obtained that the advantages of the ninth embodiment relative to the first embodiment are that the ninth embodiment has a greater half field of view, a greater aperture (less F/#), a shorter total length, and less astigmatism aberration and distortion aberration, and the fifth embodiment can be manufactured more easily than the first embodiment, therefore, a higher yield rate can be achieved.

Figure 42:
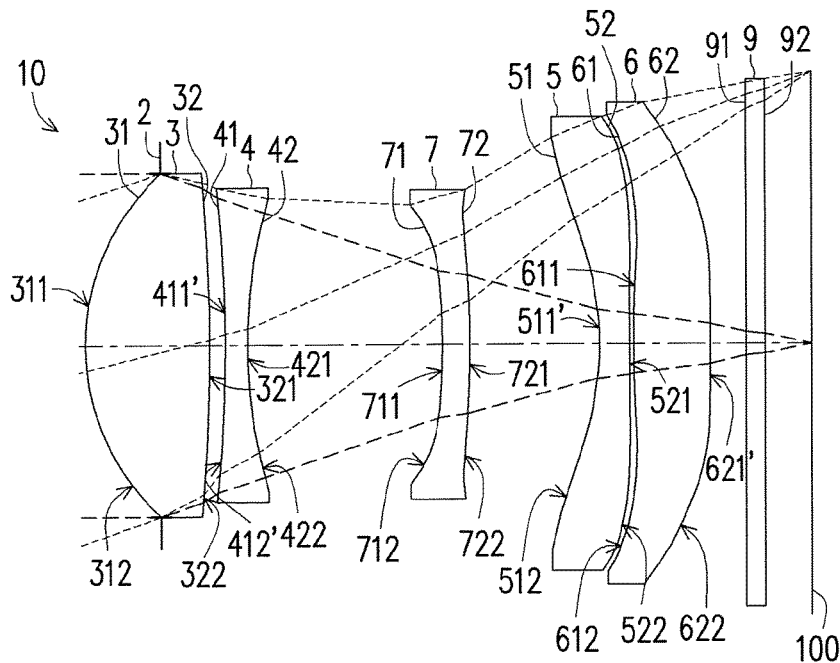
FIG. 42 is a schematic diagram illustrating an optical lens assembly according to a tenth embodiment of the invention.

FIG. 42 is a schematic diagram illustrating an optical lens assembly according to a tenth embodiment of the invention, and FIGS. 43A to 43D are diagrams illustrating a longitudinal spherical aberration and various aberrations of the optical lens assembly according to the tenth embodiment. Referring to FIG. 42, the tenth embodiment of the optical lens assembly 10 of the present invention is similar to the first embodiment. The main difference lies in the optical data, the aspheric coefficients and the parameters of the lens elements (the first, the second, the third, and the fourth lens elements 3, 4, 5, 6). Further, the object-side surface 41 of the second lens element 4 has a concave portion 411' in the vicinity of the optical axis and a concave portion 412' in the vicinity of the periphery. The object-side surface 51 of the third lens element 5 has a concave portion 511' in the vicinity of the optical axis. The fourth lens element 6 has positive refracting power, and the image-side surface 62 of the fourth lens element 6 has a convex portion 621' in the vicinity of the optical axis.

In addition, the optical lens system of the tenth embodiment further includes a fifth lens element 7. The fifth lens element 7 is disposed between the second lens element 4 and the third lens element 5. When a ray emitted from an object to be captured enters the optical lens assembly 10, the ray sequentially passes through the aperture stop 2, the first lens element 3, the second lens element 4, the fifth lens element 7, the third lens element 5, the fourth lens element 6, and the filter 9, so as to form an image on an image plane 100. The fifth lens element 7 has an object-side surface 71 facing the object side and allowing imaging rays to pass through, and an image-side surface 72 facing the image side and allowing the imaging rays to pass through.

In order to meet the product demand of lightweight, the first lens element 3 through the fifth lens element 7 have refracting power and are formed of plastic materials; however, the invention does not intend to limit the materials of the first lens element 3 through the fifth lens element 7.

The fifth lens element 7 has negative refracting power. The object-side surface 71 of the fifth lens element 7 has a concave portion 711 in the vicinity of the optical axis and a concave portion 712 in the vicinity of the periphery. The image-side surface 72 of the fifth lens element 7 has a convex portion 721 in the vicinity of the optical axis and a concave portion 722 in the vicinity of the periphery. In the present embodiment, the object-side surface 71 and the image-side surface 72 of the fifth lens element 7 are both aspheric surfaces.

In the tenth embodiment, only the lens elements described above have refracting power, and the number of lens elements that have refracting power is only five. In other words, in the tenth embodiment, the third lens element 5 is the second to the last lens element in the sequence, and the fourth lens element 6 is the last lens element in the sequence.

The detailed optical data pertaining to the optical lens assembly 10 of the tenth embodiment is shown in FIG. 44. In the tenth embodiment, the EFL of the system is 9.000 mm, the HFOV is 18.021', the f-number (F/#) is 2.391, the total length is 7.952 mm, and the image height thereof is 2.944 mm.

FIG. 45 shows each of the aspheric coefficients used in the formula (1) for the object-side surface 31 of the first lens element 3 through the image-side surface 62 of the fourth lens element 6 in the tenth embodiment.

In addition, the relations among parameters pertaining to the optical lens assembly 10 in the tenth embodiment are shown in FIG. 75.

Figures 43A, 43B, 43C, 43D:
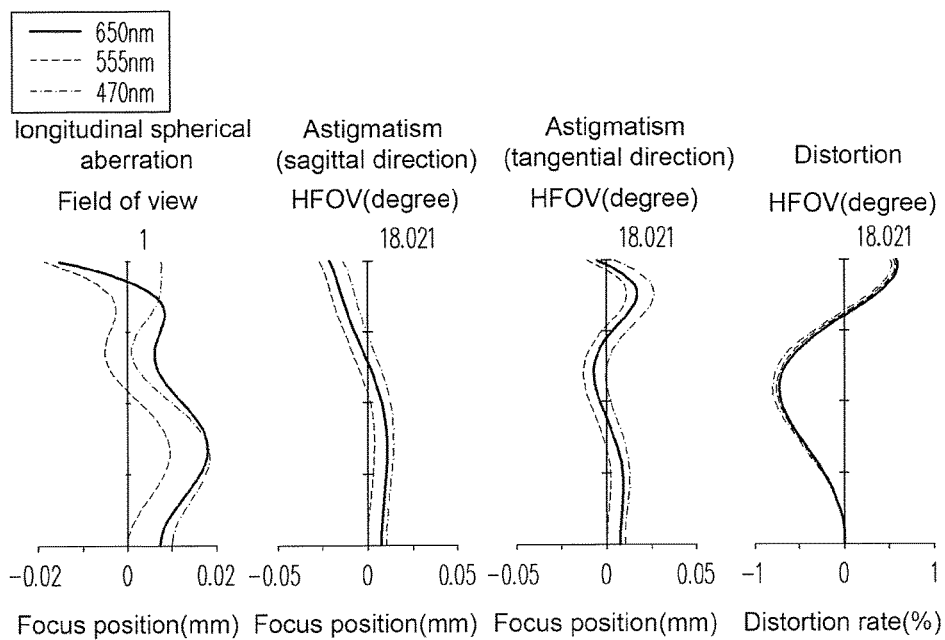
FIGS. 43A to 43D are diagrams illustrating a longitudinal spherical aberration and various aberrations of the optical lens assembly according to the tenth embodiment.

The diagrams of FIG. 43A illustrates the longitudinal spherical aberration of the tenth embodiment when a pupil radius is 1.875 mm. In FIG. 43A which illustrates the longitudinal spherical aberration, curves formed by each wavelength are close to each other and are gathered in the middle, which represents that off-axis lights of different heights of each wavelength are gathered around imaging points, and according to a deviation of the curve of each wavelength, it is learned that deviations of the imaging points of the off-axis lights of different heights are controlled within a range of ±0.02 mm, so that the spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated.

The diagrams of FIG. 43B and FIG. 43C respectively illustrates the astigmatism aberration in a sagittal direction and the astigmatism aberration in a tangential direction on the image plane 100 of the tenth embodiment. In the diagrams shown in FIG. 43B and FIG. 43C which illustrate two diagrams of astigmatism aberration, the focal length variation of the three representative wavelengths in the entire field of view falls within ±0.03 mm, which represents that the optical system in the tenth embodiment can effectively eliminate aberration.

The diagram of FIG. 43D illustrates a distortion aberration on the image plane 100 of the tenth embodiment. In the diagram shown in FIG. 43D which illustrates the distortion aberration, the distortion aberration is maintained in a range of ±0.9%, which illustrates that the tenth embodiment satisfies the quality requirement of the image of the optical system.

Based on the above, as compared to the existing optical lens, the tenth embodiment still maintains good image quality under a condition that the total length is reduced to about 7.952 mm.

Based on the above, it can be obtained that the advantage of the tenth embodiment relative to the first embodiment lies in that the tenth embodiment has a greater aperture (less F/#), and less longitudinal spherical aberration, astigmatism aberration and distortion aberration can be achieved.

Figure 46:
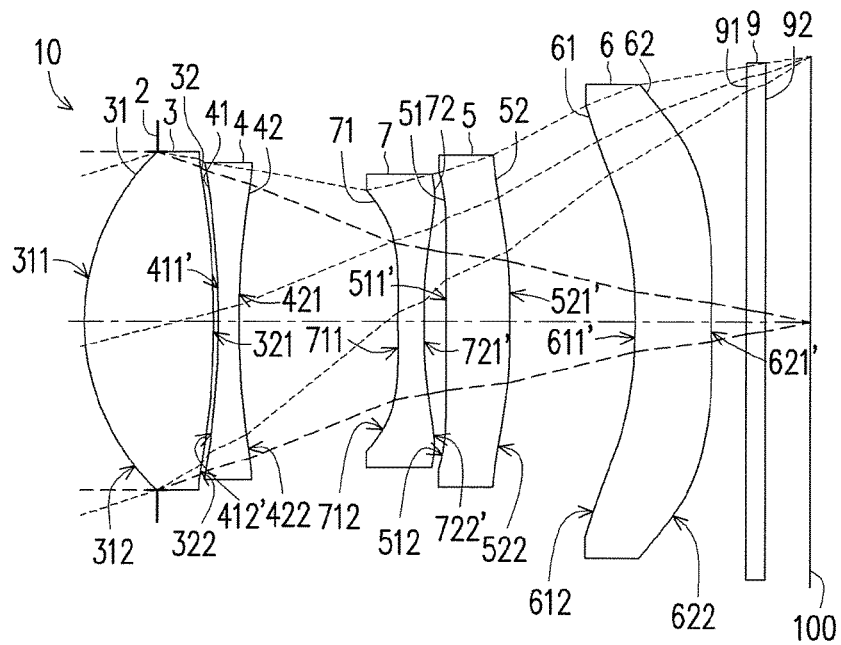
FIG. 46 is a schematic diagram illustrating an optical lens assembly according to an eleventh embodiment of the invention.

FIG. 46 is a schematic diagram illustrating an optical lens assembly according to an eleventh embodiment of the invention, and FIGS. 47A to 47D are diagrams illustrating a longitudinal spherical aberration and various aberrations of the optical lens assembly according to the eleventh embodiment. Referring to FIG. 46, the eleventh embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Furthermore, the third lens element 5 has positive refracting power, and the image-side surface 52 of the third lens element 5 has a convex portion 521' in the vicinity of the optical axis. The fourth lens element 6 has negative refracting power, and the object-side surface 61 of the fourth lens element 6 has a concave portion 611' in the vicinity of the optical axis. The image-side surface 72 of the fifth lens element 7 has a concave portion 721' in the vicinity of the optical axis and a convex portion 722' in the vicinity of the periphery.

The detailed optical data pertaining to the optical lens assembly 10 of the eleventh embodiment is shown in FIG. 48. In the eleventh embodiment, the EFL of the system is 9.000 mm, the HFOV is 18.083', the f-number (F/#) is 2.400, the total length is 8.178 mm, and the image height thereof is 2.944 mm.

FIG. 49 shows each of the aspheric coefficients used in the formula (1) for the object-side surface 31 of the first lens element 3 through the image-side surface 62 of the fourth lens element 6 in the eleventh embodiment.

In addition, the relations among parameters pertaining to the optical lens assembly 10 in the eleventh embodiment are shown in FIG. 75.

Figures 47A, 47B, 47C, 47D:
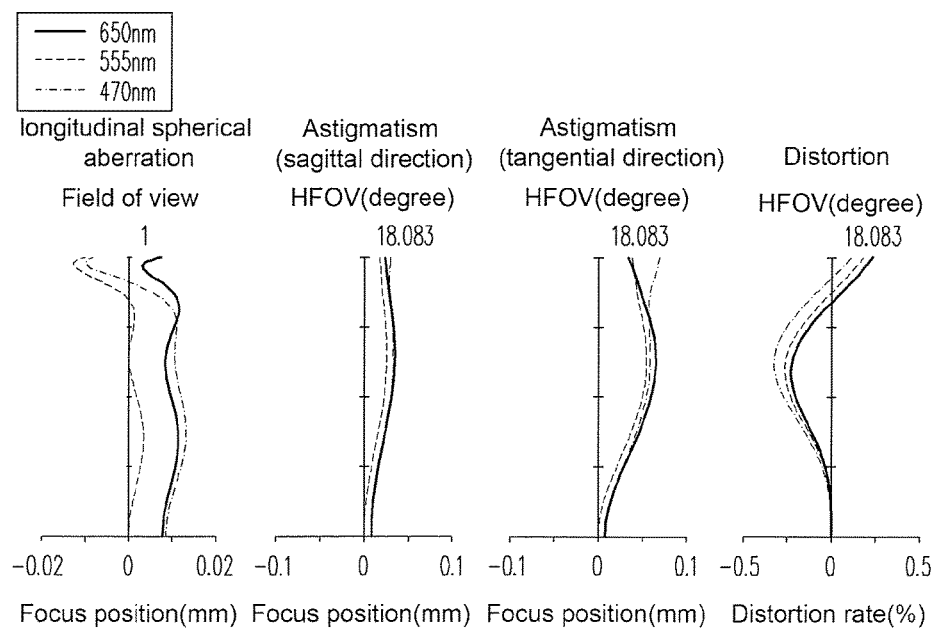
FIGS. 47A to 47D are diagrams illustrating a longitudinal spherical aberration and various aberrations of the optical lens assembly according to the eleventh embodiment.

In the diagram shown in FIG. 47A which illustrates the longitudinal spherical aberration, a deviation of the imaging points of the off-axis rays of different heights is controlled within a range of ±0.014 mm. In the diagrams shown in FIG. 47B and FIG. 47C which illustrate two diagrams of astigmatism aberration, a focal length variation of the three representative wavelengths in the whole field of view falls within ±0.08 mm. In the diagram of FIG. 47D which illustrates the distortion aberration, the distortion aberration is maintained within the range of ±0.35%. Therefore, compared to the existing optical lens, the eleventh embodiment still maintains good image quality under a condition that the total length is reduced to about 8.178 mm.

Based on the above, it can be obtained that the advantages of the eleventh embodiment relative to the tenth embodiment are that the eleventh embodiment has a greater half field of view, less longitudinal spherical variation and distortion aberration may be achieved, and the eleventh embodiment can be manufactured more easily than the tenth embodiment, therefore, a higher yield rate can be achieved.

Figure 50:
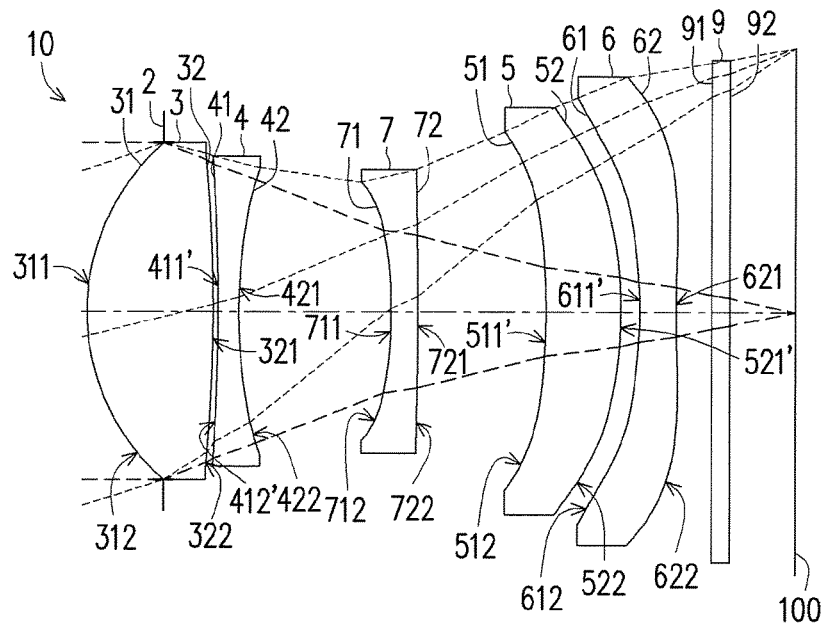
FIG. 50 is a schematic diagram illustrating an optical lens assembly according to a twelfth embodiment of the invention.

FIG. 50 is a schematic diagram illustrating an optical lens assembly according to a twelfth embodiment of the invention, and FIGS. 51A to 51D are diagrams illustrating a longitudinal spherical aberration and various aberrations of the optical lens assembly according to the twelfth embodiment. Referring to FIG. 50, the twelfth embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Furthermore, the third lens element 5 has positive refracting power, and the image-side surface 52 of the third lens element 5 has a convex portion 521' in the vicinity of the optical axis. The fourth lens element 6 has negative refracting power, where the object-side surface 61 of the fourth lens element 6 has a concave portion 611' in the vicinity of the optical axis, and the image-side surface 62 of the fourth lens element 6 has a concave portion 621 in the vicinity of the optical axis.

The detailed optical data pertaining to the optical lens assembly 10 of the twelfth embodiment is shown in FIG. 52. In the twelfth embodiment, the EFL of the system is 9.000 mm, the HFOV is 18.046', the f-number (F/#) is 2.396, the total length is 8.044 mm, and the image height thereof is 2.944 mm.

FIG. 53 shows each of the aspheric coefficients used in the formula (1) for the object-side surface 31 of the first lens element 3 through the image-side surface 62 of the fourth lens element 6 in the twelfth embodiment.

In addition, the relations among parameters pertaining to the optical lens assembly 10 in the twelfth embodiment are shown in FIG. 75.

Figures 51A, 51B, 51C, 51D:
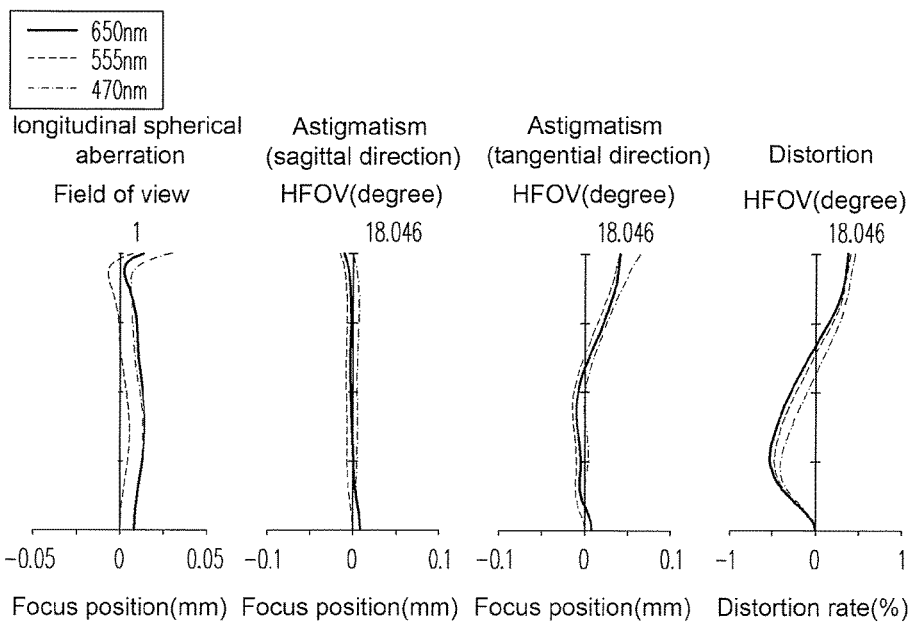
FIGS. 51A to 51D are diagrams illustrating a longitudinal spherical aberration and various aberrations of the optical lens assembly according to the twelfth embodiment.

In the diagram shown in FIG. 51A which illustrates the longitudinal spherical aberration, a deviation of the imaging points of the off-axis rays of different heights is controlled within a range of +0.03 mm. In the diagrams shown in FIG. 51B and FIG. 51C which illustrate two diagrams of astigmatism aberration, a focal length variation of the three representative wavelengths in the whole field of view falls within ±0.07 mm. In the diagram of FIG. 51D which illustrates the distortion aberration, the distortion aberration is maintained within the range of ±0.6%. Therefore, compared to the existing optical lens, the twelfth embodiment still maintains good image quality under a condition that the total length is reduced to about 8.044 mm.

Based on the above, it can be obtained that the advantages of the twelfth embodiment relative to the tenth embodiment are that the twelfth embodiment has a greater half field of view, less distortion aberration may be achieved, and the twelfth embodiment can be manufactured more easily than the tenth embodiment, therefore, a higher yield rate can be achieved.

Figure 54:
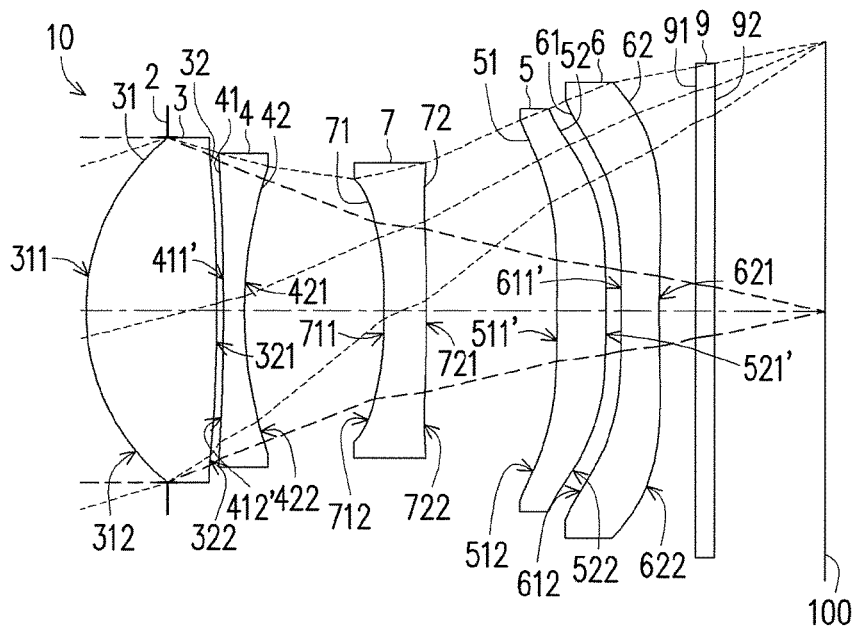
FIG. 54 is a schematic diagram illustrating an optical lens assembly according to a thirteenth embodiment of the invention.

FIG. 54 is a schematic diagram illustrating an optical lens assembly according to a thirteenth embodiment of the invention, and FIGS. 55A to 55D are diagrams illustrating a longitudinal spherical aberration and various aberrations of the optical lens assembly according to the thirteenth embodiment. Referring to FIG. 54, the thirteenth embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Furthermore, the third lens element 5 has positive refracting power, and an image-side surface 52 of the third lens element 5 has a convex portion 521' in the vicinity of the optical axis. The fourth lens element 6 has negative refracting power, where the object-side surface 61 of the fourth lens element 6 has a concave portion 611' in the vicinity of the optical axis, and the image-side surface 62 of the fourth lens element 6 has a concave portion 621 in the vicinity of the optical axis.

The detailed optical data pertaining to the optical lens assembly 10 of the thirteenth embodiment is shown in FIG. 56. In the thirteenth embodiment, the EFL of the system is 9.000 mm, the HFOV is 17.924', the f-number (F/#) is 2.397, the total length is 8.176 mm, and the image height thereof is 2.944 mm.

FIG. 57 shows each of the aspheric coefficients used in the formula (1) for the object-side surface 31 of the first lens element 3 through the image-side surface 62 of the fourth lens element 6 in the thirteenth embodiment.

In addition, the relations among parameters pertaining to the optical lens assembly 10 in the thirteenth embodiment are shown in FIG. 75.

Figures 55A, 55B, 55C, 55D:
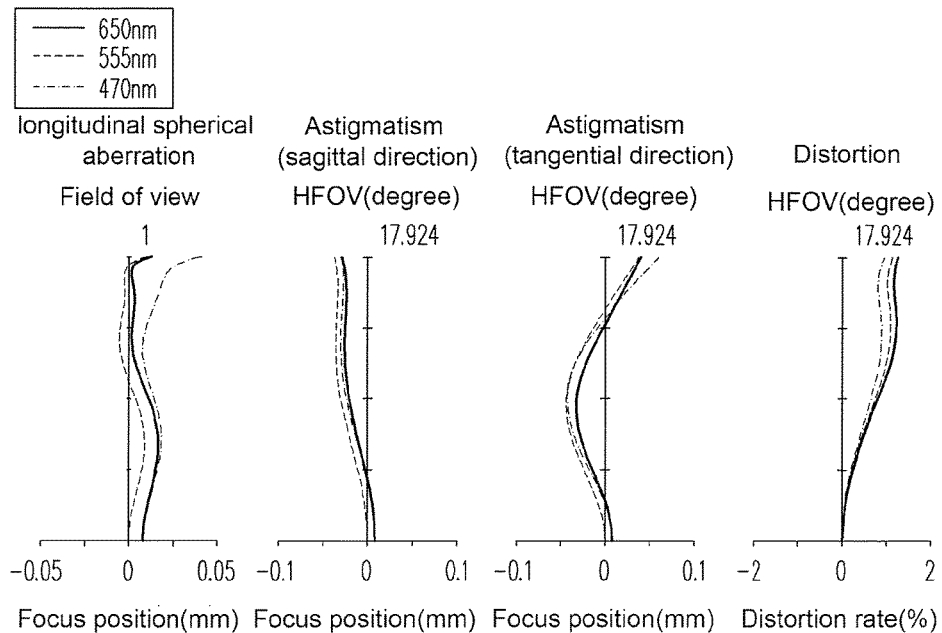
FIGS. 55A to 55D are diagrams illustrating a longitudinal spherical aberration and various aberrations of the optical lens assembly according to the thirteenth embodiment.

In the diagram shown in FIG. 55A which illustrates longitudinal spherical aberration, a deviation of the imaging points of the off-axis rays of different heights is controlled within a range of ±0.045 mm. In the diagrams shown in FIG. 55B and FIG. 55C which illustrate two diagrams of astigmatism aberration, a focal length variation of the three representative wavelengths in the whole field of view falls within ±0.06 mm. In the diagram of FIG. 55D which illustrates the distortion aberration, the distortion aberration is maintained within the range of ±1.4%. Therefore, compared to the existing optical lens, the thirteenth embodiment still maintains good image quality under a condition that the total length is reduced to about 8.176 mm.

Based on the above, it can be obtained that the advantage of the thirteenth embodiment relative to the tenth embodiment lies in that the thirteenth embodiment can be manufactured more easily than the first embodiment, and therefore, a higher yield rate can be achieved.

Figure 58:
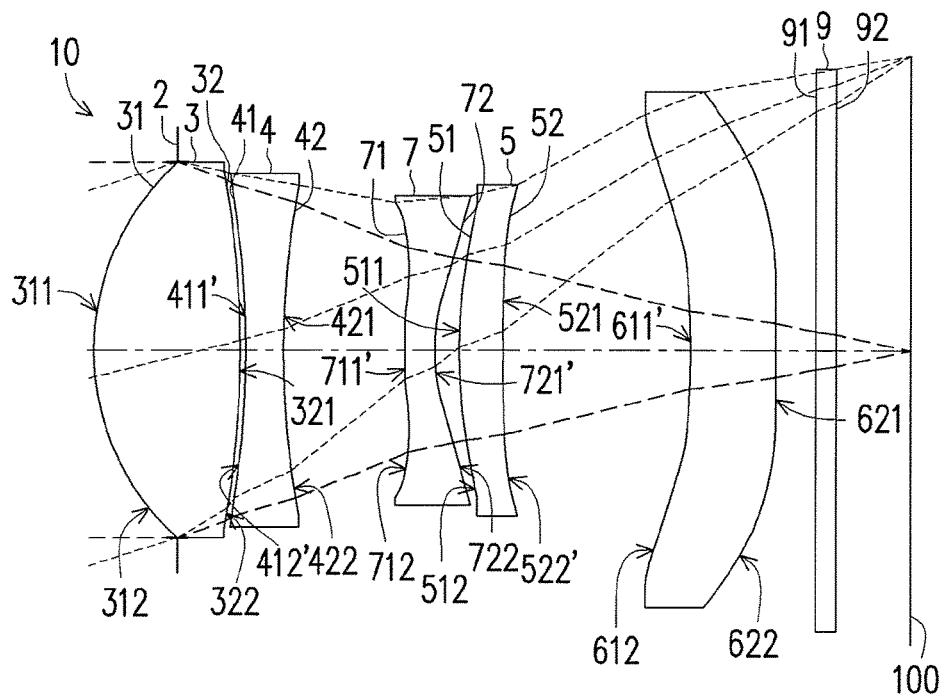
FIG. 58 is a schematic diagram illustrating an optical lens assembly according to a fourteenth embodiment of the invention.

FIG. 58 is a schematic diagram illustrating an optical lens assembly according to a fourteenth embodiment of the invention, and FIGS. 59A to 59D are diagrams illustrating a longitudinal spherical aberration and various aberrations of the optical lens assembly according to the fourteenth embodiment. Referring to FIG. 58, the fourteenth embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Further, the third lens element 5 has positive refracting power, where the object-side surface 51 of the third lens element 5 has a convex portion 511 in the vicinity of the optical axis, and the image-side surface 52 of the third lens element 5 has a concave portion 522' in the vicinity of the periphery. The fourth lens element 6 has negative refracting power, where the object-side surface 61 of the fourth lens element 6 has a concave portion 611' in the vicinity of the optical axis, and the image-side surface 62 of the fourth lens element 6 has a concave portion 621 in the vicinity of the optical axis. The object-side surface 71 of the fifth lens element 7 has a convex portion 711' in the vicinity of the optical axis, and the image-side surface 72 of the fifth lens element 7 has a concave portion 721' in the vicinity of the optical axis.

The detailed optical data pertaining to the optical lens assembly 10 of the fourteenth embodiment is shown in FIG. 60. In the fourteenth embodiment, the EFL of the system is 9.000 mm, the HFOV is 18.045', the f-number (F/#) is 2.394, the total length is 8.173 mm, and the image height thereof is 2.944 mm.

FIG. 61 shows each of the aspheric coefficients used in the formula (1) for the object-side surface 31 of the first lens element 3 through the image-side surface 62 of the fourth lens element 6 in the fourteenth embodiment.

In addition, the relations among parameters pertaining to the optical lens assembly 10 in the fourteenth embodiment are shown in FIG. 75.

Figures 59A, 59B, 59C, 59D:
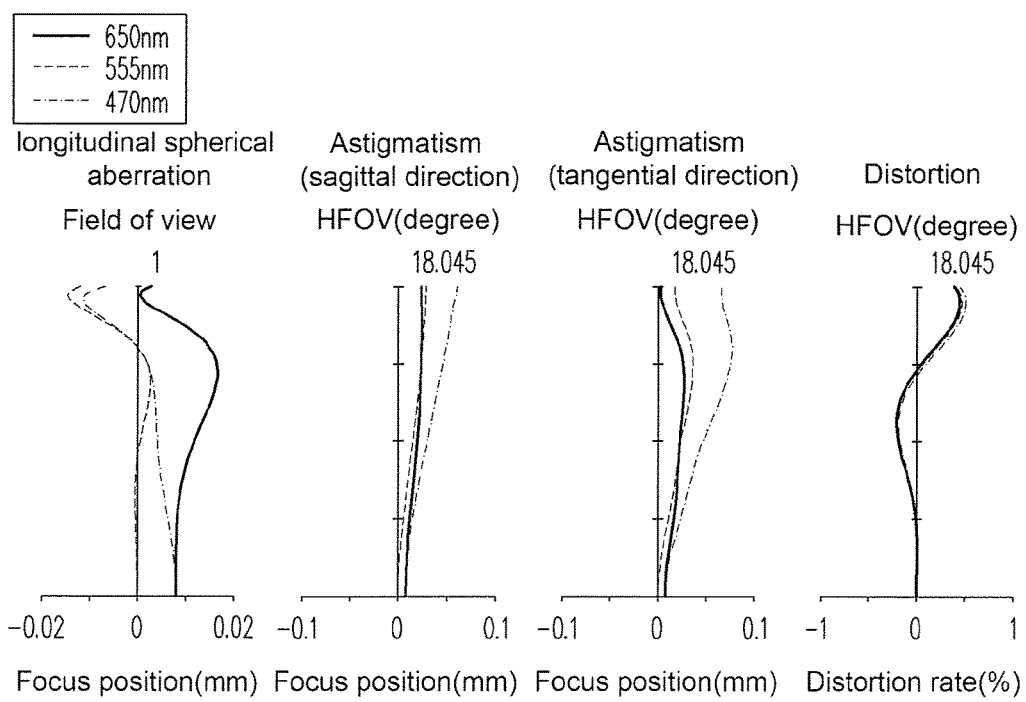
FIGS. 59A to 59D are diagrams illustrating a longitudinal spherical aberration and various aberrations of the optical lens assembly according to the fourteenth embodiment.

In the diagram shown in FIG. 59A which illustrates the longitudinal spherical aberration, a deviation of the imaging points of the off-axis rays of different heights is controlled within a range of ±0.017 mm. In the diagrams shown in FIG. 59B and FIG. 59C which illustrate two diagrams of astigmatism aberration, a focal length variation of the three representative wavelengths in the whole field of view falls within ±0.08 mm. In the diagram of FIG. 59D which illustrates the distortion aberration, the distortion aberration is maintained within the range of ±0.6%. Therefore, as compared to the existing optical lens, the fourteenth embodiment still maintains good image quality under a condition that the total length is reduced to about 8.173 mm.

Based on the above, it can be obtained that the advantages of the fourteenth embodiment relative to the tenth embodiment are that the fourteenth embodiment has a greater half field of view, less longitudinal spherical variation and distortion aberration may be achieved, and the fourteenth embodiment can be manufactured more easily than the tenth embodiment, and therefore, a higher yield rate can be achieved.

Figure 62:
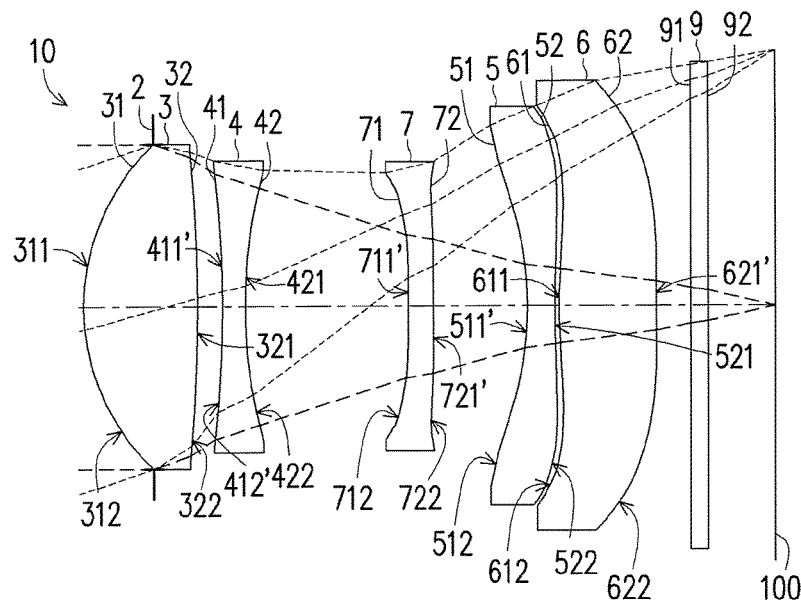
FIG. 62 is a schematic diagram illustrating an optical lens assembly according to a fifteenth embodiment of the invention.

FIG. 62 is a schematic diagram illustrating an optical lens assembly according to a fifteenth embodiment of the invention, and FIGS. 63A to 63D are diagrams illustrating a longitudinal spherical aberration and various aberrations of the optical lens assembly according to the fifteenth embodiment. Referring to FIG. 62, the fifteenth embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Further, the object-side surface 71 of the fifth lens element 7 has a convex portion 711' in the vicinity of the optical axis, and the image-side surface 72 of the fourth lens element 7 has a concave portion 721' in the vicinity of the optical axis.

The detailed optical data pertaining to the optical lens assembly 10 of the fifteenth embodiment is shown in FIG. 64. In the fifteenth embodiment, the EFL of the system is 9.000 mm, the HFOV is 17.988', the f-number (F/#) is 2.400, the total length is 8.173 mm, and the image height thereof is 2.944 mm.

FIG. 65 shows each of the aspheric coefficients used in the formula (1) for the object-side surface 31 of the first lens element 3 through the image-side surface 62 of the fourth lens element 6 in the fifteenth embodiment.

In addition, the relations among parameters pertaining to the optical lens assembly 10 in the fifteenth embodiment are shown in FIG. 75.

Figures 63A, 63B, 63C, 63D:
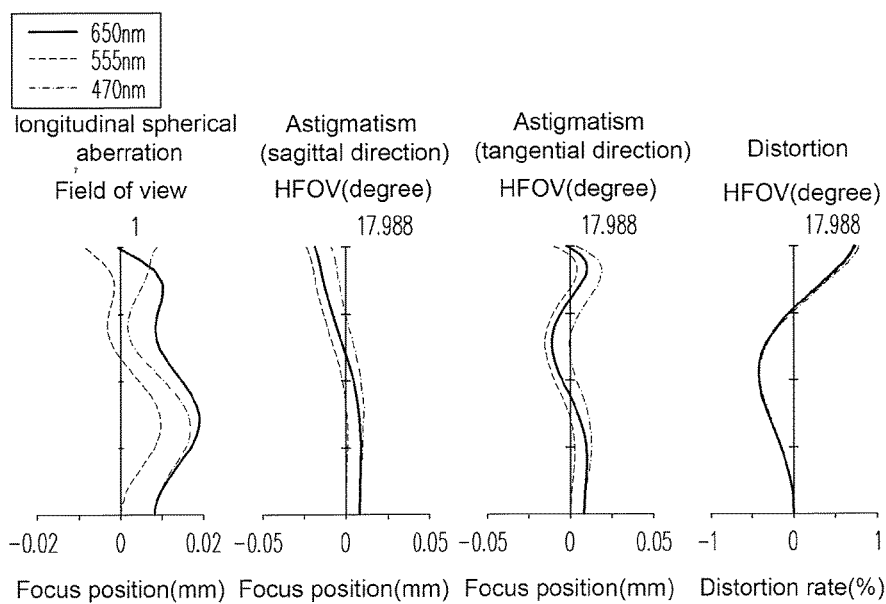
FIGS. 63A to 63D are diagrams illustrating a longitudinal spherical aberration and various aberrations of the optical lens assembly according to the fifteenth embodiment.

In the diagram shown in FIG. 63A which illustrates the longitudinal spherical aberration, a deviation of the imaging points of the off-axis rays of different heights is controlled within a range of ±0.02 mm. In the diagrams shown in FIG. 63B and FIG. 63C which illustrate two diagrams of astigmatism aberration, a focal length variation of the three representative wavelengths in the whole field of view falls within ±0.025 mm. In the diagram of FIG. 63D which illustrates the distortion aberration, the distortion aberration is maintained within the range of ±0.8%. Therefore, as compared to the existing optical lens, the fifteenth embodiment still maintains good image quality under a condition that the total length is reduced to about 8.173 mm.

Based on the above, it can be obtained that the advantages of the fifteenth embodiment relative to the tenth embodiment are that less astigmatism aberration and distortion aberration may be achieved, and the fifteenth embodiment can be manufactured more easily than the tenth embodiment, and therefore, a higher yield rate can be achieved.

Figure 66:
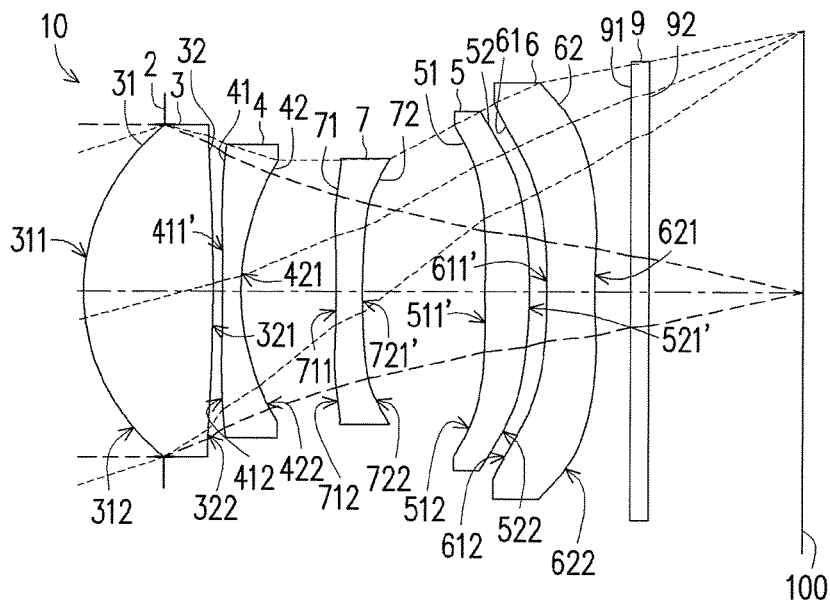
FIG. 66 is a schematic diagram illustrating an optical lens assembly according to a sixteenth embodiment of the invention.

FIG. 66 is a schematic diagram illustrating an optical lens assembly according to a sixteenth embodiment of the invention, and FIGS. 67A to 67D are diagrams illustrating a longitudinal spherical aberration and various aberrations of the optical lens assembly according to the sixteenth embodiment. Referring to FIG. 66, the sixteenth embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Further, the object-side surface 41 of the second lens element 4 has a convex portion 412 in the vicinity of the periphery. The third lens element 5 has positive refracting power, and the image-side surface 52 of the third lens element 5 has a convex portion 521' in the vicinity of the optical axis. The fourth lens element 6 has negative refracting power, where the object-side surface 61 of the fourth lens element 6 has a concave portion 611' in the vicinity of the optical axis, and the image-side surface 62 of the fourth lens element 6 has a concave portion 621 in the vicinity of the optical axis. The image-side surface 72 of the fifth lens element 7 has a concave portion 721' in the vicinity of the optical axis.

The detailed optical data pertaining to the optical lens assembly 10 of the sixteenth embodiment is shown in FIG. 68. In the sixteenth embodiment, the EFL of the system is 9.000 mm, the HFOV is 18.081', the f-number (F/#) is 2.391, the total length is 8.178 mm, and the image height thereof is 2.944 mm.

FIG. 69 shows each of the aspheric coefficients used in the formula (1) for the object-side surface 31 of the first lens element 3 through the image-side surface 62 of the fourth lens element 6 in the sixteenth embodiment.

In addition, the relations among parameters pertaining to the optical lens assembly 10 in the sixteenth embodiment are shown in FIG. 75.

Figures 67A, 67B, 67C, 67D:
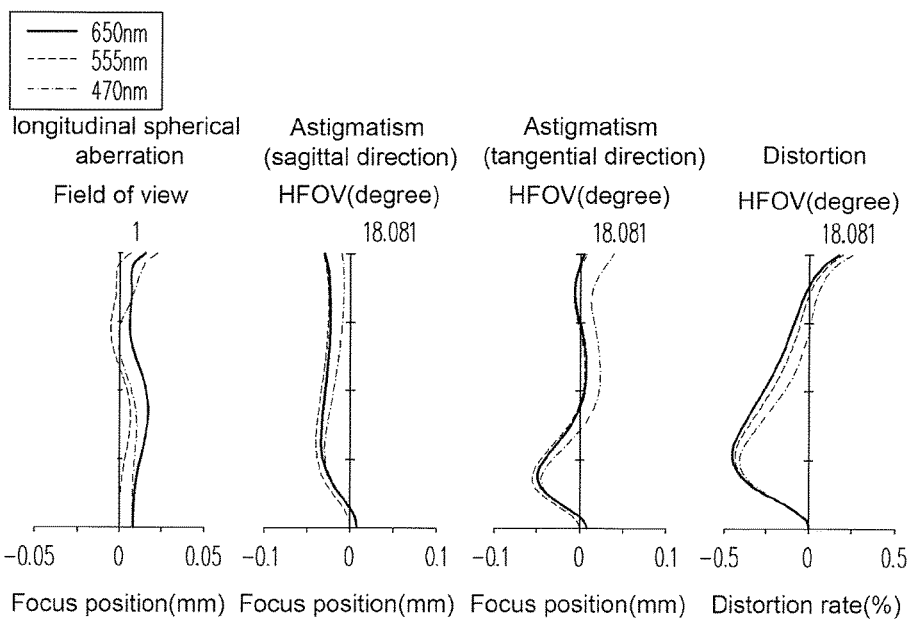
FIGS. 67A to 67D are diagrams illustrating a longitudinal spherical aberration and various aberrations of the optical lens assembly according to the sixteenth embodiment.

In the diagram shown in FIG. 67A which illustrates the longitudinal spherical aberration, a deviation of the imaging points of the off-axis rays of different heights is controlled within a range of ±0.025 mm. In the diagrams shown in FIG. 67B and FIG. 67C which illustrate two diagrams of astigmatism aberration, a focal length variation of the three representative wavelengths in the whole field of view falls within ±0.06 mm. In the diagram of FIG. 67D which illustrates the distortion aberration, the distortion aberration is maintained within the range of ±0.5%. Therefore, as compared to the existing optical lens, the sixteenth embodiment still maintains good image quality under a condition that the total length is reduced to about 8.178 mm.

Based on the above, it can be obtained that the advantages of the sixteenth embodiment relative to the tenth embodiment are that the sixteenth embodiment has a greater half field of view, less distortion aberration may be achieved, and the sixteenth embodiment can be manufactured more easily than the tenth embodiment, therefore, a higher yield rate can be achieved.

Figure 70:
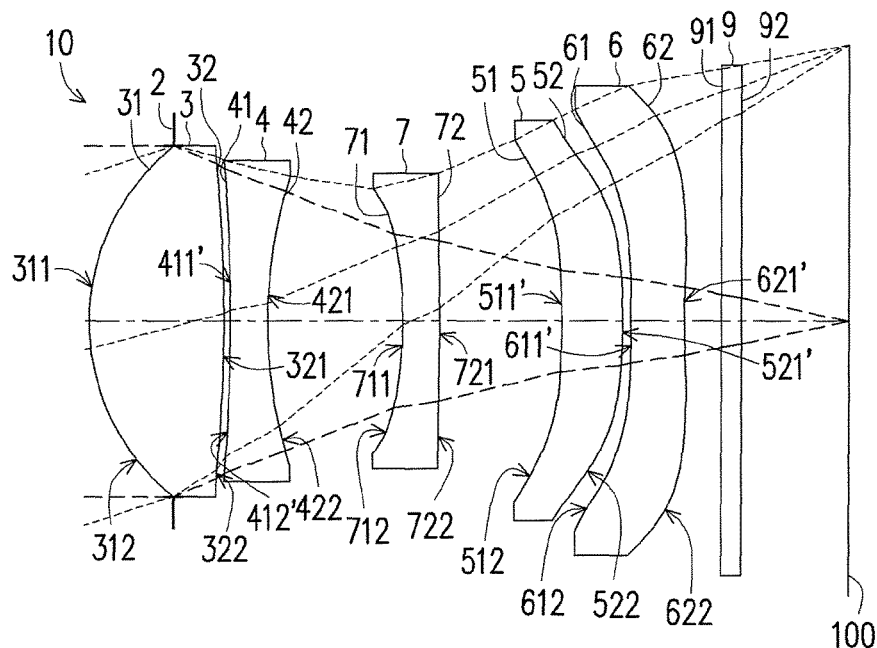
FIG. 70 is a schematic diagram illustrating an optical lens assembly according to a seventeenth embodiment of the invention.

FIG. 70 is a schematic diagram illustrating an optical lens assembly according to a seventeenth embodiment of the invention, and FIGS. 71A to 71D are diagrams illustrating a longitudinal spherical aberration and various aberrations of the optical lens assembly according to the seventeenth embodiment. Referring to FIG. 70, the seventeenth embodiment of the optical lens assembly 10 of the present invention is similar to the tenth embodiment. The main difference lies in the optical data, the aspheric coefficients and the parameters of the lens elements (the first, the second, the third, the fourth and the fifth lens elements 3, 4, 5, 6, 7). Furthermore, the third lens element 5 has positive refracting power, and the image-side surface 52 of the third lens element 5 has a convex portion 521' in the vicinity of the optical axis. The fourth lens element 6 has negative refracting power, and the object-side surface 61 of the fourth lens element 6 has a concave portion 611' in the vicinity of the optical axis.

The detailed optical data pertaining to the optical lens assembly 10 of the seventeenth embodiment is shown in FIG. 72. In the seventeenth embodiment, the EFL of the system is 8.999 mm, the HFOV is 18.004', the f-number (F/#) is 2.399, the total length is 8.176 mm, and the image height thereof is 2.944 mm.

FIG. 73 shows each of the aspheric coefficients used in the formula (1) for the object-side surface 31 of the first lens element 3 through the image-side surface 62 of the fourth lens element 6 in the seventeenth embodiment.

In addition, the relations among parameters pertaining to the optical lens assembly 10 in the seventeenth embodiment are shown in FIG. 75.

Figures 71A, 71B, 71C, 71D:
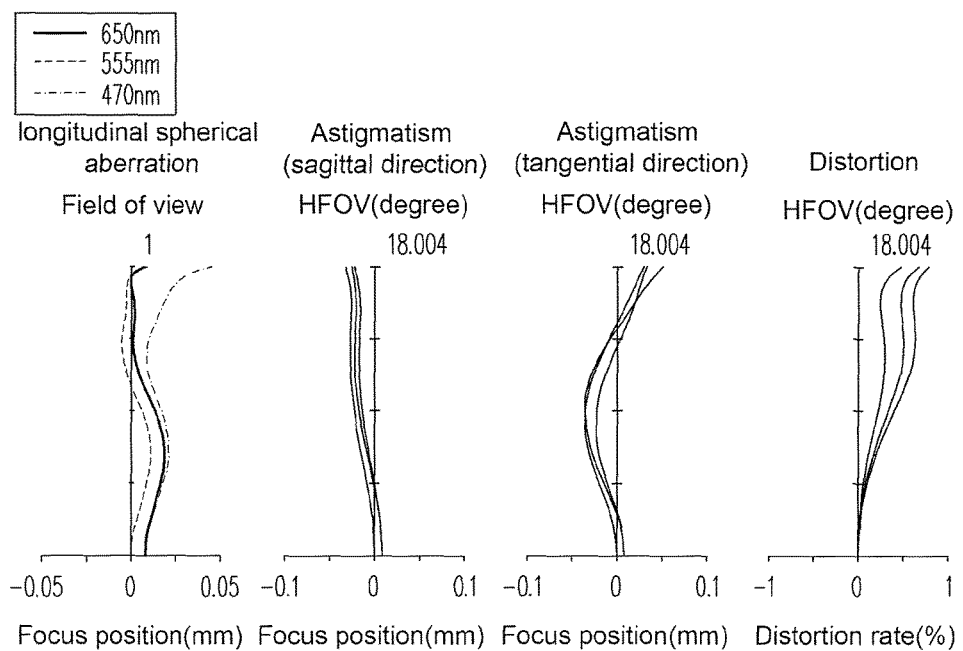
FIGS. 71A to 71D are diagrams illustrating a longitudinal spherical aberration and various aberrations of the optical lens assembly according to the seventeenth embodiment.

In the diagram shown in FIG. 71A which illustrates the longitudinal spherical aberration, a deviation of the imaging points of the off-axis rays of different heights is controlled within a range of 0.05 mm. In the diagrams shown in FIG. 71B and FIG. 71C which illustrate two diagrams of the astigmatism aberration, a focal length variation of the three representative wavelengths in the whole field of view falls within ±0.06 mm. In the diagram of FIG. 71D which illustrates the distortion aberration, the distortion aberration is maintained within the range of ±0.8%. Therefore, as compared to the existing optical lens, the seventeenth embodiment still maintains good image quality under a condition that the total length is reduced to about 8.176 mm.

Based on the above, it can be obtained that the advantages of the seventeenth embodiment relative to the tenth embodiment are that less distortion aberration may be achieved, and the seventeenth embodiment can be manufactured more easily than the tenth embodiment, therefore, a higher yield rate can be achieved.

In summary, the optical lens assembly in the embodiments of the invention may achieve the following effects and advantages.

1. The first lens element having positive refracting power and convex surface on the object-side surface is beneficial to converge light. With the second lens element having negative refracting power, the main aberration generated by the first lens element may be easily corrected.

2. The object-side surface having a concave portion in the vicinity of the periphery of the third lens element and the image-side surface having a convex portion in the vicinity of the periphery of the fourth lens element are beneficial for correcting the main aberration generated by the first lens element and the second lens element.

3. The aperture stop is disposed at the object-side surface of the first lens element in compliance with a sequence of lens elements from the second lens element to the fourth lens element, such that it is beneficial to increase the aperture availability and to reduce the f-number (F/#).

4. When (TTL×F/#)/EFL≤2.2 is satisfied, a light entering aperture is increased without increasing the total length of the optical lens assembly, such is utilized for the design of a telescope with a large aperture.

5. When 1.1≤EFL/TTL≤1.3 is satisfied, or when 1.1≤EFL/TL≤1.6 and AAG>ALT are both satisfied, a ratio of the effective focal length of the optical lens assembly to the total length of the optical lens assembly is maintained at an appropriate value, so as to prevent difficulty in capturing an image of a long-distance object due to the parameters being too small, or to prevent the total length of the optical lens assembly being too long due to the parameters being too large.

6. When 7.3≤EFL/T4≤22 is satisfied, conditions where the thickness of the fourth lens element being too small or too large is prevented, such that the optical lens assembly may be easily manufactured with good yield rate.

7. When 8.4≤EFL/T3 is satisfied, conditions where the thickness of the third lens element being too small or too big is prevented, which is beneficial for reducing coma and manufacturing difficulties as well as increasing yield rate.

8. When EFL/T2≤39 is satisfied, conditions where the thickness of the second lens element being too small or too big is prevented, which is beneficial for reducing the main aberration generated by the first lens element.

9. When 1.2≤G23/T1, 1.8≤G23/T4≤8.5, T3/G12≤17, ALT/G23≤1.8, 2≤AAG/T1, 1.1≤G23/BFL, 2.4≤AAG/T4≤9, 3.1≤G23/T3≤12, G23/T2≤16, 0.9≤T2/G12, 4.0≤T1/G12, 4.75≤BFL/G12, 10.5≤G23/G12≤72, or 3.85≤T4/G12 is satisfied, it is prevented that any one of the parameters from being too large which causes difficulty in achieving slim design of the optical lens assembly, or any one of the parameters from being too small which makes the optical lens assembly difficult to assemble or manufacture.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An optical lens assembly, comprising a first lens element, a second lens element, a third lens element, and a fourth lens element arranged in a sequence from an object side to an image side along an optical axis, the first lens element being arranged to be a lens element having refracting power in a first order from the object side to the image side, the second lens element being arranged to be a lens element having refracting power in a second order from the object side to the image side, the third lens element being arranged to be a lens element having refracting power in a second order from the image side to the object side, the fourth lens element being arranged to be a lens element having refracting power in a first order from the image side to the object side, and each of the first lens element to the fourth lens element comprising an object-side surface facing the object side and allowing imaging rays to pass through as well as an image-side surface facing the image side and allowing the imaging rays to pass through;

the first lens element having positive refracting power, and the object-side surface of the first lens element having a convex portion in a vicinity of the optical axis and a convex portion in a vicinity of a periphery;

the second lens element having negative refracting power, and the object-side surface of the second lens element having a concave portion in a vicinity of a periphery;

the object-side surface of the third lens element having a concave portion in a vicinity of a periphery; and the image-side surface of the fourth lens element having a convex portion in a vicinity of a periphery;

wherein the optical lens assembly satisfies:

$(TTL \times F/\#)/EFL \leq 2.2$; and $1.1 \leq EFL/TTL \leq 1.3$, wherein, TTL is a distance from the object-side surface of the first lens element to an image plane along the optical axis, F/# is an f-number of the optical lens assembly, and EFL is an effective focal length of the optical lens assembly;

wherein the optical lens assembly further satisfies:

$1.8 \leq G23/T4 \leq 8.5$, wherein, G23 is a distance from the second lens element to the third lens element along the optical axis, and T4 is a thickness of the fourth lens element along the optical axis.

2. The optical lens assembly as recited in claim 1, wherein the optical lens assembly further satisfies: $1.2 \leq G23/T1$, wherein T1 is a thickness of the first lens element along the optical axis.

3. The optical lens assembly as recited in claim 1, wherein the optical lens assembly further satisfies: $7.3 \leq EFL/T4 \leq 22$.

4. The optical lens assembly as recited in claim 1, wherein the optical lens assembly further satisfies: $T3/G12 \leq 17$, wherein T3 is a thickness of the third lens element along the optical axis, and G12 is a distance from the first lens element to the second lens element along the optical axis.

5. The optical lens assembly as recited in claim 1, wherein the optical lens assembly further satisfies: $ALT/G23 \leq 1.8$, wherein ALT is a sum of thicknesses of the first lens element, the second lens element, the third lens element and the fourth lens element along the optical axis.

6. The optical lens assembly as recited in claim 1, wherein the optical lens assembly further satisfies: $2.505 \leq AAG/T1$, wherein AAG is a sum of a distance from the first lens element to the second lens element along the optical axis, a distance from the second lens element to the third lens element along the optical axis, and a distance from the third lens element to the fourth lens element along the optical axis, and T1 is a thickness of the first lens element along the optical axis.

7. The optical lens assembly as recited in claim 1, wherein the optical lens assembly further satisfies: $1.1 \leq G23/BFL$, wherein BFL is a distance from the image-side surface of the fourth lens element to the image plane along the optical axis.

8. The optical lens assembly as recited in claim 1, wherein the optical lens assembly further satisfies: $2.4 \leq AAG/T4 \leq 9$, wherein AAG is a sum of distances among the first lens element through the fourth lens element along the optical axis.

9. The optical lens assembly as recited in claim 1, wherein the optical lens assembly further satisfies: 8.4≤EFL/T3, wherein T3 is a thickness of the third lens element along the optical axis.

10. An optical lens assembly, comprising a first lens element, a second lens element, a third lens element, and a fourth lens element arranged in a sequence from an object side to an image side along an optical axis, the first lens element being arranged to be a lens element having refracting power in a first order from the object side to the image side, the second lens element being arranged to be a lens element having refracting power in a second order from the object side to the image side, the third lens element being arranged to be a lens element having refracting power in a second order from the image side to the object side, the fourth lens element being arranged to be a lens element having refracting power in a first order from the image side to the object side, and each of the first lens element to the fourth lens element comprising an object-side surface facing the object side and allowing imaging rays to pass through as well as an image-side surface facing the image side and allowing the imaging rays to pass through;

the first lens element having positive refracting power, and the object-side surface of the first lens element having a convex portion in a vicinity of the optical axis and a convex portion in a vicinity of a periphery;

the second lens element having negative refracting power, and the object-side surface of the second lens element having a concave portion in a vicinity of a periphery;

the object-side surface of the third lens element having a concave portion in a vicinity of a periphery; and the image-side surface of the fourth lens element having a convex portion in a vicinity of a periphery, and the image-side surface of the fourth lens element having a concave portion in a vicinity of the optical axis;

wherein the optical lens assembly satisfies:

(TTL×F/#)/EFL≤2.2;

1.1≤EFL/TL≤1.6; and

AAG>ALT, wherein, TTL is a distance from the object-side surface of the first lens element to an image plane along the optical axis, F/# is an f-number of the optical lens assembly, EFL is an effective focal length of the optical lens assembly, TL is a distance from the object-side surface of the first lens element to the image-side surface of the fourth lens element along the optical axis, AAG is a sum of a distance from the first lens element to the second lens element along the optical axis, a distance from the second lens element to the third lens element along the optical axis, and a distance from the third lens element to the fourth lens element along the optical axis, and ALT is a sum of thicknesses of the first lens element, the second lens element, the third lens element, and the fourth lens element along the optical axis.

11. The optical lens assembly as recited in claim 10, wherein the optical lens assembly further satisfies: 3.1≤G23/T3≤12, wherein G23 is a distance from the second lens element to the third lens element along the optical axis, and T3 is a thickness of the third lens element along the optical axis.

12. The optical lens assembly as recited in claim 10, wherein the optical lens assembly further satisfies: G23/T2≤16, wherein G23 is a distance from the second lens element to the third lens element along the optical axis, and T2 is a thickness of the second lens element along the optical axis.

13. The optical lens assembly as recited in claim 10, wherein the optical lens assembly further satisfies: 0.9≤T2/G12, wherein T2 is a thickness of the second lens element along the optical axis, and G12 is a distance from the first lens element to the second lens element along the optical axis.

14. The optical lens assembly as recited in claim 10, wherein the optical lens assembly further satisfies: 4.0≤T1/G12, wherein T1 is a thickness of the first lens element along the optical axis, and G12 is a distance from the first lens element to the second lens element along the optical axis.

15. The optical lens assembly as recited in claim 10, wherein the optical lens assembly further satisfies: 22.417≤EFL/T2≤39, wherein T2 is a thickness of the second lens element along the optical axis.

16. The optical lens assembly as recited in claim 10, wherein the optical lens assembly further satisfies: 4.75≤BFL/G12, wherein BFL is a distance from the image-side surface of the fourth lens element to the image plane along the optical axis, and G12 is a distance from the first lens element to the second lens element along the optical axis.

17. The optical lens assembly as recited in claim 10, wherein the optical lens assembly further satisfies: 8.4≤EFL/T3, wherein T3 is a thickness of the third lens element along the optical axis.

18. The optical lens assembly as recited in claim 10, wherein the optical lens assembly further satisfies: 10.5≤G23/G12≤72, wherein G23 is a distance from the second lens element to the third lens element along the optical axis, and G12 is a distance from the first lens element to the second lens element along the optical axis.

19. The optical lens assembly as recited in claim 10, wherein the optical lens assembly further satisfies: 4.445≤T4/G12, wherein T4 is a thickness of the fourth lens element along the optical axis, and G12 is a distance from the first lens element to the second lens element along the optical axis.

* * * * *